United States Patent
Mitani et al.

(10) Patent No.: US 10,001,664 B2
(45) Date of Patent: Jun. 19, 2018

(54) DISPLAY DEVICE

(71) Applicant: Sharp Kabushiki Kaisha, Sakai, Osaka (JP)

(72) Inventors: Masahiro Mitani, Sakai (JP); Aya Nakatani, Sakai (JP); Keiichi Yamamoto, Sakai (JP); Seiji Muraoka, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days. days.

(21) Appl. No.: 15/550,046

(22) PCT Filed: Mar. 3, 2016

(86) PCT No.: PCT/JP2016/056561
§ 371 (c)(1),
(2) Date: Aug. 10, 2017

(87) PCT Pub. No.: WO2016/143656
PCT Pub. Date: Sep. 15, 2016

(65) Prior Publication Data
US 2018/0024395 A1    Jan. 25, 2018

(30) Foreign Application Priority Data

Mar. 10, 2015  (JP) ................................. 2015-047181

(51) Int. Cl.
G02F 1/1345 (2006.01)
G02F 1/1333 (2006.01)

(52) U.S. Cl.
CPC .... *G02F 1/133305* (2013.01); *G02F 1/13454* (2013.01); *G02F 2001/13456* (2013.01)

(58) Field of Classification Search
CPC ............. G02F 1/13458; G02F 1/13454; G02F 2001/13456
See application file for complete search history.

(56) References Cited

U.S. PATENT DOCUMENTS 8,432,523 B2 * 4/2013 Shin .......................... G02F 1/13
349/149
2010/0134743 A1   6/2010 Shin et al.

FOREIGN PATENT DOCUMENTS

JP    52-94172 A    8/1977
JP    2006-243322 A    9/2006
(Continued)

OTHER PUBLICATIONS

Official Communication issued in International Patent Application No. PCT/JP2016/056561, dated May 24, 2016.

*Primary Examiner* — Phu Vu
(74) *Attorney, Agent, or Firm* — Keating & Bennett, LLP

(57) ABSTRACT

A liquid crystal display device includes a liquid crystal panel, a panel driver board, and flexible circuit boards. The liquid crystal panel has a substantially round shape and includes linear edge sections formed by linearly cutting out outer edge portions. The panel driver board is configured to supply signals related to image display to the liquid crystal panel. The flexible circuit boards include first ends and second ends. The first ends are mounted to the liquid crystal panel aligned with the linear edge sections with respect to the circumferential direction in a non-display area. The second ends are mounted to the panel driver board. Portions of the flexible circuit boards joining the first ends and the second ends have bending shapes in a plan view.

15 Claims, 38 Drawing Sheets

(56) References Cited

FOREIGN PATENT DOCUMENTS

| | | |
|---|---|---|
| JP | 2009-064899 A | 3/2009 |
| JP | 2010-079001 A | 4/2010 |
| JP | 5177875 B2 | 4/2013 |

* cited by examiner

DISPLAY DEVICE

TECHNICAL FIELD

The present invention relates to a display device.

BACKGROUND ART

A liquid crystal display devices includes a liquid crystal panel having a liquid crystal layer between substrates. Characters and images are displayed in a display area of the liquid crystal panel. Patent Document 1 discloses a liquid crystal display device having a round display area. The liquid crystal display device includes a substrate having a first region and a second region. The first region is surrounded by a curved exposed end surface and a curved non-exposed end surface. The curved exposed end surface is at a cut portion of the substrate, which is formed when the substrate is cut out. The curved non-exposed end surface is inside the substrate. The second region is surrounded by the non-exposed end surface and three linear exposed end surfaces.

RELATED ART DOCUMENT

Patent Document

Patent Document 1: Japanese Patent Publication No. 5177875

Problem to be Solved by the Invention

In Patent Document 1, a size of the liquid crystal panel can be reduced and a size of the display area can be increased. However, as the number of traces within the display area is increased to improve the resolution of images on display, a larger area is required to form the terminals on the substrate and a width of the flexible circuit board that is to be connected to the terminals becomes larger. To increase the area to form the terminals and the width of the flexible circuit board connected to the area, the second region needs to be increased. Therefore, the largest outer diameter of the substrate needs to be increased. If the liquid crystal display device has an outline that is along an outline of the substrate, a case of the liquid crystal display device may need to be formed in a complicated shape. Therefore, it may be preferable to form the liquid crystal display device in a simple round outline. However, in such a configuration, a diameter of the liquid crystal display device needs to be set equal to the largest outer diameter of the substrate of the liquid crystal panel. Therefore, it is necessary to increase a frame width of the liquid crystal display device and an overall size of the liquid crystal display device.

DISCLOSURE OF THE PRESENT INVENTION

The present invention was made in view of the above circumstances. An object is to reduce a frame width and suppress increase in size.

Means for Solving the Problem

A display device according to the present invention includes a display panel, a panel driver, and flexible circuit boards. The display panel has a substantially round or oval shape. The display panel includes linear edge sections formed by linearly cutting off sections of outer edge portions thereof. The panel driver board configured to supply signal related to image display to the display panel. The flexible circuit boards include first ends and second ends. The first ends are mounted to an outer portion of the display panel at positions corresponding with the linear edge sections with respect to a circumferential direction, respectively. The second ends are mounted to the panel driver board. Portions each joining each of the first ends and corresponding one of the second ends have bending shape in a plan view.

Because the first ends of the flexible circuit boards are mounted to the outer portion of the display panel at the positions corresponding with the linear edge sections in the circumferential direction, respectively, a width of each flexible circuit boards can be reduced and a length of each linear edge section can be reduced. According to the configuration, a width of the outer portion of the display panel, that is, a width of a frame can be reduced. This configuration is preferable for reducing the frame size of the display device and an increase in overall size. For mounting the flexible circuit boards, the flexible circuit boards can be positioned relative to the display panel using the linear edge sections.

Furthermore, because the second ends are mounted to the panel driver board, the signals related to the image display are supplied to the flexible circuit board from the common panel driver board. In comparison to a configuration that includes multiple flexible circuit boards and the same number of panel driver boards, the number of the panel driver is smaller. The configuration is preferable for reducing the cost. Because the portion of each flexible circuit board joining the first end and the second end has the bending shape in the plan view, the length of the flexible circuit board is less likely to become large and thus a wire resistance of the flexible circuit board can be reduced. By folding the flexible circuit boards, the flexible circuit boards can be easily held in a small space. The flexible circuit boards may include flexible circuit boards that are physically separated and independent from each other and flexible circuit boards including portions that are physically connected with each other.

Preferred embodiments of the position inputting device according to the present invention may include the following configurations.

(1) The second ends of the flexible circuit boards may be parallel to each other and mounted to a same edge portion of the panel driver. According to the configuration, the second ends of the flexible circuit boards can be easily mounted to the panel driver board. This configuration is preferable for maintaining the size of the panel driver circuit small.

(2) The bending shapes of the portions of the flexible circuit boards joining the first ends and the second ends in the plan view may be defined such that the second ends are located inner than the first ends with respect to an arrangement direction in which the flexible circuit boards are arranged when the flexible circuit boards are in an unfolded state. In the unfolded state before folding the flexible circuit boards, the second ends can be easily mounted to the panel driver board. Furthermore, the second ends are mounted at positions closer to each other on the panel driver board. This configuration is preferable for reducing the size of the panel driver board. The flexible circuit boards in the unfolded state are less likely to be caught on other components during transfer. This configuration provides easy handling of the display panel and the flexible circuit boards.

(3) The bending shapes of the portions of the flexible circuit boards joining the first ends and the second ends in the plan view may be defined such that the flexible circuit boards are entirely within an outline of the display panel with respect to the arrangement direction when the flexible circuit boards are in the unfolded state. According to the configuration, the flexible circuit boards are less likely to project outside the outline of the display panel with respect to the arrangement direction in the unfolded state. Therefore, the flexible circuit boards in the unfolded state are further less likely to be caught on other components during transfer. This configuration provides easier handling of the display panel and the flexible circuit boards.

(4) A center angle defined by a line joining a middle point of one of the flexible circuit boards with respect to a width direction and a center of the display panel and a line joining a middle point of the other flexible circuit board with respect to a width direction and the center of the display panel may be referred to as θ. The flexible circuit boards may include first portions, second portions, third portions, and fourth portions. The first portions may include the first ends. The first portions may be perpendicular to the linear edge sections in the unfolded state. The second portions may continue from the first portions at an angle of θ/2 relative to the first portions to turn inward with respect to the arrangement direction in the unfolded state. The third portions may continue from the second portions at the angle of θ/2 relative to the second portions to turn inward with respect to the arrangement direction in the unfolded state. The fourth portions may include the second ends. The fourth portions may continue from the third portions at the angle of θ/2 relative to the third portions to turn outward with respect to the arrangement direction in the unfolded state. According to the configuration, the second portions of the flexible circuit boards in the unfolded state extend parallel to each other and thus the flexible circuit boards in the unfolded state are less likely to spread outward with respect to the arrangement direction. Therefore, the flexible circuit boards in the unfolded state are further less likely to be caught by other components during transfer. This configuration provides further easier handling of the display panel and the flexible circuit boards. The angles at bending points of the flexible circuit boards are all the same. Therefore, even if a tension is applied to the flexible circuit boards during transfer, a stress is less likely to be exerted on a specific bending point. According to the configuration, the flexible circuit boards are less likely to be damaged when the flexible circuit boards are folded. Furthermore, because the second ends of the flexible circuit boards in the unfolded state may be parallel to each other, the second ends can be easily mounted to the panel driver board.

(5) The flexible circuit boards may be folded such that: the first portions may be folded along folding lines parallel to the linear edge sections into inverted V shapes; boundary portions between the second portions and the third portions may be folded along boundaries into inverted V shapes or V shapes; and third portions may be folded along folding lines that may be at an angle of $[180°-(θ/2)]/2$ relative to outer edges of the third portions farther from the center of the display panel on second portion sides when the flexible circuit boards are in the unfolded state into V shapes or inverted V shapes. By folding the flexible circuit boards, the panel driver board can be held on the back side of the display panel. The folded flexible circuit boards with the second portions and the third portions overlapping each other can be held in a small space. Depending on the length of the second portions, the flexible circuit boards may not overlap each other and thus interference is less likely to occur between signals transmitting through the flexible circuit boards.

(6) A center angle defined by a line joining a middle point of one of the flexible circuit boards with respect to a width direction and a center of the display panel and a line joining a middle point of the other flexible circuit board with respect to a width direction and the center of the display panel may be referred to as θ. The flexible circuit boards may include first portions, second portions, third portions, and fourth portions. The first portions may include the first ends. The first portions may be perpendicular to the linear edge sections in the unfolded state. The second portions may continue from the first portions at an angle of θ/2 relative to the first portions to turn inward with respect to the arrangement direction in the unfolded state. The third portions may continue from the second portions at a right angle relative to the second portions to turn inward with respect to the arrangement direction in the unfolded state. The fourth portions may include the second ends. The fourth portions may continue from the third portions at the right angle relative to the third portions to turn away from the display panel in the unfolded state. Because the second portions of the flexible circuit boards in the unfolded state may extend parallel to each other, the flexible circuit boards in the unfolded state are less likely to spread outward in the arrangement direction. Therefore, the flexible circuit boards in the unfolded state are further less likely to be caught on other components during transfer. This configuration provides further easier handling of the display panel and the flexible circuit boards. In the flexible circuit boards, the angles of the third portions relative to the second portions and the angles of the fourth portions relative to the third portions are the right angle. Therefore, the flexible circuit boards in the unfolded state can be disposed in a small space. Because the second ends of the flexible circuit boards are parallel to each other, the flexible circuit boards can be easily mounted to the panel driver board.

(7) The flexible circuit boards may be folded such that: the first portions may be folded along folding lines parallel to the linear edge sections into inverted V shapes; the second portions may be folded along folding lines that are at an angle of (45°−θ/2) relative to outer edges of the second portions farther from the center of the display panel on the first portion sides into V shapes or inverted V shapes; and the third portions may be folded along folding lines that are at an angle of 135° relative to outer edges of the third portions of the flexible circuit boards in the unfolded state farther from the center of the display panel on second portion sides into inverted V shape or V shapes. By folding the flexible circuit boards, the panel driver board can be held on the back side of the display panel. The folded flexible circuit boards with the second portions and the third portions overlapping each other can be held in a small space. Depending on the length of the second portions, the flexible circuit boards may not overlap each other. Therefore, interference is less likely to occur between signals transmitting through the flexible circuit boards.

(8) The second ends of the flexible circuit boards may be connected to each other and collectively mounted to the panel driver board. According to the configuration, the steps of mounting the flexible circuit boards to the panel driver board can be reduced. This configuration is preferable for reducing a throughput and a production cost.

(9) The bending shapes of the portions of the flexible circuit boards joining the first ends and the second ends in the plan view may be defined such that the second ends are located outer than the first ends with respect to an arrangement direction in which the flexible circuit boards are arranged when the flexible circuit boards are in an unfolded state. In the unfolded state before folding the flexible circuit boards, the second ends are less likely to physically and directly interfere with each other. This configuration is preferable for mounting the second ends to the panel driver board after the flexible circuit boards are folded. It is preferable that the second ends are arranged inner than the first ends with respect to the arrangement direction when the flexible circuit boards are folded.

(10) A center angle defined by a line joining a middle point of one of the flexible circuit boards with respect to a width direction and a center of the display panel and a line joining a middle point of the other flexible circuit board with respect to a width direction and the center of the display panel may be referred to as θ. The flexible circuit boards may include first portions, second portions, and third portions. The first portions may include the first ends. The first portions may be perpendicular to the linear edge sections in the unfolded state. The second portions may continue from the first portions at an angle of (180°−θ)/2 relative to the first portions to turn inward with respect to the arrangement direction in the unfolded state. The third portions may continue from the second portions at a right angle relative to the second portions to turn outward with respect to the arrangement direction in the unfolded state. The first portions may be folded along folding lines parallel to the linear edge sections into inverted V shapes. According to the configuration, when the first portions of the flexible circuit boards are folded along the folding lines parallel to the linear edge sections into the inverted V shapes, the second portions may be arranged to linearly extend. In comparison to a configuration in which second portions are arranged to cross each other, the second portions can be held in a smaller space, that is, the holding space can be reduced. Because the length of the second portions is smaller, the wire resistances are smaller. Because each flexible circuit board is folded only once, a physical load on conductive lines can be reduced.

(11) The flexible circuit boards may be configured such that the third portions may be folded along folding lines that are perpendicular to outer edges of the third portions into V shapes or inverted V shapes and the second ends project from an outline of the display panel for mounting the second ends to the panel driver board. According to the configuration, when the third portions of the flexible circuit boards are folded along the folding lines that are perpendicular to the outer edges of the third portions into the V shapes or the inverted V shapes, the second ends project from the outline of the display panel. Therefore, the second ends can be easily mounted to the panel driver board using a general mounting device. Because the mounting can be performed using such a general mounting device, this configuration is preferable for reducing the production cost. After the second ends are mounted to the panel driver board, the folded third portions are opened and the panel driver board connected to the flexible circuit board can be held within the outline of the display panel.

(12) A center angle defined by a line joining a middle point of one of the flexible circuit boards with respect to a width direction and a center of the display panel and a line joining a middle point of the other flexible circuit board with respect to a width direction and the center of the display panel may be 90°. According to the configuration, directions in which the linear edge sections of the outer edge portion of the display panel to which the flexible circuit boards are mounted are perpendicular to each other. For mounting the flexible circuit boards, the linear edge sections, the positions of which in the circumferential direction correspond with the flexible circuit boards, may be used for positioning of the flexible circuit boards relative to two directions of the display panel perpendicular to each other. Therefore, the flexible circuit boards can be mounted with high position accuracy. Furthermore, in attachment of components other than the flexible circuit boards, high position accuracy can be achieved by using the linear edge sections.

(13) A center angle defined by a line joining a middle point of one of the flexible circuit boards with respect to a width direction and a center of the display panel and a line joining a middle point of the other flexible circuit board with respect to a width direction and the center of the display panel may be 60°. When the display panel is divided into two regions by a center line perpendicular to the arrangement direction in which the flexible circuit boards are arranged, the middle point of each region with respect to the arrangement direction and the middle point of the corresponding flexible circuit board mounted to the outer portion of the display panel with respect to the width direction substantially correspond with each other with respect to the arrangement direction. Conductive lines on the display panel can be evenly connected to a first portion and a second portion of each flexible circuit board sandwiching a middle portion with respect to the width direction. According to the configuration, a frame size of the display panel can be reduced.

(14) A center angle defined by a line joining a middle point of one of the flexible circuit boards with respect to a width direction and a center of the display panel and a line joining a middle point of the other flexible circuit board with respect to a width direction and the center of the display panel may be referred to as θ. The flexible circuit boards may include at least first portions and second portions. The first portions may include the first ends. The first portions may extend perpendicular to the linear edge sections in the unfolded state. The second portions may continue from the first portions at an angle of θ/2 relative to the first portions to turn inward in the arrangement direction in which the flexible circuit boards are arranged in the unfolded state. According to the configuration, the second portions of the flexible circuit boards extend parallel to each other. In the unfolded state before folding the flexible circuit boards, the flexible circuit boards are less likely to spread outward. Therefore, the flexible circuit boards in the unfolded state are less likely to be caught on other components during transfer. This configuration provides easy handling of the display panel and the flexible circuit boards.

(15) A center angle defined by a line joining a middle point of one of the flexible circuit boards with respect to a width direction and a center of the display panel and a line joining a middle point of the other flexible circuit board with respect to a width direction and the center of the display panel may be referred to as θ. The flexible circuit boards may include at least first portions and second portions. The first portions may include the first ends. The first portions may extend perpendicular to the liner edge sections in the unfolded state. The second portions may continue from the first portions at an angle of (180°−θ)/2 relative to the first portions to turn inward in the arrangement direction in which the flexible circuit boards are arranged in the unfolded state. At least the first portions are folded along folding lines parallel to the linear edge sections into inverted V shapes. According to the configuration, when at least the first portions of the flexible circuit boards are folded along the folding lines parallel to the linear edge sections into the inverted V shapes, the second portions are arranged to linearly extend. In comparison to a configuration in which second portions are arranged to cross each other, the second portions are held in a smaller space, that is, the holding space can be reduced. Because the length of the second portions is smaller, the wire resistances are further smaller.

Advantageous Effect of the Invention

According to the present invention, a frame size can be reduced and an increase in overall size can be restricted.

MODE FOR CARRYING OUT THE INVENTION

First Embodiment

Figure 1:
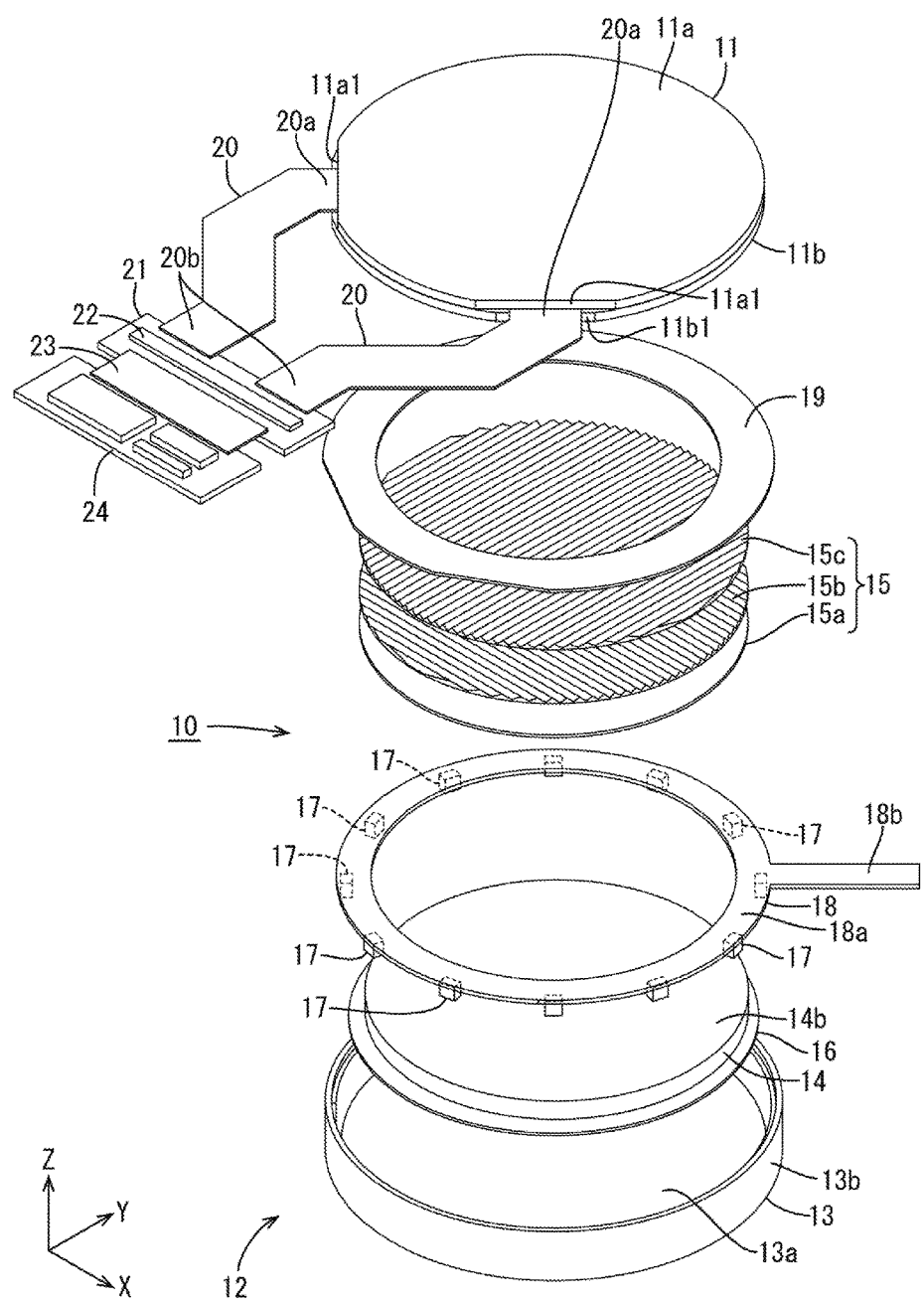
FIG. 1 is an exploded perspective view of a liquid crystal display device according to a first embodiment of the present invention.

A first embodiment of the present invention will be described with reference to FIGS. 1 to 5. In this section, a liquid crystal display device 10 (a display device) including a liquid crystal panel 11 that is a display panel will be described. X-axes, Y-axes, and Z-axes may be present in the drawings. The axes in each drawing correspond to the respective axes in other drawings. The vertical direction is based on FIGS. 4 and 5. An upper side and a lower side in FIGS. 4 and 5 correspond to a front side and a back side of the liquid crystal display device 10, respectively.

The liquid crystal display device 10 has a substantially round shape as a whole. As illustrated in FIG. 1, the liquid crystal display device 10 at least includes the liquid crystal panel 11 (a display panel) and a backlight unit 12 (a lighting unit). The liquid crystal panel 11 is configured to display images. The backlight unit 12 is arranged on a back side with respect to the liquid crystal panel 11 and configured to supply light necessary for display to the liquid crystal panel 11. The liquid crystal display device 10 may include a bezel (not illustrated) for holding an outer edge portion of the liquid crystal panel 11 between the bezel and the backlight unit 12. The liquid crystal display device 10 according to the present embodiment may be used in but not limited to an electronic device (not illustrated). Examples of the electronic device include mobile phones (including smart phones), laptop computers (including tablet-type laptop computers), mobile information terminals (including an electronic book and PDA), a digital photo frame, and portable video game players. The liquid crystal display device 10 may be used in other devices. A screen size of the liquid crystal panel 11 included in the liquid crystal display device 10 may be from several inches to a ten and several inches, which is usually classified as a small or a small-to-medium screen size. The screen size is not limited to the above screen size.

Figure 4:
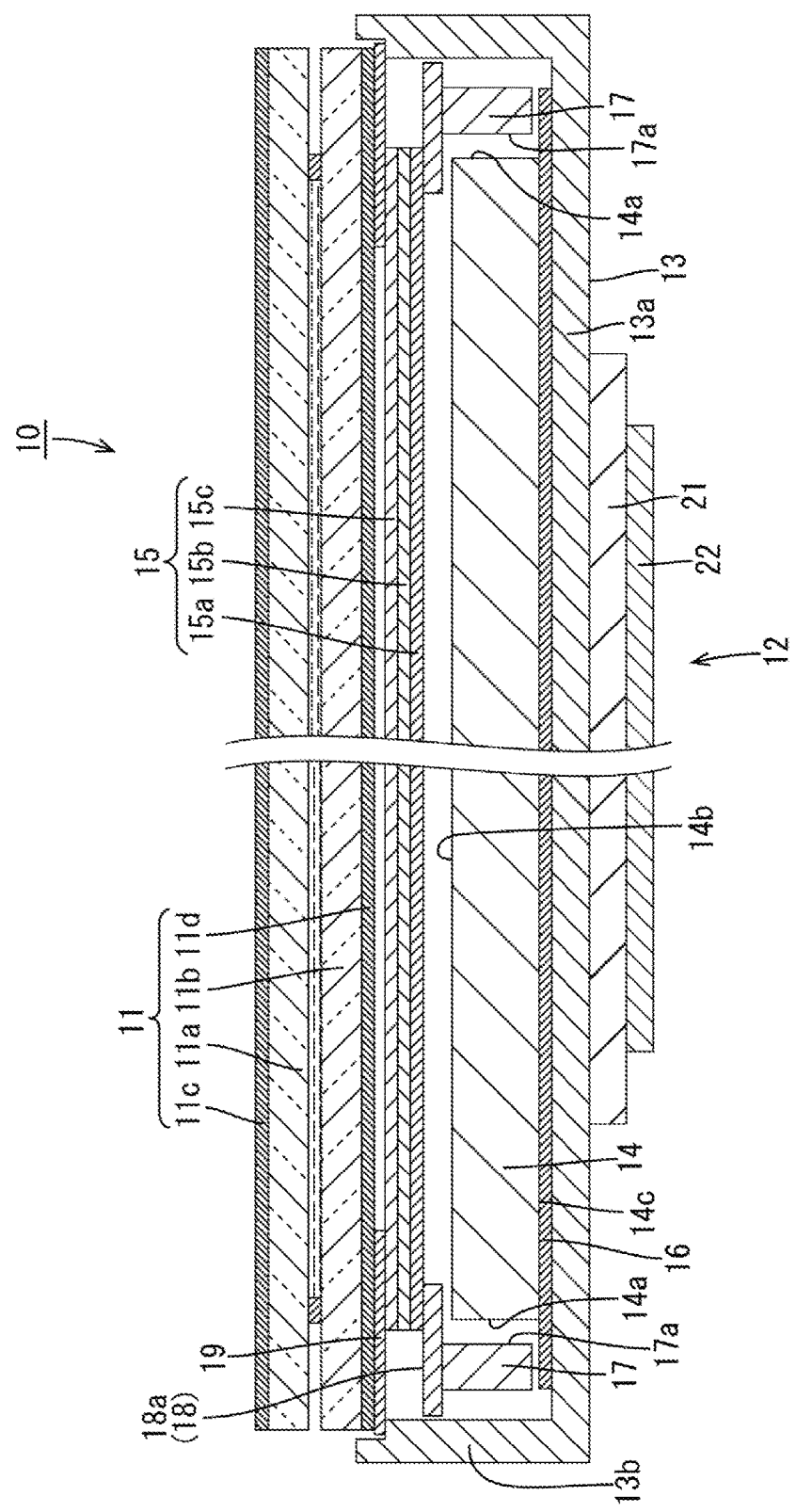
FIG. 4 is a cross-sectional view along line iv-iv in FIG. 3.

The liquid crystal panel 11 will be described in detail. As illustrated in FIG. 1, the liquid crystal panel 11 has a round overall shape in a plan view. As illustrated in FIG. 4, the liquid crystal panel 11 includes a pair of substantially transparent glass substrates 11a and 11b having high light transmissivity and a liquid crystal layer (not illustrated) between the substrates 11a and 11b. The liquid crystal layer includes liquid crystals that are substances having optical characteristics that vary according to application of electric field. The substrates 11a and 11b are bonded together with a sealing member that is not illustrated with a gap corresponding to a thickness of the liquid crystal layer therebetween. The liquid crystal panel 11 includes an oval display area AA (an active area) and an annular non-display area NAA (a non-active area). The display area AA is located at a central area of a screen. Images are displayed in the display area AA. The non-display area NAA is located in an outer edge area of the screen to surround the display area AA. Images are not displayed in the non-display area NAA. The liquid crystal panel 11 is configured to display the images in the display area AA using light supplied by the backlight unit 12. The front side of the liquid crystal panel 11 is a light exiting side. Polarizing plates 11C and 11D are attached to outer surfaces of the substrates 11a and 11b, respectively.

One of the substrates 11a and 11b included in the liquid crystal panel 11 on the front side is a CF substrate 11a and the other on the rear side (the back side) is an array substrate 11b. A number of thin film transistors (TFTs, display components) which are switching components and a number of pixel electrodes are arranged in a matrix on an inner surface of the array substrate 11b in the display area AA. Gate lines and source lines are routed to form a grid and to surround the TFTs and the pixel electrodes. Signals related to images are supplied to the gate lines and the source lines by drivers (not illustrated). The pixel electrodes disposed in quadrilateral areas defined by the gate lines and the source lines are transparent electrodes made of indium tin oxide (ITO) or zinc oxide (ZnO). A gate circuit (a scan circuit) is provided on an inner surface of the array substrate lib in the display area AA. The gate circuit is for supplying gate signals (scan signals) to the gate lines to scan the TFTs in sequence and to selectively drive the TFTs. The TFTs are formed from a semiconductor film and the gate circuit is monolithically formed on the array substrate lib using the semiconductor film (preferably made of oxide semiconductor material) as a base. The gate circuit includes a control circuit for controlling supply of output signals (gate signals) to the TFTs. The gate circuit includes various kinds of circuit components (including control circuit TFTs) of the control circuit dispersed in pixels in a predefined section of the display area AA. According to the configuration in which the gate circuit is disposed in the display area AA, a width of the non-display area AA is reduced in comparison to a configuration in which the gate circuit is in the non-display area NAA. Therefore, frame widths of the liquid crystal panel 11 and the liquid crystal display device 10 can be reduced. Furthermore, according to the configuration in which the gate circuit is disposed in the display area AA, higher flexibility can be achieved in design of an outline of the liquid crystal panel 11. A number of color filters are arranged in a matrix on an inner surface of the CF substrate in the display area AA corresponding to the pixels, respectively. The color filter includes three colors of R, G and B that are alternately arranged. A light blocking layer (a black matrix) is formed among the color filters for reducing color mixture. Counter electrodes are provided on surfaces of the color filters and the light blocking layer to be opposed to the pixel electrodes on the array substrate 11b. Alignment films (not illustrated) are formed on inner surfaces of the substrates 11a and 11b for orienting liquid crystal molecules in the liquid crystal layer.

Figure 2:
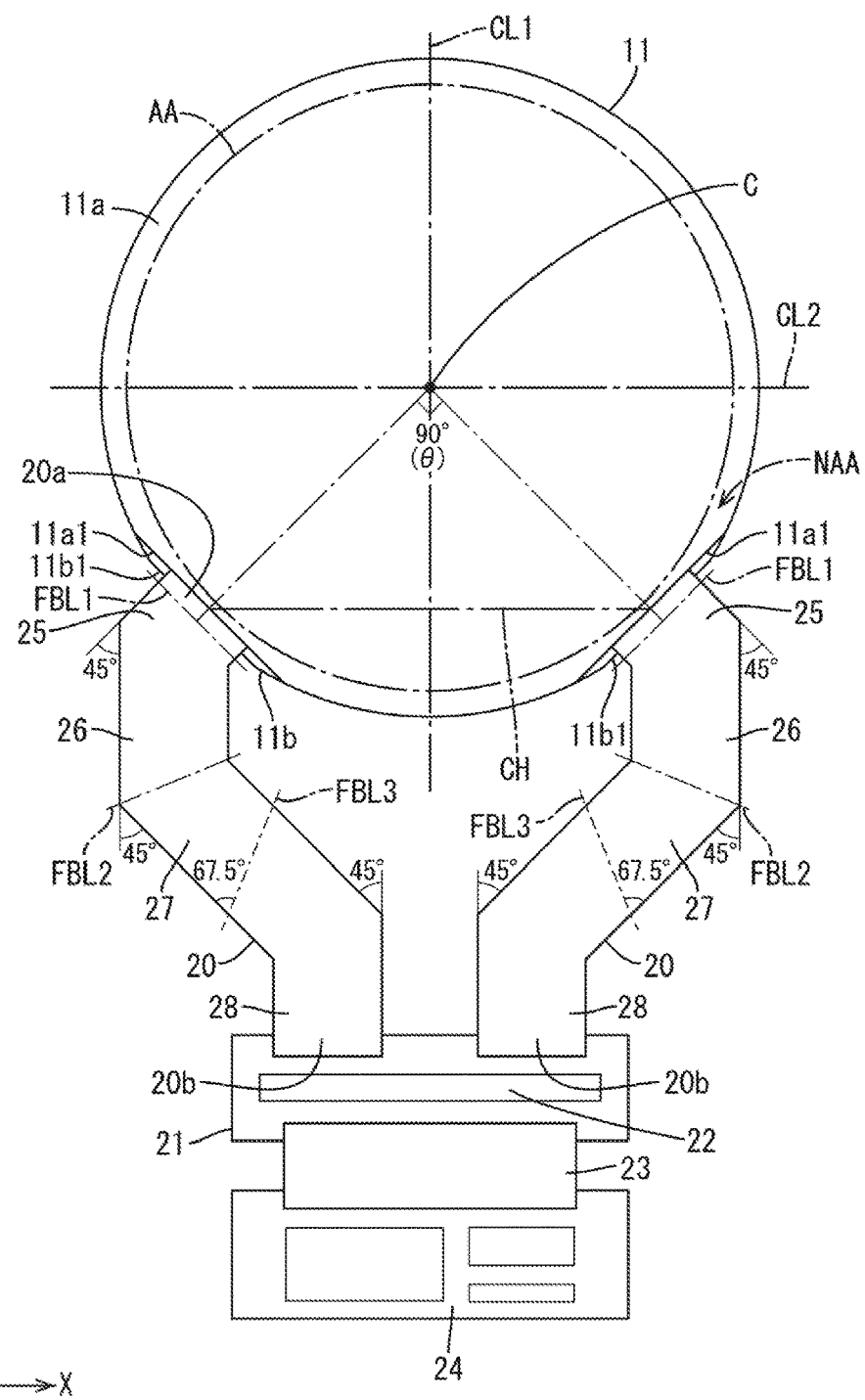
FIG. 2 is a plan view illustrating a liquid crystal panel, flexible circuit boards in an unfolded state, a panel driver board, and a controller board included in the liquid crystal display device.

As illustrated in FIGS. 1 and 2, the CF substrate 11a and the array substrate 11b included in the liquid crystal panel 11 have substantially round shapes as a whole and sections of outer edge portions thereof are cut off with linear cut ends. Namely, the CF substrate 11a and the array substrate 11b have linear edge sections 11a1 and 11b1, respectively. A length of the cut-off sections of the CF substrate 11a is longer than a length of the cut-off sections of the array substrate 11b. Therefore, the linear edge sections of the array substrate 11b is located outer than the linear edge sections of the CF substrate 11a in the radial direction, respectively. The cut-off sections of the CF substrate 11a and the array substrate 11b have bow-shaped outlines, respectively. Flexible circuit boards 20 (panel connecting flexible circuit boards) are mounted to an outer portion of the array substrate 11b in the non-display area NAA at positions corresponding with the linear edge sections 11b1 in the circumferential direction. The flexible circuit boards 20 are for supplying various kinds of signals related to display images. Panel-side terminals that are not illustrated and connected to the flexible circuit boards 20 are provided on the outer peripheral sections. The outer peripheral sections of the array substrate in the non-display area NAA to which the flexible circuit boards 20 are mounted and the panel-side terminals are provided are band-shaped sections with a constant width between the linear edge sections 11a1 of the CF substrate 11a and the linear edge sections 11b1 of the array substrate 11b. The panel 9 side terminals include unit terminals that are arranged at intervals along directions in which the linear edge sections 11a1 and 11b1 extend. Source connecting lines, which are not illustrated, for connecting the panel-side terminals to the source lines and gate connecting lines, which are not illustrated, for connecting the panel-side terminals to the gate lines are provided on the array substrate 11b in the non-display area NAA.

Figure 5:
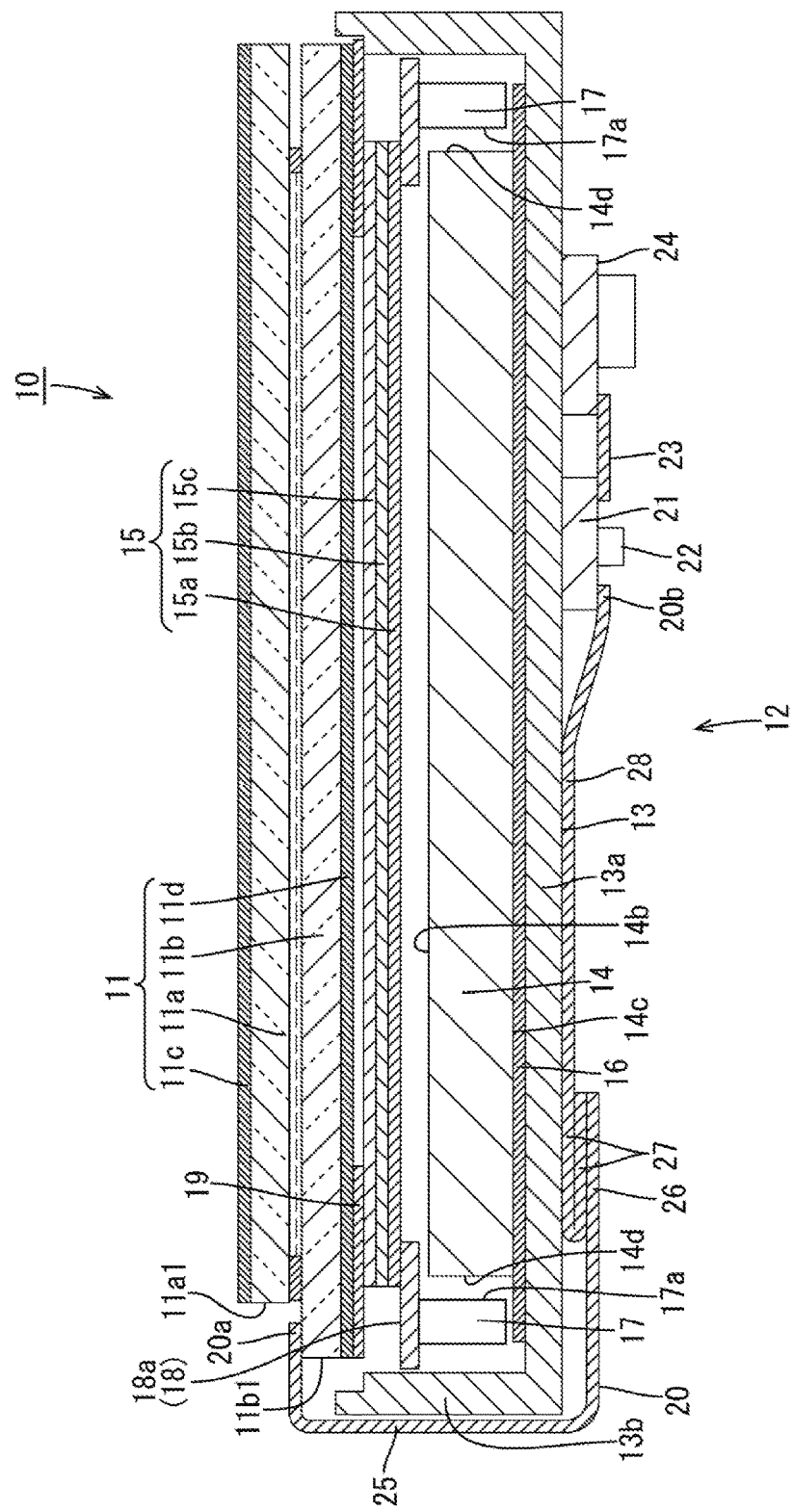
FIG. 5 is a cross-sectional view along line v-v in FIG. 3.

As illustrated in FIGS. 2 and 5, each of the flexible circuit boards 20 (the panel connecting flexible circuit boards) is folded on the outer side of the backlight unit 12 such that a first end 20a of the flexible circuit board 20 is connected to the non-display area NAA of the array substrate 11b (specifically, to the section corresponding to the linear edge section 11b1 in the circumferential direction) and a second end 20b is connected to a panel driver board 21 on the back side of the backlight unit 12. Each of the flexible circuit boards 20 is mounted to the section of the array substrate 11b described above with a width direction thereof corresponding with a direction in which the corresponding linear edge section 11b1 extends (the X-axis direction) and a longitudinal direction thereof corresponding with a direction perpendicular to the direction in which the linear edge section 11b1 extends. The flexible circuit board 20 includes at least a film-shaped base, a number of traces (not illustrated), and a pair of flexible circuit board-side terminals. The base is made of synthetic resin having an insulating property and flexibility (e.g., polyimide-based resin). The traces are formed and routed on the base. The flexible circuit board-side terminals are provided at ends of the base with respect to the longitudinal direction of the base. Detailed configurations of the flexible circuit boards 20 including plan-view shapes will be described later.

Figure 3:
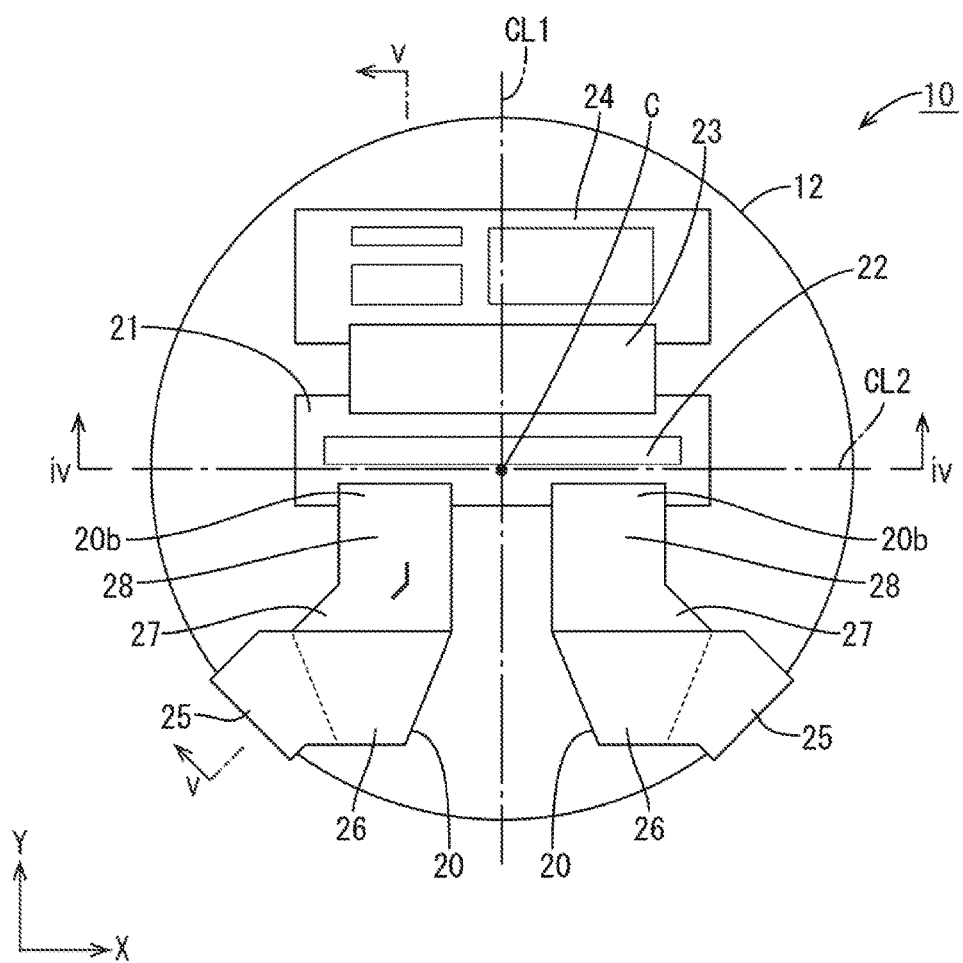
FIG. 3 is a bottom view of the liquid crystal display device including the flexible circuit boards folded and held on a back side of a backlight unit.

As illustrated in FIGS. 3 and 5, the panel driver board 21 connected to the second ends 20b of the flexible circuit boards 20 includes a glass substrate and a driver 22 (a drive controller) mounted on the glass substrate. The driver 22 includes a source circuit (a data circuit) configured to generate and output source signals (data signals, image signals) supplied to the source lines in the liquid crystal panel 11. In the configuration in which the gate drivers are disposed inside the pixels to be dispersed in the liquid crystal panel 11, the panel driver board 21 includes a gate control signal circuit configured to generate and output control signals including gate clock signals required for driving the gate drivers. The panel driver board 21 receives various kinds of signals from a controller board 24 (a panel driver board) via a flexible relay board 23 (a flexible inter-board connector board) 23. A first end and a second end of the flexible relay board 23 are connected to the panel driver board 21 and the controller board 24, respectively. The flexible relay board 23 is connected between the panel driver board 21 and the controller board 24 as a relay. The controller board 24 supplies various kinds of signals related to images to be displayed. The controller board 24 is a portion of the panel driver board 21. Namely, the panel driver board 21 and the controller board 24 together may be referred to as the panel driver board 21. The controller board 24 includes a printed wiring board (PWB) and a display control circuit. The PWB is made of rigid (hard) paper phenol or glass epoxy resin. The display control circuit is mounted on the PWB and configured to output various kinds of signals. The various kinds of signals output by the display control circuit included in the controller board as a signal source are transmitted to the liquid crystal panel 11 via the flexible relay board 23, the panel driver board 21, and the flexible circuit board 20. The TFTs in the display area AA of the liquid crystal panel 11 are driven based on the various kinds of signals to control display of the images.

As described earlier, the panel-side terminals are arranged along the linear edge sections 11a1 and 11b1 of the liquid crystal panel 11. Therefore, the linear edge sections 11a1 and 11b1 can be used as references during mounting of the first ends 20a of the flexible circuit boards 20 on the array substrate 11b. Specifically, if angles of the flexible circuit board-side terminals of the flexible circuit boards 20 that are to be mounted relative to the linear edge sections 11a1 and 11b1 are in a specific range, the flexible circuit board-side terminals are properly positioned relative to the panel-side terminals. During the mounting of the flexible circuit boards 20, positioning pins (not illustrated) are brought into contact with the linear edge sections 11b1 of the array substrate 11b to hold the liquid crystal panel 11 steady. While the liquid crystal panel 11 is held steady, the flexible circuit boards 20 are set such that the angles of the array substrate 11b-side edge portions of the flexible circuit boards 20 relative to the linear edge sections 11a1 and 11b1 are maintained within the range and then the flexible circuit boards 20 are mounted. The flexible circuit board-side terminals and the panel-side terminals are properly positioned and connected to each other.

Next, a configuration of the backlight unit 12 will be described. The backlight unit 12 has a block shape including a substantially round portion in a plan view shape similar to the liquid crystal panel 11 as a whole. As illustrated in FIGS. 1 and 4, the backlight unit 12 includes at least a chassis 13 (a case), light emitting diodes (LEDs) 17, an LED board 18 (a light source board), a light guide plate 14, optical sheets 15, and a reflection sheet 16. The chassis 13 has a substantially a box shape with an opening on the liquid crystal panel 11 side. The LEDs 17 area light source. The LEDs 17 are mounted on the LED board 18. The light guide plate 14 is disposed over the chassis 13 on the front side and configured to guide light from the LEDs 17. The optical sheets 15 are layered on the light guide plate 14 on the front side (the light exit side) to add optical effects on the light exiting from the light guide plate 14 and to direct the light toward the liquid crystal panel 11. The reflection sheet 16 is layered on the chassis 13 and sandwiched between the chassis 13 and the light guide plate 14 to reflect the light toward the light guide plate 14. The backlight unit 12 is configured to convert the light from the LEDs 17 into planar light with the optical effects added by the light guide plate, the optical sheets 15, and the reflection sheet 16 and to emit the light toward the liquid crystal panel 11 on the front side through the opening of the chassis 13. Namely, the front side with respect to the backlight unit 12 is the light exiting side. Components of the backlight unit 12 will be described below. The Z-axis direction in each of the drawings corresponds with a direction normal to a plate surface of each of the light guide plate 14, the optical sheets 15, and the reflection sheet 16 and with a direction in which the chassis 13, the light guide plate 14, the optical sheets 15, and the reflection sheet 16 are overlapped with one another.

Figure 7:
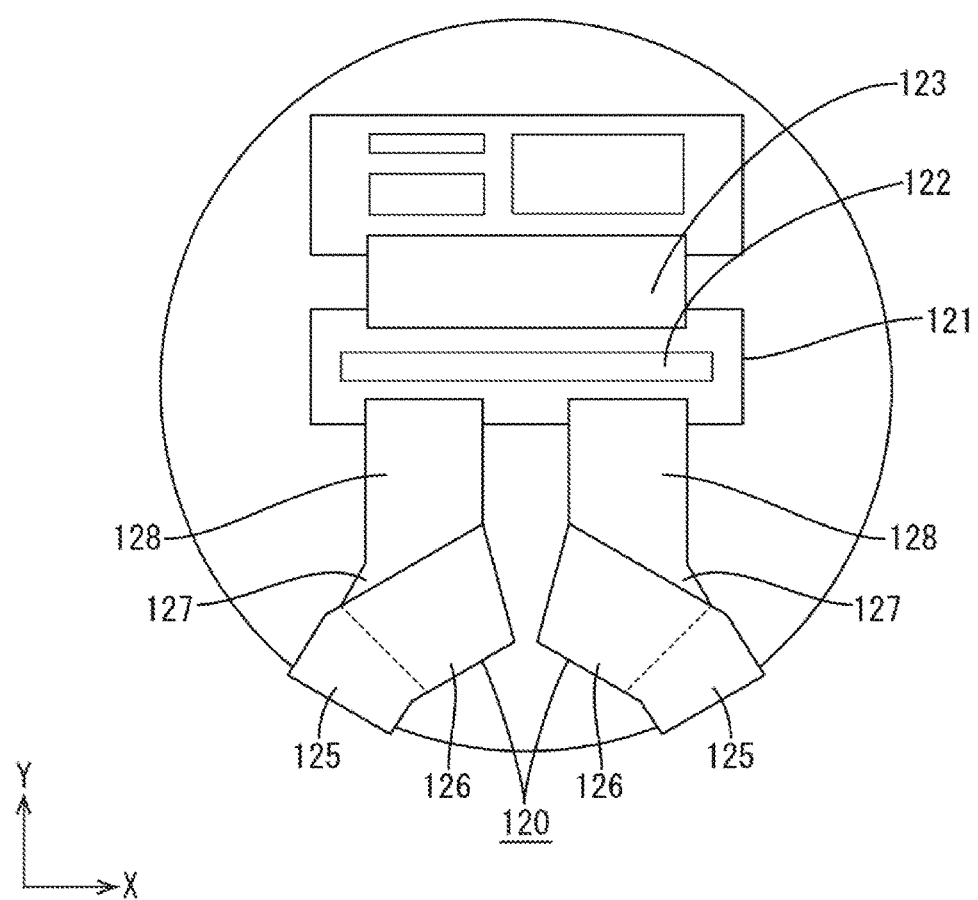
FIG. 7 is a bottom view of a liquid crystal display device including the flexible circuit boards folded and held on a back side of a backlight unit.
Figure 8:
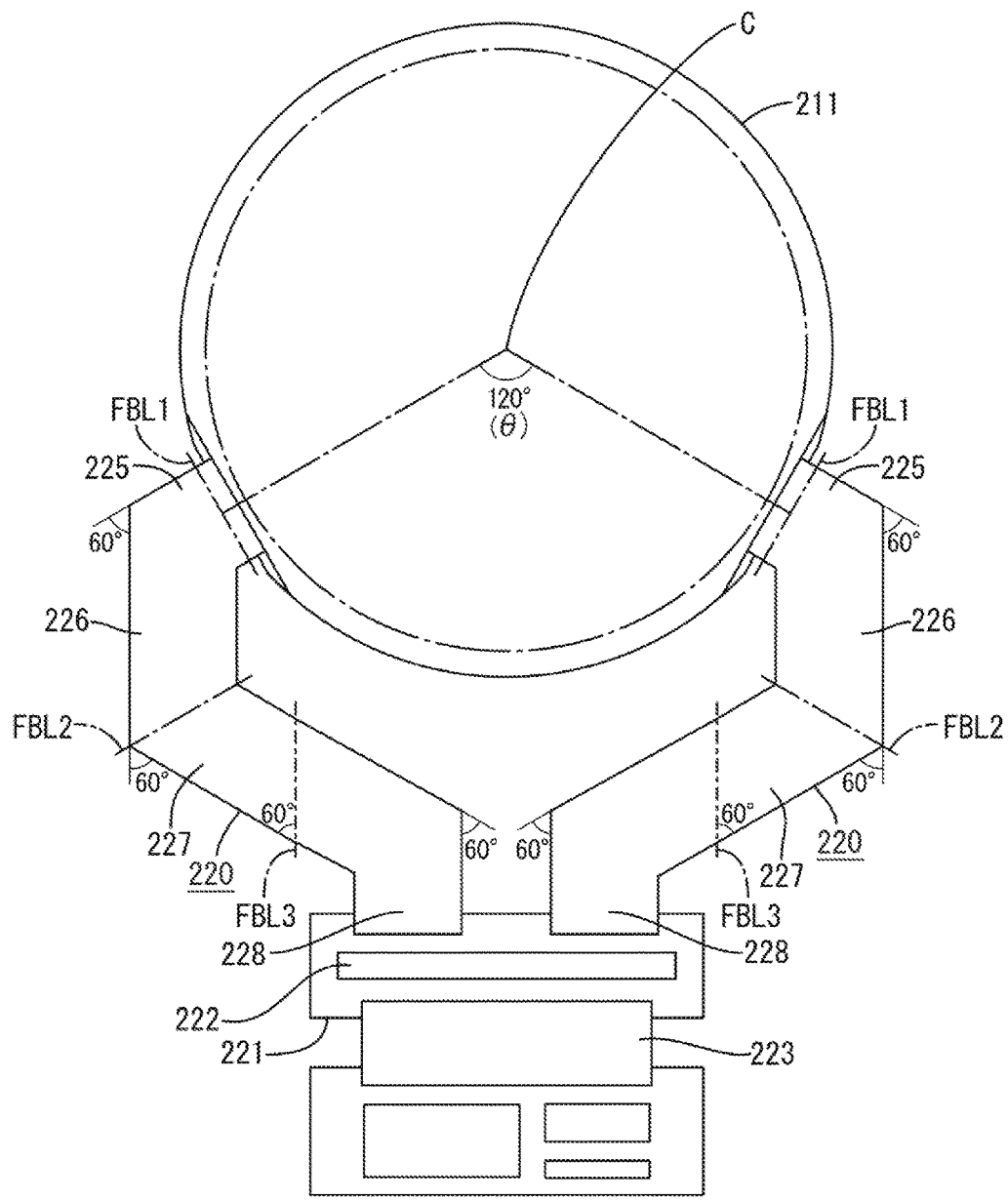
FIG. 8 is a plan view illustrating a liquid crystal panel, flexible circuit boards in an unfolded state, a panel driver board, and a controller board according to a third embodiment of the present invention.

The chassis 13 is made of synthetic resin or metal. As illustrated in FIGS. 7 and 8, the chassis 13 has a substantially round plan view shape and has a substantially box shape (a cylindrical shape with a bottom) with an opening on the front side. The LED board 18, the light guide plate 14, the optical sheets 15, and the reflection sheet 16 are held in the chassis 13. The chassis 13 has a substantially round plan view shape as a whole (viewed in the Z-axis direction). The chassis 13 includes a substantially round bottom 13a and a peripheral wall 13b that projects from an outer edge portion of the bottom 13a toward the front side. The bottom 13a has a plate surface that is parallel to plate surfaces of the light guide plate 14, the optical sheets 15, the reflection sheet 16, and the liquid crystal panel 11 and supports the light guide plate 14, the optical sheets 15, and the reflection sheet 16 from the back side. The peripheral wall 13b is arranged to surround the light guide plate 14, the optical sheets 15, the reflection sheet 16, and the LED board 18 (LED 17) from the outer peripheral side and the peripheral wall 13b has a substantially annular shape as a whole (a substantially round frame shape). A panel fixing tape 19 for fixing the liquid crystal panel 11 to the backlight unit 12 is fixed on a distal end portion of the peripheral wall 13b. A back surface of an outer edge portion of the panel fixing tape 19 is bonded to the distal end portion of the peripheral wall 13b. The panel fixing tape 19 is a double-sided adhesive tape including a base member including surfaces that are both configured as adhesive surfaces. The panel fixing tape 19 is bonded to the peripheral wall 13b, the optical sheet 15 (specifically, a second lens sheet 15C, which will be described later), and the liquid crystal panel 11 to cross over a boundary between the peripheral wall 13b and the optical sheet 15.

As illustrated in FIGS. 1 and 4, each LED 17 includes an LED chip (an LED component) sealed with resin on a base board that is fixed to a plate surface of the LED board 18. The LED chip is a semiconductor light emitting component. The LED 17 includes an anode terminal and a cathode terminal that are not illustrated. When a direct current is fed between the anode terminal and the cathode terminal and the LED 17 is forward biased, the LED chip emits light. The LED chip mounted on the base board has a single main light emission wavelength. Specifically, an LED chip that emits a single color of blue light is used for the LED chip. The resin that seals the LED chip contains phosphors dispersed therein. The phosphors emit light in a predetermined color (for example, green, red, yellow) when excited by blue light emitted from the LED chip. The LED 17 emits white light as a whole. The LED 17 is a side-surface-emitting type LED. The LED 17 has a mounting surface that is mounted on the LED board 18 and a side surface that is adjacent to the mounting surface and the side surface is a light emission surface 17a. The LED 17 has a height that is smaller than a thickness of the light guide plate 14, which will be described later, and the height of the LED 17 is approximately 0.4 mm. The LED 17 emits light having an optical axis that is parallel to a line normal to the light emission surface 17a. The optical axis is referred to as a traveling direction of light rays having greatest light emission intensity among the light rays emitted by the LED 17 (in light distribution).

As illustrated in FIGS. 1 and 4, the LED board 18 is made of insulating material (e.g., polyimide-based resin) and formed in a film shape (or a sheet shape) to have flexibility. The LED board 18 has a plate surface that is parallel to the plate surface of the bottom 13a of the chassis 13 and has a substantially round outline. The LED board 18 includes a board body portion 18a and an extended portion 18b. The board body portion 18a has a closed ring shape that extends in an outer direction of the light guide plate 14, the optical sheets 15, and the reflection sheet 16. The extended portion 18b extends outward from a section of the board body portion 18a in a radial direction. The board body portion 18a formed in the ring shape without ends has an inner diameter dimension that is smaller than an outer diameter of the light guide plate 14 and the reflection sheet 16 and an outer diameter that is about equal to the outer diameter of the reflection sheet 16. The board body portion 18a is disposed over the outer edge portion of the light guide plate 14 on the front side. The board body portion 18a is fixed to the optical sheets 15 that is over the board body portion 18a on the front side (specifically, a diffuser sheet 15a, which will be described later) with a fixing member (not illustrated). Examples of the fixing member include double-sided adhesive tape and an adhesive. Conductive lines (not illustrated) for supplying power to the mounted LEDs 17 are formed on the board body portion 18a to extend in the circumferential direction through patterning. The "radial direction" refers a direction in which a distance from the center of the component having the round shape or the ring shape (e.g., the liquid crystal panel 11, the light guide plate 14, and the LED board 18) changes. The "circumferential direction" refers to a direction in which the distance from the center does not change.

As illustrated in FIGS. 1 and 4, the board body portion 18a of the LED board 18 has a front plate surface and a back plate surface. The LEDs 17 are mounted on the back plate surface. Each terminal of each LED 17 is soldered to the back surface to establish mechanical connection and electric connection therebetween. On the board body portion 18a, the LEDs 17 are annularly arranged in the circumferential direction of the board body portion 18a (to form an annular and curved shape) and at intervals in the circumferential direction. Specifically, on the board body portion 18a, twelve LEDs 17 are arranged at about equal intervals in a circumferential direction such that an angle interval of the LEDs 17 adjacent to each other in the circumferential direction is about 30 degrees. Because the LEDs 17 are arranged at equal intervals in the circumferential direction, light rays from the LED 17 are equally enter the light guide plate 14 with respect to the circumferential direction and thus uneven brightness is less likely to occur in the light exiting from the backlight unit 12. A distance between the adjacent LEDs 17 in the circumferential direction on the board body portion 18a of the LED board 18 is approximately determined by $2\pi r/n$, where r is radius, $\pi$ is pi, and n is the number of the LEDs 17. The radius is a distance from the center of an outer outline or an inner outline of the board body portion 18a to the LED 17. The LEDs 17 are symmetric with respect to the center of the outer outline or the inner outline of the board body portion 18a. The light emission surface 17a of each LED 17 faces the center of the light guide plate 14 (the center of the outer outline or the inner outline of the board body portion 18a) and the optical axes of the LEDs 17 cross one another at the center of the light guide plate 14.

As illustrated in FIG. 1, the extended portion 18b continues to a predefined section of the outer edge portion of the board body portion 18a and extends outward from the board body portion 18a substantially straight in the radial direction. The extended portion 18b includes extended conductive lines (not illustrated) which continue to the conductive lines of the board body portion 18a. Terminals (not illustrated) are exposed at a distal end of the extended portion 18b at an end in the extending direction to continue to the extended conductive lines. The extended portion 18b is projected from the backlight unit 12 via a hole (not illustrated) formed in a portion of the bottom 13a of the chassis 13. The extended portion 18b passed through the hole is connected to an LED driver circuit board disposed on the back of the chassis 13. The LED driver circuit board is not illustrated.

The light guide plate 14 is made of synthetic resin (acrylic resin such as PMMA) and has a substantially round plan-view shape similar to that of the bottom 13a of the chassis 13 as illustrated in FIGS. 1, 4 and 5. The light guide plate 14 has an outer diameter slightly smaller than that of the bottom 13a of the chassis 13. Namely, the light guide plate 14 has an outline that is along the annular arrangement of the LEDs 17 on the LED board 18. The light guide plate 14 is held in the chassis 13 such that a periphery thereof is surrounded by the peripheral wall 13b. The light guide plate 14 is disposed under the liquid crystal panel 11 and the optical sheet 15. The light guide plate 14 includes a peripheral surface. The peripheral surface includes LED opposed sections (a light source opposed section) and LED non-opposed sections (a light source non-opposed section). The LED opposed sections are opposed to the LEDs 17. The LED non-opposed sections are not opposed to the LEDs 17. The LED opposed sections are light entering surfaces 14a through which the light from the LEDs 17 directly enters the light guide plate 14. The LED non-opposed sections are non-light entering surfaces 14d through which the light from the LEDs 17 is less likely to directly enter the light guide plate 14. The peripheral surface of the light guide plate 14 includes the light entering surfaces 14a and the non-light entering surfaces 14d that are alternately arranged in the circumferential direction of the light guide plate 14. The angular intervals of the light entering surfaces 14a and the non-light entering surfaces 14e are determined according to the angular intervals of the adjacent LEDs 17 with respect to the circumferential direction on the LED board 18. A dimension of the light entering surfaces 14a formed in the peripheral surface of the light guide plate 14 in the circumferential direction is about equal to a width of the LEDs 17 and smaller than a dimension of the non-light entering surfaces 14d in the circumferential direction. The thickness of the light guide plate 14 is greater than the height of the LEDs 17. Specifically, the thickness of the light guide plate 14 is about 0.6 mm. In this embodiment, the LED non-opposed sections are referred to as the non-light entering surfaces 14d. However, it is not meant that no light enters the non-light entering surface 14d. For example, light that leaks to the outside through the non-light entering surface 14d may be reflected by the peripheral wall 13b and returned. The returned light may enter the non-light entering surface 14d.

The light guide plate 14 has a pair of front and back plate surfaces. As illustrated in FIG. 4, the front plate surface facing the front side (the liquid crystal panel 11 side) is a light exiting surface 14b through which light exits toward the liquid crystal panel 11. The back plate surface of the light guide plate 14 facing the back side (the reflection sheet 16 side, the bottom 13a side) is an opposite plate surface (a reflection sheet-side plate surface) 14c that is on an opposite side from the light exiting surface 14b. According to such a configuration, an arrangement direction in which the LEDs 17 and the light guide plate 14 are arranged is perpendicular to an arrangement direction in which the optical sheets 15 (the liquid crystal panel 11) and the light guide plate 14 are arranged. The light emitted by each LED 17 enters the light guide plate 14 through the corresponding light entering surface 14a and travels through the light guide plate 14 toward the optical sheets 15 (the front side, the light exit side). The light exits the light guide plate 14 through the light exiting surface 14b that is the front plate surface. The light guide plate 14 includes a light reflecting pattern (not illustrated) including light reflectors on the opposite plate surface 14c for increasing the amount of light exiting through the light exiting surface 14b. The light reflectors included in the light reflecting pattern are light reflecting dots formed with distribution densities that are different according to distances from the light entering surfaces 14a (the LEDs 17). Specifically, the distribution densities of the light reflecting dots of the light reflectors increase as the distances from the light entering surfaces 14a increase. The distribution densities of the light reflecting dots decrease as the distances from the light entering surfaces 14a decrease. The distribution densities of the light reflecting dots are the highest at the center of the light guide plate 14 and the lowest at the periphery of the light guide plate 14. The distribution densities of the light reflecting dots with respect to the circumferential direction of the light guide plate 14 are the highest at the middle of the non-light entering surfaces 14d (a middle between the adjacent light entering surfaces 14a) of the light guide plate 14 and the lowest at the middle of the light entering surface 14a (a middle between the adjacent non-light entering surfaces 14d, on a vertical line to the light emitting surface 17a). With the light reflecting pattern formed with optimized optical design, a proper level of luminance evenness can be achieved in the light exiting the light guide plate 14 through the light exiting surface 14b.

As illustrated in FIGS. 1 and 4, the optical sheets 15 have a substantially round plan-view shape similar to the light guide plate 14 and having an outer diameter slightly larger than that of the light guide plate 14. The optical sheets 15 are on the light exiting surface 14b of the light guide plate 14 on the front side. The optical sheets 15 are between the liquid crystal panel 11 and the light guide plate 14 and configured to pass the light exited from the light guide plate 14 and direct the light to exit toward the liquid crystal panel 11 while adding predefined optical properties to the light. The optical sheets 15 according to this embodiment include three optical sheets including the diffuser sheet 15a and two lens sheets 15b and 15c (a first lens sheet 15b and a second lens sheet 15c). The diffuser sheet 15a includes a substrate made of substantially transparent synthetic resin and diffuser particles for diffusing light. The diffuser particles are dispersed in the substrate. The diffuser sheet 15a is disposed over the light guide plate 14 and the closest to the light guide plate 14 among the optical sheets 15.

As illustrated in FIGS. 1 and 4, each of the lens sheets 15b and 15c includes a substantially transparent synthetic resin substrate and unit lenses provided on one of plate surfaces of the substrate. One of the two lens sheets 15b and 15c directly laid on the diffuser sheet 15a is referred to as a first lens sheet 15b. The other one directly laid on the first lens sheet 15b and disposed the closest to the liquid crystal panel 11 is referred to as a second lens sheet 15c. The first lens sheet 15b includes the unit lenses, each of which extends in a first direction that is parallel to the plate surface of the first lens sheet 15b. The unit lenses are arranged in a second direction that is perpendicular to the first direction. The first lens sheet 15b selectively exerts light collecting effects on exiting light rays in the second direction that is the arrangement direction in which the unit lenses are arranged (anisotropic light collecting effects). The second lens sheet 15c includes unit lenses, each of which extends in the second direction that is parallel to the plate surface of the second lens sheet 15c. The unit lenses are arranged in the first direction that is perpendicular to the second direction. The second lens sheet 15c selectively exerts the light collecting effects on exiting light rays in the first direction that is the arrangement direction in which the unit lenses are arranged. The first lens sheet 15b and the second lens sheet 15c are arranged such that the extending directions of the unit lenses are perpendicular to each other and the arrangement directions of the unit lenses are perpendicular to each other. The back surface of the panel fixing tape 19 is bonded to an outer edge portion of the second lens sheet 15c.

The X-axis direction illustrated in each drawing corresponds with the extending direction in which the unit lenses of the first lens sheet 15b extend (the first direction) and the Y-axis direction corresponds with the extending direction in which the unit lenses of the second lens sheet 15c extend (a second direction). In FIG. 1, stripes parallel to the X-axis direction and stripes parallel to the Y-axis direction depict the unit lenses of the lens sheet 15b and the unit lenses of the lens sheet 15c, respectively.

As illustrated in FIGS. 1 and 4, the reflection sheet 16 is disposed to cover the back surface of the light guide plate 14, that is, the opposite plate surface 14c of the light guide plate 14 on the opposite side from the light exiting surface 14b. The reflection sheet 16 may be a sheet member made of white synthetic resin with a surface having high light reflectivity. The reflection sheet 16 efficiently direct the light that has traveled through the light guide plate 14 and exited the light guide plate 14 through the opposite plate surface 14c toward the front side (the light exiting surface 14b). The reflection sheet 16 has a substantially round shape in a plan view similar to the light guide plate 14 and the optical sheets 15 and has an outer diameter greater than that of the light guide plate 14. Most of the middle portion of the reflection sheet 16 is sandwiched between the light guide plate 14 and the bottom 13a of the chassis 13. An outer edge portion of the reflection sheet 16 is located outer than the peripheral surface of the light guide plate 14. Especially, the portion of the reflection sheet 16 between the light entering surfaces 14a and the LEDs 17 efficiently reflects the light rays from the LEDs 17 toward the light entering surfaces 14a and the reflected light rays enter the light entering surface 14a.

In recent years, enhancement of resolution of display images in the display area AA of the liquid crystal panel 11 is progressing and the number of conductive lines within the display area AA tends to increase. Therefore, an area of the array substrate 11b in which the panel-side terminals are formed tends to increase and thus the width of the flexible circuit board 20 tends to increase. Accordingly, in the non-display area NAA, an area of the array substrate 11b in which the panel-side terminals are formed and the mounting area for the flexible circuit board 20 also increase. Namely, the frame width in the non-display area NAA needs to be increased and thus the overall sizes of the liquid crystal panel 11 and the liquid crystal display device 10 need to be increased.

In the liquid crystal display device 10 according to this embodiment, as illustrated in FIG. 2, the outer portion of the array substrate 11b in the non-display area NAA of the liquid crystal panel 11 includes the linear edge sections 11b1. The flexible circuit boards 20 are mounted to the array substrate 11b at positions corresponding with the linear edge sections 11b1 with respect to the circumferential direction. In this embodiment, the number of linear edge sections 11b1 is equal to the number of flexible circuit boards 20, that is, two (even number). In comparison to a configuration that includes a single linear edge section and a single flexible circuit board, the width of each flexible circuit board 20 is reduced in about half and the length of each linear edge section 11b1 is reduced in about half. Accordingly, the width of the non-display area NAA that corresponds with the outer portion of the liquid crystal panel 11, that is, the frame width can be reduced. This configuration is preferable for reducing the frame size of the liquid crystal display device 10 and for restricting an increase in overall size of the device.

Specifically, as illustrated in FIG. 2, when the liquid crystal panel 11 is divided into halves by a first center line CL1 parallel to the Y-axis direction (the source lines), the flexible circuit boards 20 are in the halves, respectively. The panel-side terminals to which the flexible circuit boards 20 are connected and the linear edge sections 11a1 and 11b1 are in the respective halves. The flexible circuit board 20 (the panel-side terminals and the linear edge sections 11a1 and 11b1) are symmetrically arranged symmetric with respect to the first center line CL1 and mounted on the liquid crystal panel 11. Namely, the first center line CL1 is a line of symmetry for the flexible circuit board 20 that are symmetrically arranged and passes the center C of the liquid crystal panel 11. A center angle between centers of the flexible circuit boards 20 with respect to the width directions is about 90 degrees. The center angle is defined by a line joining the middle point of one of the flexible circuit boards 20 with respect to the width direction and the center C of the liquid crystal panel 11 and a line joining the middle point of the other one of the flexible circuit boards 20 with respect to the width direction and the center C of the liquid crystal panel 11. The linear edge sections 11a1 and 11b1 of the outer edge portion of the liquid crystal panel 11 to which the flexible circuit boards 20 are mounted extend in directions that are perpendicular to each other. In the mounting of the flexible circuit boards 20, linear edge sections 20b1 and 20b2, positions of which correspond with the flexible circuit boards 20 may be used to position the liquid crystal panel 11 relative to the directions that are perpendicular to each other. According to the configuration, the flexible circuit boards 20 can be mounted with high position accuracy. The linear edge sections 11a1 and 11b1 can be used during attachment of component other than the flexible circuit board 20 to the liquid crystal panel 11 to achieve high position accuracy. When the liquid crystal panel 11 is divided into halves by a second center line CL2 that is perpendicular to the first center line CL (the Y-axis direction) and parallel to the X-axis direction, the flexible circuit boards 20 are in one of the halves (the lower half in FIG. 2). The panel-side terminals to which the flexible circuit boards 20 are connected and the linear edge sections 11a1 and 11b1 are in the same half. An arrangement direction in which the flexible circuit boards 20 are arranged is parallel to the second center line CL2 (the X-axis direction). One of the flexible circuit board 20 are arranged at the middle between a point in the outer edge portion of the liquid crystal panel 11 at which the first center line CL1 crosses (the lowest point in FIG. 2) and a point in the outer edge portion of the liquid crystal panel 11 at which the second center line CL2 crosses (the right point in FIG. 2) in the circumferential direction. The other one of the flexible circuit board 20 are arranged at the middle between the point in the outer edge portion of the liquid crystal panel 11 at which the first center line CL1 crosses (the lowest point in FIG. 2) and a point in the outer edge portion of the liquid crystal panel 11 at which the second center line CL2 crosses (the left point in FIG. 2) in the circumferential direction.

Shapes of the flexible circuit boards 20 in a plan view will be described in detail. When the flexible circuit boards 20 in unfolded state illustrated in FIG. 2 are folded several times at folding lines FBL1 to FBL3 indicated by chain lines in FIG. 2, the flexible circuit boards 20 are shifted into folded state illustrated in FIG. 3. The flexible circuit boards 20 in folded state are held on the rear (on the back) of the backlight unit 12 together with the panel driver board 21 and the controller board 24. Each of the flexible circuit boards 20 in unfolded state includes multiple (three in the first embodiment) bending portions between the first end 20a (on the display panel side) and the second end 20b (on the panel driver board side). The bending portions have bending shapes in the plan view. According to the configuration, the second ends 20b of the flexible circuit boards 20 are mounted to the common panel driver board 21 and signals related to image display are supplied to the flexible circuit boards 20 by the common panel driver board 21. In comparison to a configuration in which two separate panel driver boards are required for the flexible circuit boards 20, the number of the panel deriver board 21 is smaller. This configuration is preferable for reducing the cost. Furthermore, the portions of the flexible circuit boards 20 between the first ends 20a and the second ends 20b have the bending shapes in the plan view. Therefore, the lengths of the flexible circuit boards 20 are not large and thus wire resistances can be reduced. By folding, the flexible circuit boards 20 can be easily placed in small space.

Specifically, as illustrated in FIG. 2, each flexible circuit board 20 in the unfolded state has the bending shapes in the plan view such that the second end 20b is closer to the first center line CL1 (on the inner side, a side closer to the other flexible circuit board 20) than the first end 20a with respect to the X-axis direction (in the arrangement direction of the flexible circuit boards 20). According to the configuration, the second end 20b of each flexible circuit board 20 in the unfolded state can be easily mounted to the panel driver board 21 and the second ends 20b are mounted to the panel driver board 21 at positions closer to each other. This configuration is preferable for reducing the size of the panel driver board 21. Furthermore, each flexible circuit board 20 in the unfolded state is less likely to be caught on the other flexible circuit board 20 during transfer. This provides easy handling of the liquid crystal panel 11 and the flexible circuit boards 20. The second ends 20b of the flexible circuit boards 20 are mounted to the same edge portions of the panel driver board 21. According to the configuration, the second ends 20b of the flexible circuit boards 20 can be easily mounted to the panel driver board 21 and the size of the panel driver board 21 can be maintained small.

As illustrated in FIG. 2, the flexible circuit boards 20 have the bending portions in the plan view such that a dimension of an overall area of the flexible circuit boards 20 in the unfolded state in the X-axis direction is smaller than the external dimension of the liquid crystal panel 11. According to the configuration, the flexible circuit boards 20 in the unfolded state do not project from the outline of the liquid crystal panel 11 with respect to the X-axis direction. Therefore, the flexible circuit boards 20 in the unfolded state are less likely to be caught on other components during transfer. This provides further easy handling of the liquid crystal panel 11 and the flexible circuit boards 20.

Next, the shapes of the flexible circuit boards 20 in the unfolded state in the plan view will be described in more detail. As illustrated in FIG. 2, the flexible circuit boards 20 include first portions 25, second portions 26, third portions 27, and fourth portions 28. The first portions 25 include the first ends 20a. In the unfolded state, the first portions 25 are substantially perpendicular to the linear edge sections 11a1 and 11b1, respectively. In the unfolded state, the second portions 26 continue from the first portions 25 at an angle of 45° relative to the first portions 25 on the first center line CL1 side (inward, closer to the other flexible circuit board 20) with respect to the X-axis direction (the direction in which the flexible circuit boards 20 are arranged). In the unfolded state, the third portions 27 continue from the second portions 26 at an angle of 45° relative to the second portions 26 on the first center line CL1 side with respect to the X-axis direction. In the unfolded state, the fourth portions 28 continue from the third portions 27 at an angle of 45° relative to the third portions 27 on sides away from the first center line CL1 (outward, farther from the other flexible circuit board 20) with respect to the X-axis direction. The fourth portions 28 include the second ends 20b. Namely, in the flexible circuit boards 20, the angles of the second portions 26 relative to the first portions 25, the angles of the third portions 27 relative to the second portions 26, and the angles of the fourth portions 28 relative to the third portions 27 are all the same. When an angle defined by a line joining the middle point of the flexible circuit board 20 with respect to the width direction and the center C of the liquid crystal panel 11 and a line joining the middle point of the other flexible circuit board 20 with respect to the width direction and the center C of the liquid crystal panel 11 is θ, the angles are θ/2 or (180°−θ)/2. The second portions 26 and the fourth portions 28 of the flexible circuit boards 20 are parallel to the first center line CL1 (the Y-axis direction). The fourth portions 28 include the second ends 20b. The first portions 25 and the third portions 27 are angled to the first center line CL1 and the second center line CL2 (with an angle of 45°). The first portions 25 including the first ends 20a extend in directions from the center C of the liquid crystal panel 11 to the middle points of the linear edge sections 11a1 and 11b1 with respect to the width direction. Namely, the first portions 25 are substantially perpendicular to the linear edge sections 11a1 and 11b1. The fourth portions 28 including the second ends 20b are closer to the center line CL1 with respect to the X-axis direction in comparison to the first portions 25 and the second portions 26. Furthermore, the fourth portions 28 are substantially perpendicular to the mounting portion of the panel driver board 21 on which the flexible circuit boards 20 are mounted (the upper edge portion in FIG. 2). The portions 25 to 28 of the flexible circuit boards 20 are defined by outer edges of the portions 25 to 28 perpendicular to each other.

Because the second portions 26 of the flexible circuit boards 20 in the unfolded state are parallel to each other, the flexible circuit boards 20 are less likely to spread outward with respect to the arrangement direction of the flexible circuit boards 20 in the unfolded state. According to the configuration, the flexible circuit boards 20 in the unfolded state are further less likely to be caught on other components during transfer. This configuration provides further easier handling of the liquid crystal panel 11 and the flexible circuit boards 20. Furthermore, the angles at the bending points of the flexible circuit boards 20 are all the same. Therefore, even if a tension is applied to the flexible circuit boards 20 during transfer, a stress is less likely to be exerted on a specific bending point. According to the configuration, the flexible circuit boards 20 are less likely to be damaged when the flexible circuit boards 20 are folded.

Next, a relationship between the flexible circuit boards 20 mounted to the outer portion of the liquid crystal panel 11 (in the non-display area NAA) at the different positions with respect to the circumferential direction will be described. As illustrated in FIG. 2, a distance between the second portions 26 of the flexible circuit boards 20 arranged in the X-axis direction to be parallel to each other is smaller than the outer diameter of the liquid crystal panel 11. Furthermore, a distance between the fourth portions 28 arranged in the X-axis direction to be parallel to each other is smaller than the distance between the second portions 26. A difference between the distance between the fourth portions 28 and the distance between the second portions 26 is expressed by 2L·sin α, where α is an angle of each third portion 27 relative to the corresponding second portion 26 and L is a length of the third portion 27. The angle of the third portion 27 relative to the second portion 26, that is, α is expressed by α=θ/2, where θ is the center angle defined by the line joining the middle point of the flexible circuit board 20 with respect to the width direction and the center C of the liquid crystal panel 11 and the line joining the middle point of the other flexible circuit board 20 with respect to the width direction and the center C of the liquid crystal panel 11. The second ends 20b of the flexible circuit boards 20 included in the fourth portions 28 are connected to the same edge portion of the panel driver board 21. The dimension of the panel driver board 21 in the X-axis direction is about equal to or smaller than the distance between the second portions 26. Namely, the size of the panel driver board 21 is sufficiently reduced. The length of the second portion 26 of each flexible circuit board 20 is smaller than a half of a chord CH joining the middle points of the flexible circuit boards (or the linear edge sections 11a1 and 11b1) with respect to the width directions (see FIG. 3). The length of each second portion 26 is smaller than r·cos β, where r is a radius of the liquid crystal panel 11 and β is an angle defined by the line joining the middle point of the flexible circuit board 20 with respect to the width direction and the center C of the liquid crystal panel 11 and the chord CH. Because the angle β is expressed by β=90°−(θ/2), where θ is the center angle defined by the line joining the middle point of the flexible circuit board 20 with respect to the width direction and the center C of the liquid crystal panel 11 and the line joining the middle point of the other flexible circuit board 20 with respect to the width direction and the center C of the liquid crystal panel 11, the length of the second portion 26 may be expressed by r·cos β=r·sin(θ/2). According to the configuration, when the flexible circuit boards 20 are in the folded state, the second portions 26 that extend along the X-axis direction are less likely to cross over the first center line CL1 and to overlap each other (see FIG. 3). Therefore, interference is less likely to occur between the signals transmitting through the flexible circuit boards 20 and thus deterioration of the signals such as rounding of the signals can be reduced. The shapes of the flexible circuit boards 20 are symmetric with respect to the first center line CL1.

Next, how to fold the flexible circuit boards 20 will be described in detail. Each flexible circuit board 20 in the unfolded state illustrated in FIG. 2 is folded along three folding lines FBL1 to FBL3 into inverted V shapes or V shapes and brought into the folded state illustrated in FIG. 3. As illustrated in FIG. 2, the first portions 25 of the flexible circuit boards 20 are folded along the first folding lines FBL1 parallel to the width direction (the linear edge sections 11a1 and 11b1) into the inverted V shapes. Boundary portions between the second portions 26 and the third portions 27 are folded along the second folding lines FBL2 that correspond with boundaries into the inverted V shapes or the V shapes. The third portions 27 are folded along the third folding lines FBL3 into the V shapes or the inverted V shapes. An angle defined by each third folding line FBL3 and the outer edge of the corresponding third portion 27 on the lower side in FIG. 2 (on the panel driver board 21 side in the unfolded state, farther from the center C of the liquid crystal panel 11) on the second portions 26 side is a predefined angle. The first folding lines FBL1 are set at positions to overlap the linear edge sections 11b1 of the array substrate 11b or slightly outer than that positions in the first portions 25. In the folded state, only small sections of the first portions 25 project from the outline of the liquid crystal panel 11. When the flexible circuit boards 20 are folded along the first folding lines FBL1, the second portions 26 are oriented parallel to the X-axis direction (see FIG. 3). In this section, the expression "folded . . . into the inverted V shape(s)" refers to the vertex(es) pointing toward a viewer of the drawing (as if projecting from a surface of the paper of FIG. 2 closer to the viewer, on the front side) viewing in the direction normal to the surface of the drawing (Z-axis direction). The expression "folded . . . into the V shape(s)" refers to the vertex(es) pointing opposite from the viewer (as if projecting from a back surface of the paper of FIG. 2 farther from the viewer, on the back side) viewing in the direction normal to the surface of the drawing.

The second folding lines FBL2 are set at the boundaries between the second portions 26 and the third portions 27. Therefore, the second portions 26 of the flexible circuit boards 20 in the folded state are less likely to overlap each other. Furthermore, each second portion 26 and the third portion 27 continuing from the second portion 26 are parallel to each other (an entire arc of the second portion 26 is over the third portion 27 in the plan view), that is, on top of each other and thus are efficiently held (see FIG. 3). An angle defined by each third folding line FBL3 and the outer edge of the corresponding third portion 27 on the lower side in FIG. 2 (farther from the center C of the liquid crystal panel 11) on the second portion 26 side is 67.5°. Namely, when the angle defined by the line joining the middle point of the flexible circuit board 20 with respect to the width direction and the center C of the liquid crystal panel 11 and the line joining the middle point of the other flexible circuit board 20 with respect to the width direction and the center C of the liquid crystal panel 11 is θ, the angle is expressed by [(180°−(θ/2)]/2. When the flexible circuit boards 20 are in the folded state, the fourth portions 28 are parallel to each other and extend in the Y-axis direction. Therefore, the fourth portions 28 do not overlap each other (see FIG. 3). According to the configuration, the flexible circuit boards 20 are held in small space at the back of the backlight unit 12. Furthermore, the flexible circuit boards 20 are less likely to overlap each other. Therefore, interference is less likely to occur between the signals transmitting through the flexible circuit boards 20 and thus deterioration of the signals such as rounding of the signals can be reduced.

This embodiment has the configuration described above. Next, effects regarding the flexible circuit boards 20 in the production of the liquid crystal display device 10 will be described. In the production of the liquid crystal display device 10, the first ends 20a of the flexible circuit boards 20 and the second ends 20b of the flexible circuit boards 20 are connected (mounted) to the liquid crystal panel 11 and the panel driver board 21, respectively. Then, the flexible circuit boards 20 are folded along the folding lines FBL1 to FBL3 and held on the back of the backlight unit 12 together with the panel driver board 12.

Specifically, as illustrated in FIG. 2, the flexible circuit boards 20 are folded along the first folding lines FBL1 into the inverted V shapes, along the second folding lines FBL2 into the inverted V shapes, and along the third folding lines FBL3 into the V shapes. When the flexible circuit boards 20 are folded along the first folding lines FBL1 into the inverted V shapes, the first portions 25 of the flexible circuit boards 20 are passed across an outer surface of a sidewall of the backlight unit 12 and to the back of the backlight unit 12 (see FIG. 5). The second portions 26 are parallel to each other and parallel to the X-axis direction on the back of the backlight unit 12 (see FIG. 3). The second portions 26 of the flexible circuit boards 20 do not overlap each other and adjacent to each other with respect to the X-axis direction with the first center line CL1 therebetween. When the flexible circuit boards 20 are folded along the second folding lines FBL2 into the V shapes, the third portions 27 are placed over the second portions 26 on the front side and sandwiched between the second portions 26 and the backlight unit 12 (see FIG. 5). The third portions 27 are parallel to the second portions 26 (see FIG. 3). When the flexible circuit boards 20 are folded along the third folding lines FBL3 into the V shapes, the third portions 27 are folded between the second portions 26 and the backlight unit 12 (see FIG. 5). The fourth portions 28 are parallel to each other and parallel to the Y-axis direction (see FIG. 3). As illustrated in FIGS. 3 and 5, the flexible circuit boards 20 are efficiently held on the back of the backlight unit 12 without overlapping each other. Therefore, stress is less likely to exert on the flexible circuit boards 20 that is held and thus high reliability in connection is achieved. Because the deterioration of the signals is less likely to occur, high display quality is achieved. In the flexible circuit boards 20, paths from the first ends 20a to the second ends 20b are streamlined. The length of the paths is sufficiently small and thus the wire resistances are sufficiently low. Therefore, the deterioration of the signals is less likely to occur.

The flexible circuit boards 20 may be folded in the different manner. For example, the flexible circuit boards 20 may be folded along the first folding lines FBL1 into the inverted V shapes as described above, along the second folding lines FBL2 into the V shapes, and along the third folding lines FBL3 into the inverted V shapes. When the flexible circuit boards 20 are folded along the second folding lines FBL2 into the V shapes, the second portions 26 are placed over the third portions 27 on the front side and sandwiched between the third portions 27 and the backlight unit 12. When the flexible circuit boards 20 are folded along the third folding lines FBL3 into the inverted V shapes, the third portions 27 are folded and placed over the second portions 26 on the back side. Namely, the second portions 26 are pressed by the folded third portions 27 from the back side.

As described above, the liquid crystal display device 10 according to this embodiment (the display device) includes the liquid crystal panel 11 (the display panel), the panel driver board 21, and the flexible circuit boards 20. The liquid crystal panel 11 includes the linear edge portions 11a1 and 11b1 that are linear sections of the outer edge portion of the liquid crystal panel 11 having the substantially round shape. The panel driver board 21 is configured to supply the signals for image display to the liquid crystal panel 11. The first ends 20a of the flexible circuit boards 20 are mounted to the liquid crystal panel 11 in the non-display area NAA (the outer portion) such that the first ends 20a correspond with the orientation of the linear edge portions 11a1 and 11b1 with respect to the circumferential direction. The second ends 20b of the flexible circuit boards 20 are mounted to the panel driver board 21. The portions of the flexible circuit boards 20 joining the first ends 20a and the second ends 20b have bending shapes in the plan view.

Because the first ends 20a of the flexible circuit boards 20 are mounted to the liquid crystal panel 11 in the non-display area NAA such that the first ends 20a correspond with the orientation of the linear edge portions 11a1 and 11b1 with respect to the circumferential direction, the width of each flexible circuit board 20 can be reduced and the length of each linear edge section 11a1, 11b1 can be reduced. According to the configuration, the width of the non-display area NAA of the liquid crystal panel 11, that is, the width of the frame can be reduced. This configuration is preferable for reducing the frame size and for restricting an increase in overall size. In the mounting of the flexible circuit boards 20, the flexible circuit boards 20 can be positioned relative to the liquid crystal panel 11 using the linear edge sections 11a1 and 11b1.

Because the second ends 20b of the flexible circuit boards 20 are mounted to the panel driver board 21, the signals related to the image display are supplied to the flexible circuit boards 20 by the common panel driver board 21. In comparison to a configuration in which the same number of panel driver boards is required for the flexible circuit boards 20, the number of the panel driver board 21 and the number of the drivers 22 are smaller. Therefore, this configuration is preferable for reducing the cost. Furthermore, the portion of each flexible circuit board 20 joining the first end 20a and the second end 20b has the bending shape in the plan view. Namely, the length of the flexible circuit board is not large. According to the configuration, the wire resistances can be reduced and the folded flexible circuit boards 20 can be held in the small space. "The flexible circuit boards 20" may include physically separated and independent flexible circuit boards 20 and flexible circuit boards 20 including portions that are physically connected with each other.

The second ends 20b of the flexible circuit boards 20 are parallel to each other and mounted to the same edge portion of the panel driver board 21. According to the configuration, the second ends 20b of the flexible circuit boards 20 can be easily mounted to the panel driver board 21. Furthermore, a dimension of a wiring layout on the panel driver board 21 for connecting the second ends 20b to the drivers 22 is small. This configuration is preferable for maintaining the size of the panel driver board 21 small.

The portion of each flexible circuit board 20 joining the first end 20a and the second end 20b has the bending shape such that the second end 20b is located inner than the first end 20a in the arrangement direction of the flexible circuit boards 20 in the unfolded state. According to the configuration, the second ends 20b can be easily mounted to the panel driver board 21 before folding the flexible circuit boards 20 in the unfolded state. Furthermore, the second ends 20b are mounted to the panel driver board 21 at positions further closer to each other. This configuration is preferable for reducing the size of the panel driver board 21. Furthermore, the flexible circuit boards 20 in the unfolded state are less likely to be caught on other components. This configuration provides easy handling of the liquid crystal panel 11 and the flexible circuit boards 20.

The portion of each flexible circuit board 20 joining the first end 20a and the second end 20b has the bending shape such that the flexible circuit boards 20 in the unfolded state are within the outline of the liquid crystal panel 11 with respect to the arrangement direction of the flexible circuit boards 20. According to the configuration, the flexible circuit boards 20 in the unfolded state are less likely to project from the outline of the liquid crystal panel 11 with respect to the arrangement direction of the flexible circuit boards 20. Therefore, the flexible circuit boards 20 in the unfolded state are less likely to be caught on other components during transfer. This configuration provides further easier handling of the liquid crystal panel 11 and the flexible circuit boards 20.

The center angle θ is defined by the line joining the middle point of the flexible circuit board 20 with respect to the width direction and the center C of the liquid crystal panel 11 and the line joining the middle point of the other flexible circuit board 20 with respect to the width direction and the center C of the liquid crystal panel 11. The flexible circuit boards 20 include the first portions 25, the second portions 26, the third portions 27, and the fourth portions 28. The first portions 25 include the first ends 20a and extend perpendicular to the linear edge sections 11a1 and 11b1 when the flexible circuit boards 20 are in the unfolded state. In the unfolded state, the second portions 26 continue from the first portions 25 at the angle of θ/2 relative to the first portions 25 to turn inward with respect to the arrangement direction. In the unfolded state, the third portions 27 continue from the second portions 26 at the angle of θ/2 relative to the second portions 26 to turn inward with respect to the arrangement direction. In the unfolded state, the fourth portions 28 continue from the third portions 27 at the angle of θ/2 relative to the third portions 27 to turn outward with respect to the arrangement direction. The fourth portions 28 include the second ends 20b. According to the configuration, the second portions 26 of the flexible circuit boards 20 in the unfolded state are parallel to each other. In the unfolded state, the flexible circuit boards 20 are less likely to spread outward with respect to the arrangement direction. Therefore, the flexible circuit boards 20 are less likely to be caught on other components during transfer. This configuration provides further easy handling of the liquid crystal panel 11 and the flexible circuit boards 20. The angles at the turning points of the flexible circuit boards 20 are all the same. According to the configuration, the stress is less likely to be exerted on a specific turning point even if the tension is applied to the flexible circuit boards 20 during transfer. Therefore, the flexible circuit boards 20 are less likely to be damaged from folding. Because the second ends 20b of the flexible circuit boards 20 in the unfolded state are parallel to each other, the second ends 20b can be easily mounted to the panel driver board 21.

The flexible circuit boards 20 are folded such that the first portions 25 are folded along the first folding lines FBL1 (folding lines) parallel to the linear edge sections 11a1 and 11b1 into the inverted V shapes, the portions around the boundaries between the second portions 26 and the third portions 27 are folded along the second folding lines FBL2 (boundary lines) into the inverted V shapes or the V shapes, and the third portions 27 are folded along the third folding lines FBL3 that are at the angle of [(180°−(θ/2)]/2 relative to the outer edges of the third portions 27 farther from the center of the liquid crystal panel 11 when the flexible circuit boards 20 are in the unfolded state on the second portion 26 sides into the V shapes or the inverted V shapes. Because the flexible circuit boards 20 are folded, the panel driver board 21 can be held on the back side of the liquid crystal panel 11. The folded flexible circuit boards 20 including the second portions 26 and the third portions 27 that overlap each other are held in the small space. Depending on the length of the second portions 26, the flexible circuit boards 20 are less likely to overlap each other. Therefore, interference is less likely to occur between the signals that transmit through the flexible circuit boards 20.

The center angle θ is defined by the line joining the middle point of the flexible circuit board 20 with respect to the width direction and the center C of the liquid crystal panel 11 and the line joining the middle point of the other flexible circuit board 20 with respect to the width direction and the center C of the liquid crystal panel 11. The flexible circuit boards 20 include at least the first portions 25 and the second portions 26. The first portions 25 of the flexible circuit boards 20 in the unfolded state extend perpendicular to the linear edge sections 11a1 and 11b1. In the unfolded state, the second portions 26 continue from the first portions 25 at the angle of θ/2 relative to the first portions 25 to turn inward in the arrangement direction of the flexible circuit boards 20. Because the second portions 26 of the flexible circuit boards 20 extend parallel to each other, the flexible circuit boards 20 in the unfolded state before folding are less likely to spread outward. According to the configuration, the flexible circuit boards 20 in the unfolded state are less likely to be caught on other components during transfer. This configuration provides easy handling of the liquid crystal panel 11 and the flexible circuit boards 20.

Second Embodiment

A second embodiment of the present invention will be described with reference to FIGS. 6 and 7. The second embodiment includes flexible circuit boards 120, arrangement and shapes of which in the plan view are different from the first embodiment. Configurations, functions, and effects similar to those of the first embodiment will not be described.

Figure 6:
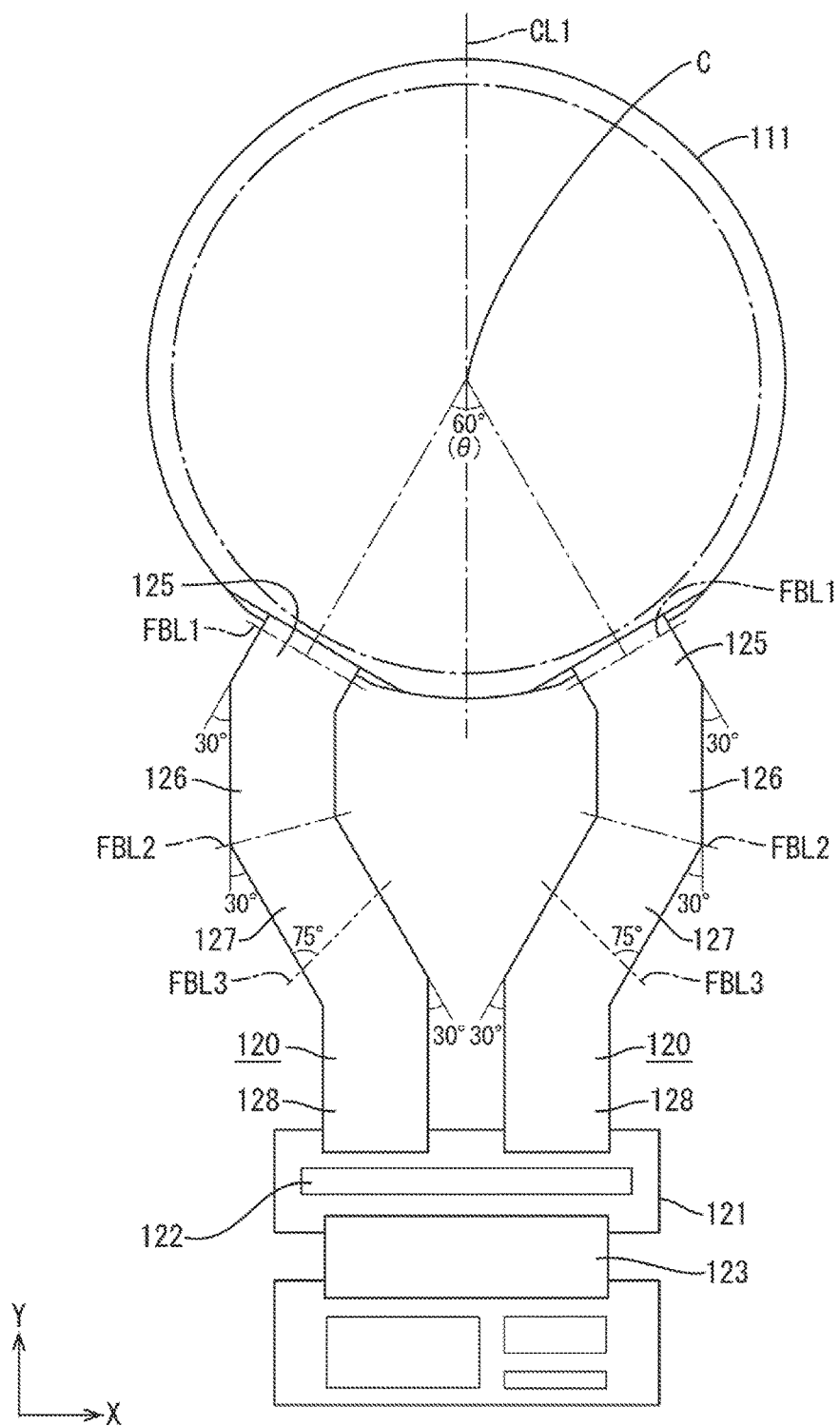
FIG. 6 is a plan view illustrating a liquid crystal panel, flexible circuit boards in an unfolded state, a panel driver board, and a controller board according to a second embodiment of the present invention.

As illustrated in FIG. 6, two flexible circuit boards 120 according to this embodiment are mounted to a liquid crystal panel 111 such that a center angle defined by a line joining the middle point of the flexible circuit board 120 with respect to the width direction and the center C of the liquid crystal panel 111 and a line joining the middle point of the other flexible circuit board 120 with respect to the width direction and the center C of the liquid crystal panel 111 is 60°. When the liquid crystal panel 11 is divided into two regions (halves) by a first center line CL1 perpendicular to an arrangement direction in which the flexible circuit boards 120 are arranged, the middle point of each half with respect to the arrangement direction and the middle point of the corresponding flexible circuit board 120 mounted to an outer portion of the liquid crystal panel 111 with respect to the width direction substantially correspond with each other with respect to the arrangement direction. Conductive lines on the liquid crystal panel 111 can be evenly connected to a first portion and a second portion of each flexible circuit board 120 sandwiching a middle portion with respect to the width direction. According to the configuration, a frame size of the liquid crystal panel 111 can be reduced. The flexible circuit boards 120 have plan-view shapes described below. The flexible circuit boards 120 include first portions 125, second portions 126, third portions 127, and fourth portions 128. Angles of the second portions 126 relative to the first portions 125, angles of the third portions 127 relative to the second portions 126, and angles of the fourth portions 128 relative to the third portions 127 are 30°. The center angle is defined by the line joining the middle point of the flexible circuit board 120 with respect to the width direction and the center C of the liquid crystal panel 111 and the line joining the middle point of the other flexible circuit board 120 with respect to the width direction and the center C of the liquid crystal panel 111 is referred to as θ. The angles are θ/2 but not (180°−θ)/2. Although the second portions 126 and the fourth portions 128 of the flexible circuit boards 120 in the unfolded state are parallel to each other and parallel to the Y-axis direction, the second portions 126 of the flexible circuit boards 120 in the folded state are angled to the X-axis direction and the Y-axis direction (see FIG. 7). As illustrated in FIG. 7, in the folded state, the second portions 126 extend from the boundaries with the first portions 125 to the boundary with the third portions 127 to become closer to a panel driver board 121 with respect to the Y-axis direction.

As illustrated in FIGS. 6 and 7, the flexible circuit boards 120 are folded along the folding lines FBL1 to FBL3. The third folding lines FBL3 are defined such that an angle between each third folding line FBL3 and an outer edge of the corresponding third portion 127 on the lower side in FIG. 6 (farther from the center C of the liquid crystal panel 111) on the second portion 126 side is 75°. The angle is expressed by $[(180°-(\theta/2)]/2$, where $\theta$ is the center angle defined by the line joining the middle point of the flexible circuit board 120 with respect to the width direction and the center C of the liquid crystal panel 111 and the line joining the middle point of the other flexible circuit board 120 with respect to the width direction and the center C of the liquid crystal panel 111. When the flexible circuit boards 120 are in the folded state, the fourth portions 128 are parallel to each other and extend along the Y-axis direction (see FIG. 7).

Third Embodiment

A third embodiment of the present invention will be described with reference to FIG. 8 or 9. The third embodiment includes flexible circuit boards 220, arrangement and shapes of which in the plan view are different from the first embodiment. Configurations, functions, and effects similar to those of the first embodiment will not be described.

As illustrated in FIG. 8, two flexible circuit boards 220 according to this embodiment are mounted to a liquid crystal panel 211 such that a center angle defined by a line joining the middle point of the flexible circuit board 220 with respect to the width direction and the center C of the liquid crystal panel 211 and a line joining the middle point of the other flexible circuit board 220 with respect to the width direction and the center C of the liquid crystal panel 211 is 120°. The flexible circuit boards 220 have plan-view shapes described below. The flexible circuit boards 220 include first portions 225, second portions 226, third portions 227, and fourth portions 228. Angles of the second portions 226 relative to the first portions 225, angles of the third portions 227 relative to the second portions 226, and angles of the fourth portions 228 relative to the third portions 227 are 60°. The center angle defined by the line joining the middle point of the flexible circuit board 220 with respect to the width direction and the center C of the liquid crystal panel 211 and the line joining the middle point of the other flexible circuit board 220 with respect to the width direction and the center C of the liquid crystal panel 211 is referred to as $\theta$. The angles are $\theta/2$ but not $(180°-\theta)/2$. Although the second portions 226 and the fourth portions 228 of the flexible circuit boards 220 in the unfolded state are parallel to each other and parallel to the Y-axis direction, the second portions 226 of the flexible circuit boards 220 in the folded state are angled to the X-axis direction and the Y-axis direction (see FIG. 9). As illustrated in FIG. 9, in the folded state, the second portions 226 extend from the boundaries with the first portions 225 to the boundary with the third portions 227 to become closer to a panel driver board 221 with respect to the Y-axis direction.

Figure 9:
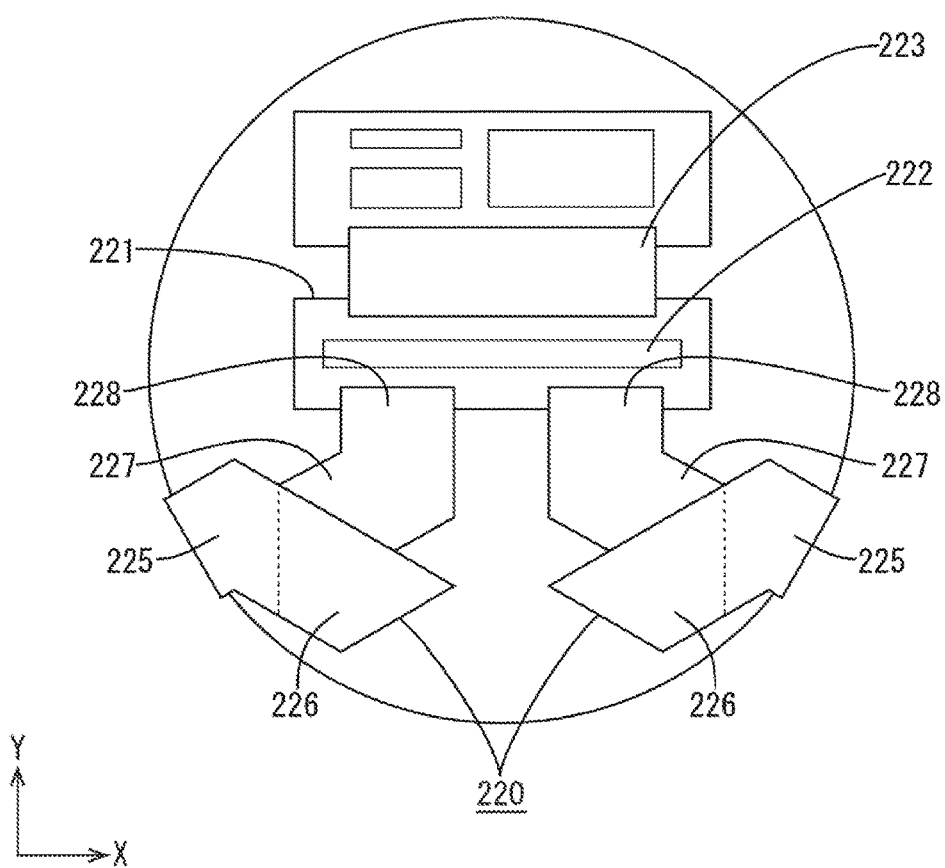
FIG. 9 is a bottom view of a liquid crystal display device including the flexible circuit boards folded and held on a back side of a backlight unit.

As illustrated in FIGS. 8 and 9, the flexible circuit boards 220 are folded along the folding lines FBL1 to FBL3. The third folding lines FBL3 are defined such that an angle between each third folding line FBL3 and an outer edge of the corresponding third portion 227 on the lower side in FIG. 8 (farther from the center C of the liquid crystal panel 211) on the second portion 226 side is 60°. The angle is expressed by $[180°-(\theta/2)]/2$, where $\theta$ is the center angle defined by the line joining the middle point of the flexible circuit board 220 with respect to the width direction and the center C of the liquid crystal panel 211 and the line joining the middle point of the other flexible circuit board 220 with respect to the width direction and the center C of the liquid crystal panel 211. When the flexible circuit boards 220 are in the folded state, the fourth portions 228 are parallel to each other and extend along the Y-axis direction (see FIG. 9). The third folding lines FBL3 are parallel to the Y-axis direction.

Fourth Embodiment

A fourth embodiment will be described with reference to FIGS. 10 to 11. The fourth embodiment includes flexible circuit boards 320, shapes of which in the plan view are different from the first embodiment. Configurations, functions, and effects similar to those of the first embodiment will not be described.

Figure 10:
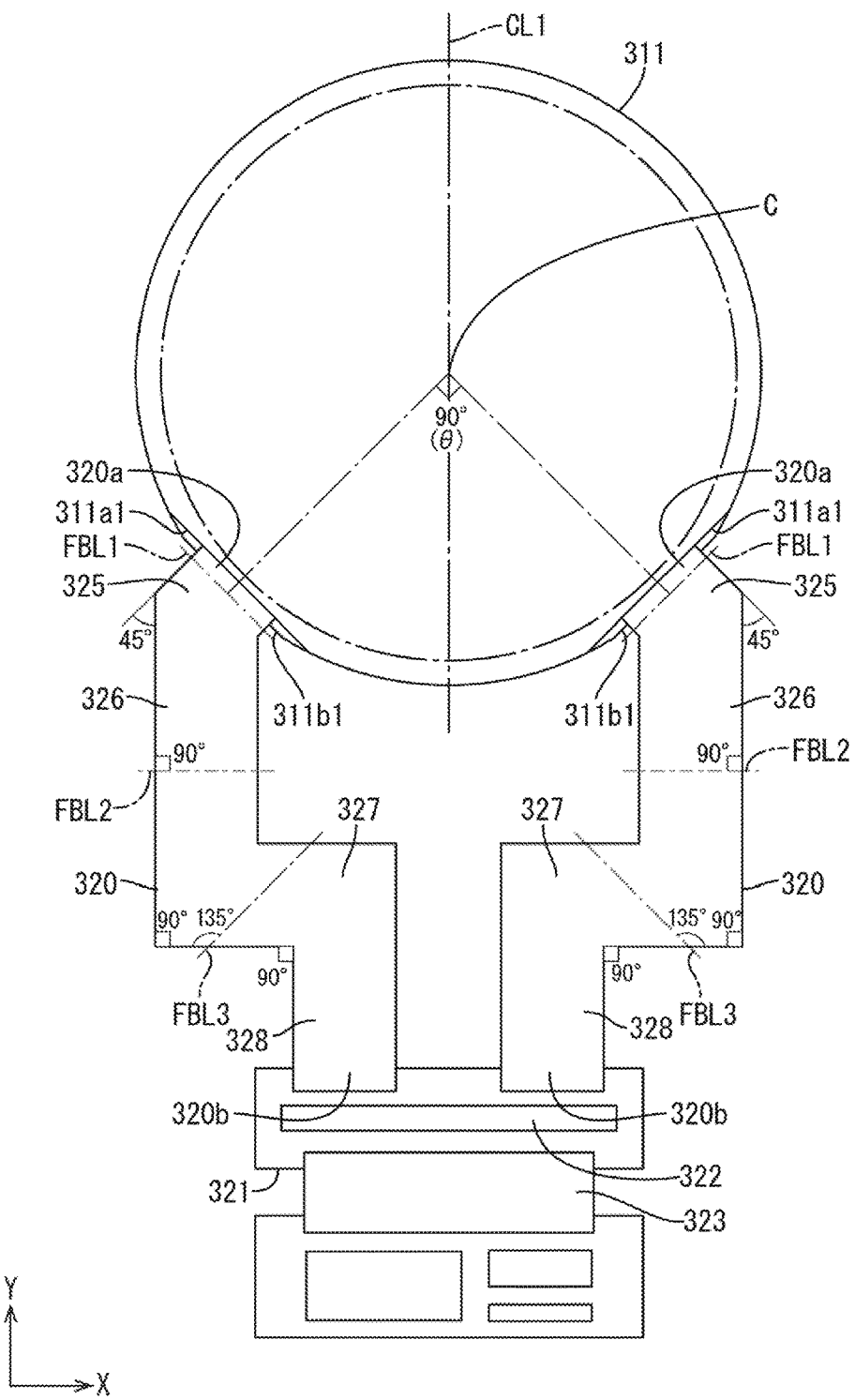
FIG. 10 is a plan view illustrating a liquid crystal panel, flexible circuit boards in an unfolded state, a panel driver board, and a controller board according to a fourth embodiment of the present invention.
Figure 11:
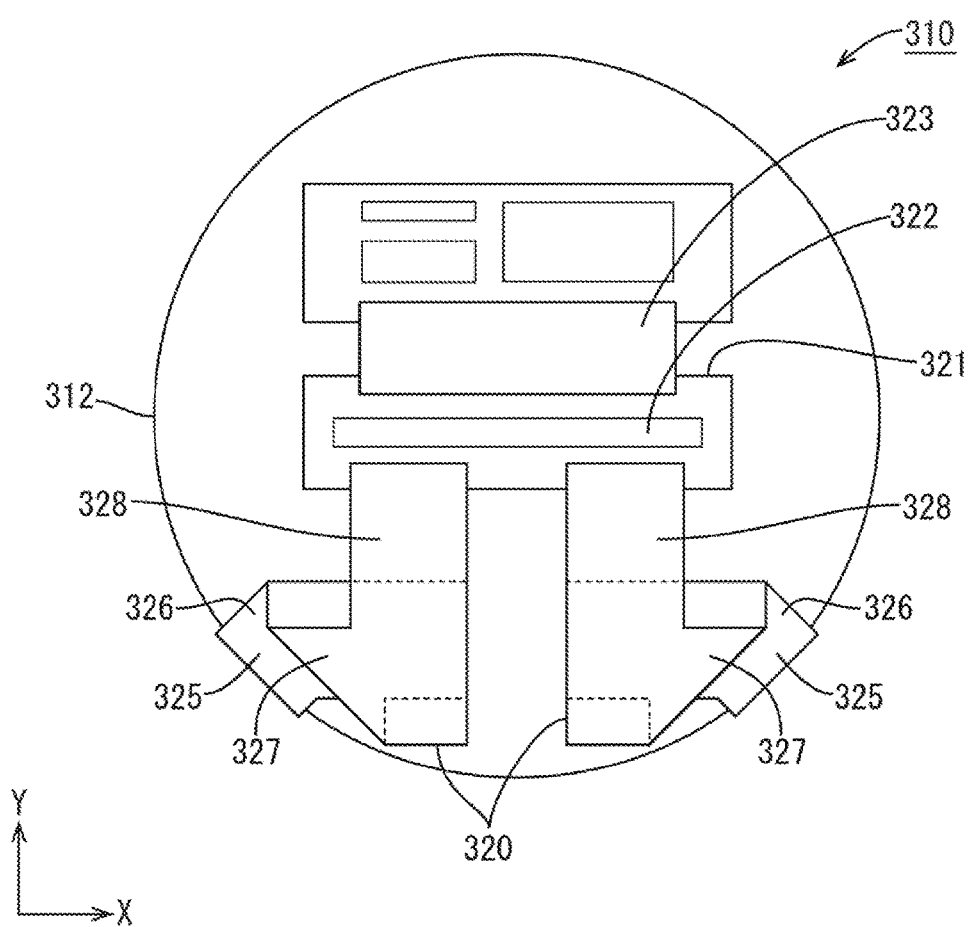
FIG. 11 is a bottom view of a liquid crystal display device including the flexible circuit boards folded and held on a back side of a backlight unit.

As illustrated in FIG. 10, the flexible circuit boards 320 include first portions 325, second portions 326, third portions 327, and fourth portions 328. In the unfolded state, the second portions 326 turn inward with respect to the X-axis direction (in an arrangement direction in which two flexible circuit boards 320 are arranged) at an angle of 45° relative to the first portions 325. The third portions 237 turn inward with respect to the X-axis direction at an angle of 90° relative to the second portions 326. The fourth portions 328 turn outward with respect to the X-axis direction at an angle of 90° relative to the third portions 327. The second portions 326 and the fourth portions 328 extend along the Y-axis direction and the third portions 327 extend along the X-axis direction. The angle of the second portions 326 relative to the first portions 325 is expressed by $\theta/2$ and $(180°-\theta)/2$, where $\theta$ is a center angle defined by a line joining the middle point of the flexible circuit board 320 with respect to the width direction and the center C of a liquid crystal panel 311 and a line joining the middle point of the other flexible circuit board 320 with respect to the width direction and the center C of the liquid crystal panel 311, specifically, the angle is 45°. The functions and the effects are similar to those of the first embodiment. The angle of the third portions 327 relative to the second portions 326 and the angle of the fourth portions 328 relative to the third portions 327 are the right angle. If a total length of each flexible circuit board 320 according to this embodiment is equal to a total length of each flexible circuit board 20 in the first embodiment, a dimension of an area in which the flexible circuit board 320 in the unfolded state according to this embodiment is disposed is smaller. Namely, an overall size can be reduced. In the unfolded state, the fourth portions 328 extend from the third portions 327 at the right angle to a direction opposite to a liquid crystal panel 311 (toward a panel driver board 321).

Next, a relationship between two flexible circuit boards 320 that are in the unfolded state will be described. As illustrated in FIG. 10, a distance between the second portions 326 of the flexible circuit boards 320 arranged in the X-axis direction to be parallel to each other is smaller than an outer diameter of the liquid crystal panel 311. Furthermore, a distance between the fourth portions 328 arranged in the X-axis direction to be parallel to each other is smaller than the distance between the second portions 326. A difference between the distance between the fourth portions 328 and the distance between the second portions 326 is about equal to twice the length (L) of the third portions 327 (i.e., 2L).

Next, how to fold the flexible circuit boards 320 will be described in detail. The flexible circuit boards 320 in the unfolded state illustrated in FIG. 10 are folded along three folding lines FBL1 to FBL3 into the inverted V shapes or the V shapes to be brought into the folded state illustrated in FIG. 11. Specifically, as illustrated in FIG. 10, the first portions 325 are folded along the first holding lines FGL1 that are parallel to the width directions of the first portions 325 into the V shapes and the second portions 326 are folded along the second folding lines FBL2 that are at a predefined angle relative to the outer edges of the second portions 326 on the outer sides with respect to the X-axis direction (on sides farther from the first center line CL1, farther from the center C of the liquid crystal panel 311) on the first portion 325 sides into the V shapes or the inverted V shapes. Furthermore, the third portions 327 are folded along the third folding lines FBL3 that are at an angle of 135° relative to the outer edges of the third portions 327 on the lower side in FIG. 10 (on panel driver board 321 side, farther from the center C of the liquid crystal panel 311) on the second portion 326 sides into the V shapes or the inverted V shapes.

A center angle defined by a line joining the middle point of the flexible circuit board 320 with respect to the width direction and the center C of the liquid crystal panel 311 and a line joining the middle point of the other flexible circuit board 320 with respect to the width direction and the center C of the liquid crystal panel 311 is referred to as θ. Each second folding line FBL2 is at an angle expressed by 45°+θ/2 relative to the outer edge of the second portion 326 on the first portion 325 side. Because the center angle in this embodiment is 90°, each second folding line FBL2 is at an angle of 90° relative to the outer edge of the second portion 326 (i.e., an extending direction in which signal lines of the flexible circuit board 320 extend). In comparison to the configuration of the first embodiment in which the second portion 26 is folded along the second folding line FBL2 that is at the angle relative to the outer edge of the second portion 26 other than the right angle, a broken line is less likely to occur in the flexible circuit board 320. Because the broken line is less likely to occur in the flexible circuit board 320, curvature radiuses of the folding portions of the flexible circuit board 320 can be reduced. This configuration is preferable for improving reliability of a liquid crystal display device 310 and reducing the thickness of the liquid crystal display device 310. The second portions 326 are folded to be parallel to the X-axis direction when the flexible circuit boards 320 are in the folded state. The position of each second folding line FBL2 in each second portion 326 is defined such that a distance between the first folding line FBL1 and the second folding line FBL2 is a half of a chord CH joining the middle points of the flexible circuit boards 320 with respect to the width directions or smaller. The distance between the first folding line FBL1 and the second folding line FBL2 is smaller than r·cos β, where r is a radius of the liquid crystal panel 311 and β is an angle defined by a line joining the middle point of the flexible circuit board 320 with respect to the width direction and the center C of the liquid crystal panel 11 and the chord CH. According to the configuration, the second portion 326 of each flexible circuit board 320 in the folded state which extends along the X-axis direction does not cross over the first centerline CL1. Therefore, the second portions 326 do not overlap each other (see FIG. 11). Therefore, interference is less likely to occur between signals transmitting through the flexible circuit boards 320 and deterioration of the signals such as rounding is less likely to occur.

The third folding lines FBL3 are at an angle of 135° relative to the outer edges of the third portions 327 on the lower side in FIG. 2 (farther from the center C of the liquid crystal panel 311) on the second portion 326 sides. When the flexible circuit boards 320 are in the folded state, sections of the third portions 327 beyond the third folding lines FBL3 and continuing to the fourth portions 328 extend parallel to the X-axis direction and the fourth portions 328 are parallel to each other and extend along the Y-axis direction. Therefore, the fourth portions 328 do not overlap each other (see FIG. 11). According to the configuration, the flexible circuit boards 320 that are folded are held in the small space on the back of a backlight unit 312. Furthermore, the flexible circuit boards 320 do not overlap each other. Therefore, the interference is less likely to occur between the signals transmitting through the flexible circuit boards 320 and the deterioration of the signals such as rounding is less likely to occur.

This embodiment has the configuration described above. Next, effects regarding the flexible circuit boards 320 in the production of the liquid crystal display device 310 will be described. As illustrated in FIG. 10, the flexible circuit boards 320 are folded along the first folding lines FBL1 into the inverted V shapes, along the second folding lines FBL2 into the V shapes, and along the third folding lines FBL3 into the inverted V shapes. When the flexible circuit boards 320 are folded along the first folding lines FBL1 into the inverted V shapes, the first portions 325 of the flexible circuit boards 320 are passed across an outer surface of a sidewall of the backlight unit 312 and to the back of the backlight unit 312. The second portions 326 of the flexible circuit boards 320 are parallel to each other and parallel to the X-axis direction on the back of the backlight unit 312 (see FIG. 11). The second portions 326 of the flexible circuit boards 320 do not overlap each other and adjacent to each other with respect to the X-axis direction with the first center line CL1 therebetween. When the flexible circuit boards 320 are folded along the second folding lines FBL2 into the V shapes, the sections of the second portions 326 on the third portion 327 sides relative to the second folding lines FBL2 are placed over the sections of the second portions 326 on the first portion 325 sides relative to the second folding lines FBL2 on the back side. The sections of the third portions 27 on the second portion 326 side relative to the third folding lines FBL3 extend parallel to the Y-axis direction. When the flexible circuit boards 320 are folded along the third folding lines FBL3 into the V shapes, the sections of the third portions 327 on the fourth portion 328 sides relative to the third folding lines FBL3 are placed over the sections of the third portions 327 on the second portion 326 sides relative to the third folding lines FBL3 on the back side to extend parallel to the X-axis direction as illustrated in FIG. 11. The fourth portions 328 are parallel to each other and parallel to the Y-axis direction. The flexible circuit boards 320 are efficiently held on the back of the backlight unit 312 without overlapping each other. Therefore, stress is less likely to exert on the flexible circuit boards 320 that are held and thus high reliability is achieved in connection. Because the deterioration of the signals is less likely to occur, high display quality is achieved.

The flexible circuit boards 320 may be folded along the first folding lines FBL1 into the inverted V shapes as described above, along the second folding lines FBL2 into the inverted V shapes, and along the third folding lines FBL3 to from the V shapes. When the flexible circuit boards 320 are folded along the second folding lines FBL2 into the inverted V shapes, the sections of the second portions 326 on the third portion 327 sides relative to the second folding lines FBL2 are placed over the sections of the second portions 326 on the first portions 325 sides relative to the second folding lines FBL2 on the front side (the backlight unit 312 side). When the flexible circuit boards 320 are folded along the third folding lines FBL3, the sections of the third portions 327 on the fourth portion 328 sides relative to the third folding lines FBL3 are placed over the sections of the third portions 327 on the second portion 326 sides relative to the third folding lines FBL3 on the front side to extend parallel to the X-axis direction.

As described above, the center angle defined by the line joining the middle point of the flexible circuit board 320 with respect to the width direction and the center C of the liquid crystal panel 311 and the line joining the middle point of the other flexible circuit board 320 with respect to the width direction and the center C of the liquid crystal panel 311 is referred to as θ. The flexible circuit boards 320 of this embodiment include the first portions 325, the second portions 326, the third portions 327, and the fourth portions 328. The first portions 325 include first ends 320a. In the unfolded state, the first portions 325 extend perpendicular to the linear edge sections 311a1 and 311b1. In the unfolded state, the second portions 326 continue from the first portions 325 at the angle of θ/2 relative to the first portions 325 to turn inward with respect to the arrangement direction. In the unfolded state, the third portions 327 continue from the second portions 326 at the right angle relative to the second portions 326 to turn inward with respect to the arrangement direction. In the unfolded state, the fourth portions continue from the third portions 327 at the right angle relative to the third portions 327 to turn away from the liquid crystal panel 311. The forth portions 328 include second ends 320b. Because the second portions 326 of the flexible circuit boards 320 that are in the unfolded state extend parallel to each other, the flexible circuit boards 320 in the unfolded state are less likely to spread outward with respect to the arrangement direction. According to the configuration, the flexible circuit boards 320 in the unfolded state are less likely to be caught on other components during transfer. This configuration provides further easy handling of the liquid crystal panel 311 and the flexible circuit boards 320. In the flexible circuit boards 320, the angle of the third portions 327 relative to the second portions 326 and the angle of the fourth portions 328 relative to the third portions 327 are the right angle. Therefore, the flexible circuit boards 320 in the unfolded state can be held in the small space. Because the second ends 320b of the flexible circuit boards 320 are parallel to each other, the second ends 320b can be easily mounted to the panel driver board 321.

The first portions 325 of the flexible circuit boards 320 are folded along the first folding lines FBL1 into the inverted V shapes and the second portions 326 are folded along the second folding lines FBL2 (the folding lines) into the V shapes or the inverted V shapes. The first folding lines FBL1 are parallel to the linear edge sections 311a1 and 311b1. The second folding lines FBL2 are at the angle expressed by 45°+θ/2 relative to the outer edges of the second portions 326 on the first portion 325 sides. Furthermore, the third portions 327 are folded along the third folding lines FBL3 that are at the angle of 135° relative to the outer edges of the third portions 327 on the panel driver board 321 side (farther from the center C of the liquid crystal panel 311) on the second portion 326 sides into the V shapes or the inverted V shapes. By folding the flexible circuit boards 320 as described above, the panel driver board 321 can be held on the back side of the liquid crystal panel 311. The second portions 326 and the third portions 327 of the folded flexible circuit boards 320 are held in the small space to overlap each other. Depending on the length of the second portions 326, the flexible circuit boards 320 are less likely to overlap each other and thus the interference is less likely to occur in the signals transmitting through the flexible circuit boards 320.

The center angle defined by the line joining the meddle point of the flexible circuit board 320 with respect to the width direction and the center C of the liquid crystal panel 311 and the line joining the middle point of the other flexible circuit board 320 with respect to the width direction and the center C of the liquid crystal panel 311 is 90°. In the unfolded state, the angle of the second portions 326 relative to the first portions 325 is 45°. According to the configuration, the second portions 326 are folded along the second folding lines FBL2 (the folding lines) at the right angle relative to the outer edges of the second portions 326 into the V shapes or the inverted V shapes. In comparison to a configuration in which the second portions 326 are folded along the folding lines at an angle other than the right angle relative to the outer edges into the V shapes or the inverted V shapes, the broken wire is less likely to occur in the flexible circuit boards 320. Because the broken wire is less likely to occur in the flexible circuit boards 320, the curvature radiuses of the folding portions of the flexible circuit board 320 can be reduced. This configuration is preferable for improving the reliability of the liquid crystal display device 310 and reducing the thickness of the liquid crystal display device 310.

Fifth Embodiment

A fifth embodiment will be described with reference to FIGS. 12 and 13. The fifth embodiment includes flexible circuit boards 420, arrangement and shapes in the plan view of which are different from the fourth embodiment. Configurations, functions, and effects similar to those of the fourth embodiment will not be described.

Figure 12:
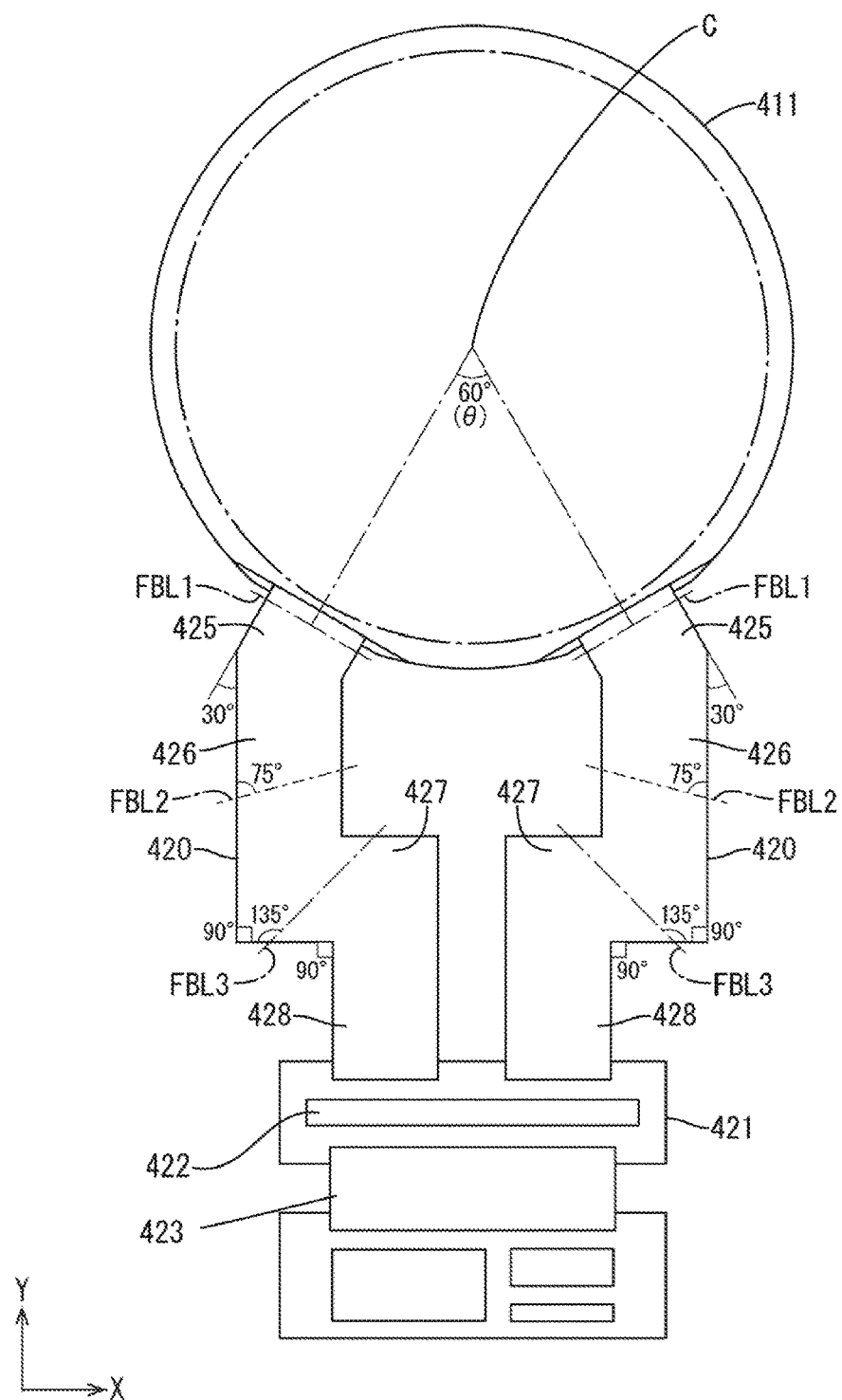
FIG. 12 is a plan view illustrating a liquid crystal panel, flexible circuit boards in an unfolded state, a panel driver board, and a controller board according to a fifth embodiment of the present invention.
Figure 13:
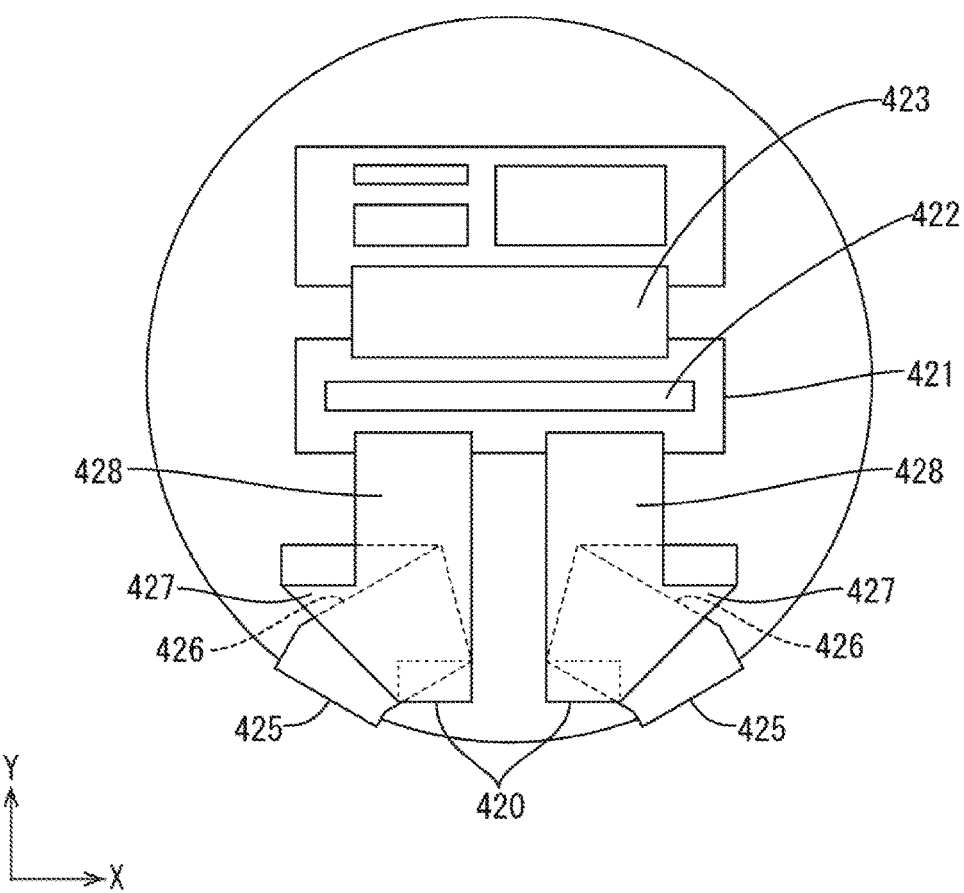
FIG. 13 is a bottom view of a liquid crystal display device including the flexible circuit boards folded and held on a back side of a backlight unit.

As illustrated in FIG. 12, two flexible circuit boards 420 are mounted to a liquid crystal panel 411 such that a center angle defined by a line joining a middle point of the flexible circuit board 420 and the center C of the liquid crystal panel 411 and a line joining a middle point of the other flexible circuit board 420 and the center C of the liquid crystal panel 411 is 60°. The shapes of the flexible circuit boards 420 in the plan view are as follows. The flexible circuit boards 420 include first portions 425, second portions 426, third portions 427, and fourth portions 428. Angles of the second portions 426 relative to the first portions 425 are 30°. Angles of the third portions 427 relative to the second portions 426 and angles of the fourth portions 428 relative to the third portions 427 are 90°. The angle of the second portions 426 relative to the first portions 425 is expressed by θ/2 but not (180°−θ)/2, where θ is a center angle defined by a line joining the middle point of the flexible circuit board 420 with respect to the width direction and the center C of the liquid crystal panel 411 and a line joining the middle point of the other flexible circuit board 420 with respect to the width direction and the center C of the liquid crystal panel 411. Therefore, the second portions 426 and the fourth portions 428 of the flexible circuit boards 420 in the unfolded state are parallel to each other and parallel to the Y-axis direction but the second portions 426 in the folded state are angled relative to the X-axis direction and the Y-axis direction (see FIG. 7). In the folded state, as illustrated in FIG. 13, the second portions 426 extend from boundaries with the first portions 425 to boundaries with the third portions 427 to become closer to a panel driver circuit board 421 with respect to the Y-axis direction.

The flexible circuit boards 420 are folded along folding lines FBL1 to FBL3. As illustrated in FIG. 12, in the unfolded state, the second folding lines FBL2 are at an angle of 75° relative to outer edges of the second portions 426 on outer sides with respect to the X-axis direction (farther from the center C of the liquid crystal panel 411) on the first portion 425 sides. A center angle defined by a line joining the middle point of the flexible circuit board 420 with respect to the width direction and the center C of the liquid crystal panel 411 and a line joining the middle point of the other flexible circuit board 420 with respect to the width direction and the center C of the liquid crystal panel 411 is referred to as θ. The angle of each second folding line FBL2 is expressed by 45°+θ/2. When the flexible circuit boards 420 are in the folded state, as illustrated in FIG. 13, the sections of the second portions 426 on the third portion 427 sides relative to the second folding lines FBL2 extend parallel to the X-axis direction.

Sixth Embodiment

A sixth embodiment will be described with reference to FIGS. 14 and 15. The sixth embodiment includes flexible circuit boards 520, arrangement and shapes in the plan view of which are different from the fourth embodiment. Configurations, functions, and effects similar to those of the fourth embodiment will not be described.

Figure 14:
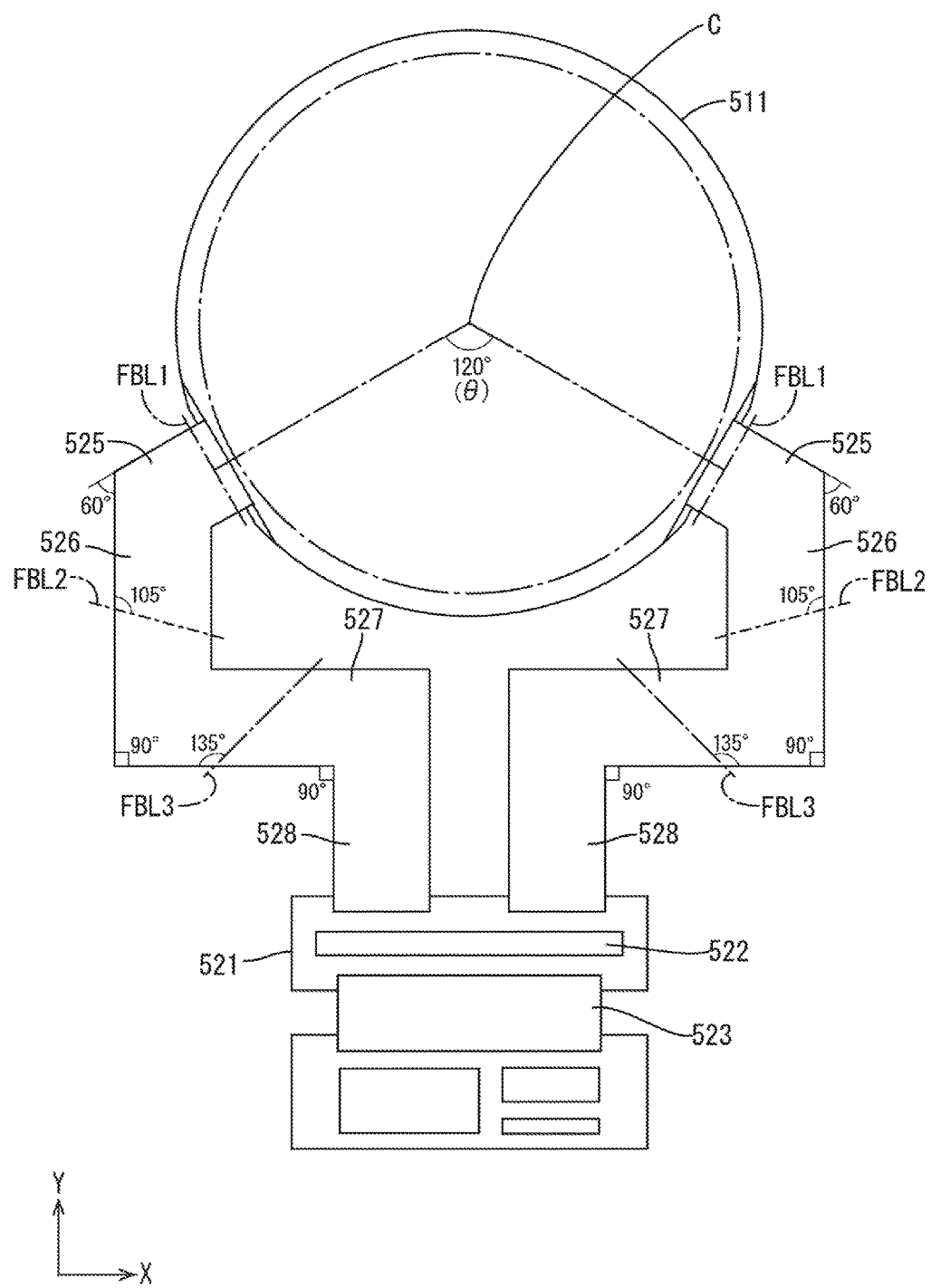
FIG. 14 is a plan view illustrating a liquid crystal panel, flexible circuit boards in an unfolded state, a panel driver board, and a controller board according to a sixth embodiment of the present invention.
Figure 15:
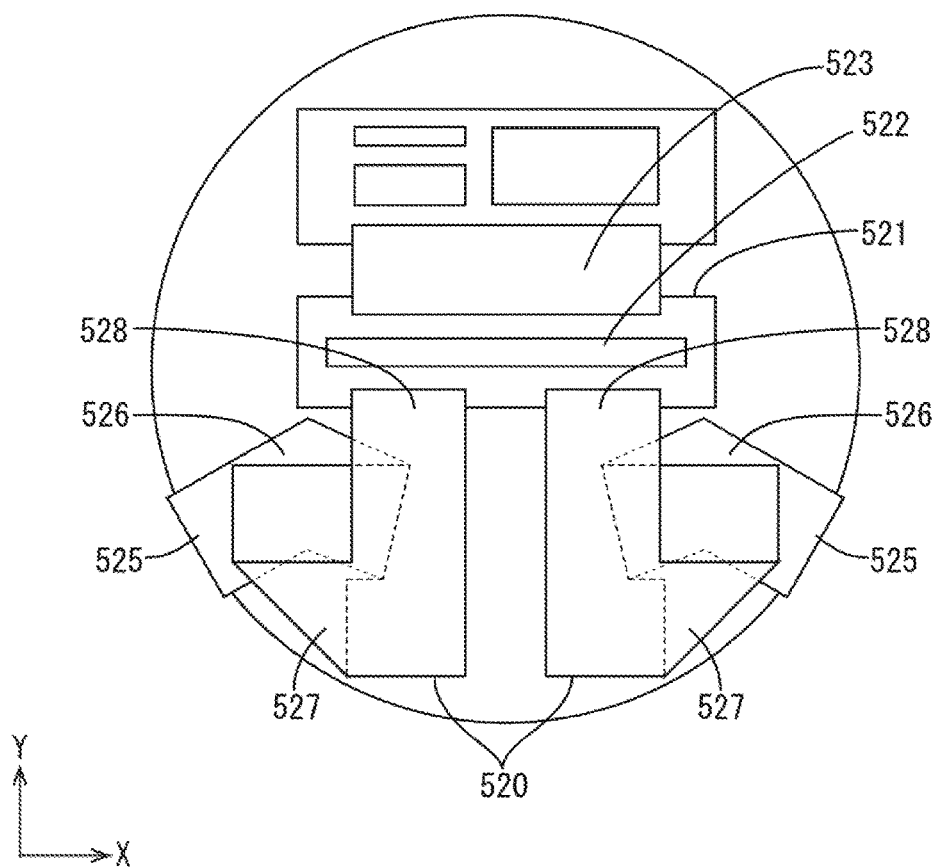
FIG. 15 is a bottom view of a liquid crystal display device including the flexible circuit boards folded and held on a back side of a backlight unit.

As illustrated in FIG. 14, two flexible circuit boards 520 according to this embodiment are mounted to a liquid crystal panel 511 such that a center angle defined by a line joining a middle point of the flexible circuit board 520 with respect to the width direction and the center C of the liquid crystal panel 511 and a ling joining a middle point of the other flexible circuit board 520 with respect to the width direction is 120°. The shapes of the flexible circuit boards 520 in the plan view are as follows. The flexible circuit boards 520 include first portions 525, second portions 526, third portions 527, and fourth portions 528. Angles of the second portions 526 relative to the first portions 525 are 60°. Angles of the third portions 527 relative to the second portions 526 and angles of the fourth portions 528 relative to the third portions 527 are 90°. The angle of the second portions 526 relative to the first portions 525 is expressed by θ/2 but not (180°−θ)/2, where θ is a center angle defined by a line joining the middle point of the flexible circuit board 520 with respect to the width direction and the center C of the liquid crystal panel 511 and a line joining the middle point of the other flexible circuit board 520 with respect to the width direction and the center C of the liquid crystal panel 511. Therefore, the second portions 526 and the fourth portions 528 of the flexible circuit boards 520 in the unfolded state are parallel to each other and parallel to the Y-axis direction but the second portions 526 in the folded state are angled relative to the X-axis direction and the Y-axis direction (see FIG. 15). In the folded state, as illustrated in FIG. 15, the second portions 526 extend from boundaries with the first portions 525 to boundaries with the third portions 527 to become farther from a panel driver circuit board 521 with respect to the Y-axis direction.

The flexible circuit boards 520 are folded along folding lines FBL1 to FBL3. As illustrated in FIG. 14, in the unfolded state, the second folding lines FBL2 are at an angle of 105° relative to outer edges of the second portions 526 on outer sides with respect to the X-axis direction (farther from the center C of the liquid crystal panel 511) on the first portion 525 sides. A center angle defined by a line joining the middle point of the flexible circuit board 520 with respect to the width direction and the center C of the liquid crystal panel 511 and a line joining the middle point of the other flexible circuit board 520 with respect to the width direction and the center C of the liquid crystal panel 511 is referred to as θ. The angle of each second folding line FBL2 is expressed by 45°+θ/2. When the flexible circuit boards 520 are in the folded state, as illustrated in FIG. 15, the sections of the second portions 526 on the third portion 527 sides relative to the second folding lines FBL2 extend parallel to the X-axis direction.

Seventh Embodiment

A seventh embodiment will be described with reference to FIGS. 16 to 19. The sixth embodiment includes flexible circuit boards 620, shapes of which in the plan view are different from the first embodiment and a panel driver board 621 mounted by a procedure different from that of the first embodiment. Configurations, functions, and effects similar to those of the first embodiment will not be described.

Figure 16:
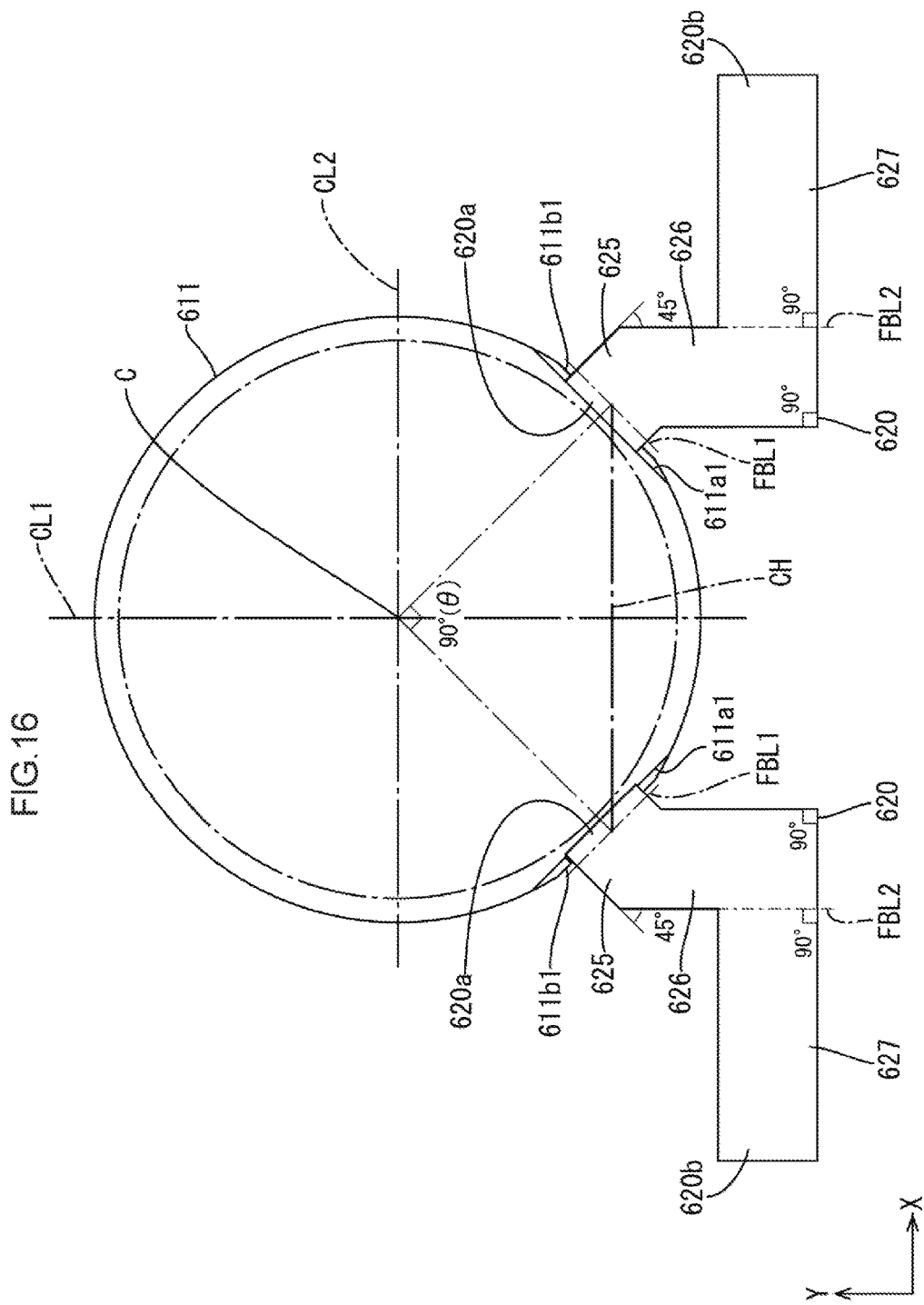
FIG. 16 is a plan view illustrating a liquid crystal panel and flexible circuit boards in an unfolded state according to a seventh embodiment of the present invention.

As illustrated in FIG. 16, the flexible circuit boards 620 according to this embodiment include portions joining first ends 620a and second ends 620b have bending shapes in the plan view such that the first ends 620a are outer than the second ends 620b with respect to the X-axis direction (in an arrangement direction in which two flexible circuit boards 620 are arranged), that is, farther from a center line CL1 in the unfolded state. According to the configuration, in the unfolded state before holding the flexible circuit boards 620, the second ends 620b of the flexible circuit boards 620 are less likely to physically interfere with each other. This configuration is preferable for mounting the second ends 620b to the panel driver board 621 after the flexible circuit boards 620 are folded. It is preferable for setting the second ends 620b inner than the first ends 620a with respect to the X-axis direction, that is, closer to the first center line CL1.

Specifically, as illustrated in FIG. 16, the first ends 620a of the flexible circuit boards 620 are mounted to the liquid crystal panel 611 such that a center angle defined by a line joining a middle point of the flexible circuit board 620 with respect to the width direction and the center C of the liquid crystal panel 611 and a line joining a middle point of the other flexible circuit board 620 with respect to the width direction and the center C of the liquid crystal panel 611 is 90°. The flexible circuit boards 620 include first ends 620a. The flexible circuit boards 620 include first portions 625, second portions 626, and third portions 627. In the unfolded state, the first portions 625 extend substantially perpendicular to the linear edge sections 611a1 and 611b1. In the unfolded state, the second portions 626 continue from the first portions 625 at an angle of 45° relative to the first portions 625 to turn inward with respect to the X-axis direction, that is, toward the first center line CL1 (the flexible circuit boards 620 become closer to each other). In the unfolded state, the third portions 627 continue from the second portions 626 at an angle of 90° (the right angle) relative to the second portions 626 to turn outward with respect to the X-axis direction, that is, away from the first center line CL1 (the flexible circuit boards 620 become away from each other). The third portions 627 include the second ends 620*b*. The angle of the second portions 626 relative to the first portions 625 is expressed by $(180°-\theta)/2$ and $\theta/2$, where $\theta$ is a center angle defined by a line joining the middle point of the flexible circuit board 620 with respect to the width direction and the center C of the liquid crystal panel 611 and a line joining the middle point of the other flexible circuit board 620 with respect to the width direction and the center C of the liquid crystal panel 611. The angle of the third portions 627 relative to the second portions 626 is the right angle. The second portions 626 of the flexible circuit boards 620 extend parallel to the first center line CL1 (the Y-axis direction). The third portions 627 of the flexible circuit boards 620 extend parallel to the second center line CL2 (the X-axis direction). In the unfolded state, the third portions of the flexible circuit boards 620 including the first ends 620*a* mounted to the liquid crystal panel 611 are located outer than the outline of the liquid crystal panel 611 with respect to the X-axis direction and the second ends 620*b* are located at the outermost positions of the third portions 627. The length of each second portion 626 is smaller than r·cos β, where r is a radius of the liquid crystal panel 611 and β is an angle defined by the line joining the middle point of the flexible circuit board 620 with respect to the width direction and the center C of the liquid crystal panel 611 and the chord CH, similar to the first embodiment described earlier. In the folded state, the second portions 626 that extend along the X-axis direction do not cross over the first center line CL1 and thus the second portions 626 do not overlap each other (see FIG. 17).

Figure 17:
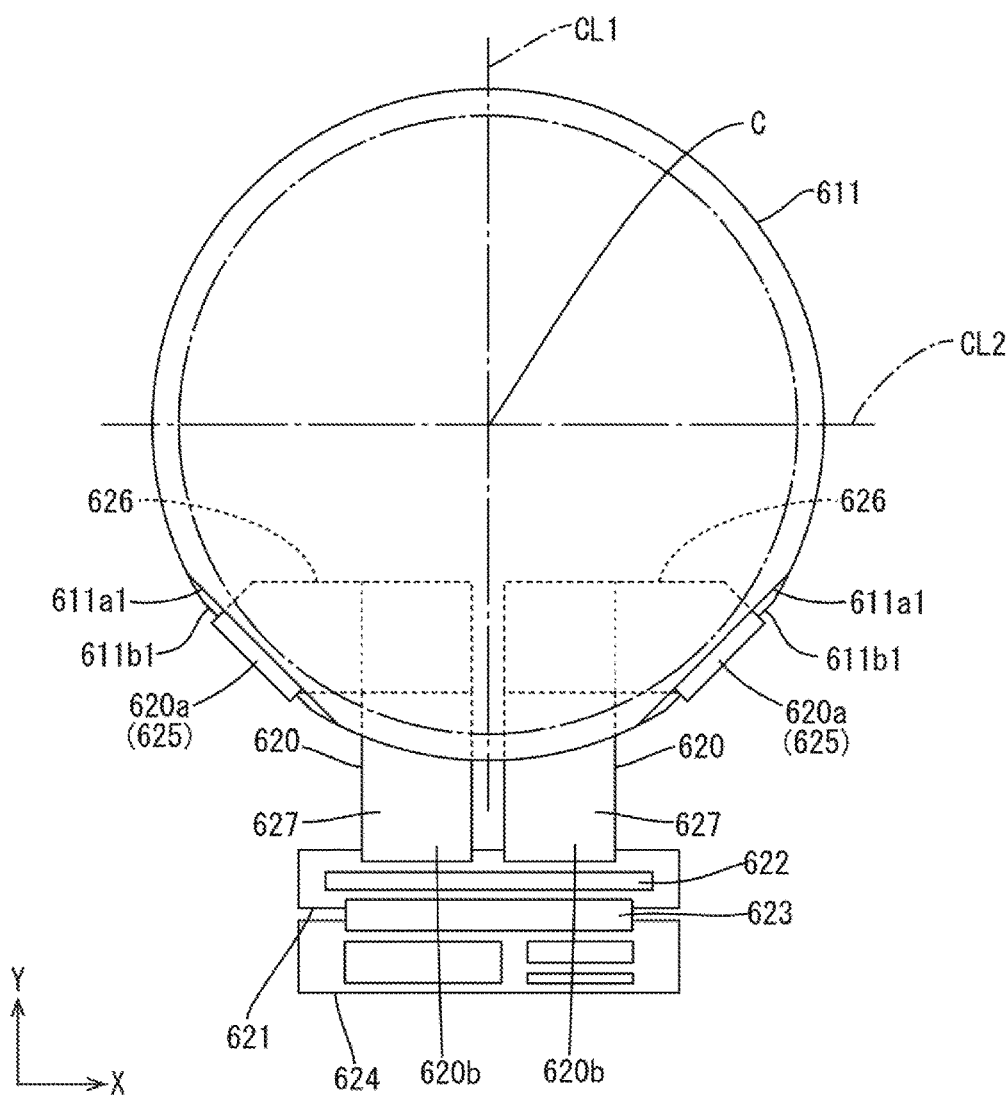
FIG. 17 is a plan view illustrating the flexible circuit boards folded and mounted to a panel driver board.

Next, how to fold the flexible circuit boards 620 will be described in detail. Each flexible circuit board 620 in the unfolded state illustrated in FIG. 16 is folded along two folding lines FBL1 and FBL2 into the inverted V shape or the V shape. The flexible circuit boards 620 in a first folded state are illustrated in FIG. 17. The flexible circuit boards 620 in the first folded state are mounted to the panel driver board 621. After the mounting of the flexible circuit boards 620 to the panel driver board 621 is completed, portions of the flexible circuit boards 620 folded along the second folding lines FBL2 are unfolded so that the flexible circuit boards 620 are brought into a second folded state in which the flexible circuit boards 620 are folded along the first folding lines FBL1. When the flexible circuit boards 620 are in the second folded state, the panel driver board 621 is held on the back side of a backlight unit 612. In the second folded state, each flexible circuit board 620 is folded once and thus physical loads to wiring patterns due to the holding can be reduced.

Specifically, as illustrated in FIG. 16, the first portions 625 of the flexible circuit boards 620 are folded along the first folding lines FBL1 that are parallel to the width direction (the linear edge sections 611*a*1 and 611*b*1 into the inverted V shapes and the third portions 627 are folded along the second folding lines FBL2 that are perpendicular to the outer edges of the third portions 627 into the V shapes or the inverted V shapes. The flexible circuit boards 620 are brought into the first folded state (see FIG. 17). The first folded lines FBL1 are set in the first portions 625 at positions to overlap the linear edge sections 611*b*1 of the array substrate 611*b* or slightly outer than the linear edge sections 611*b*1. When folded along the first folding lines FBL1, the first portions 625 slightly project from the outline of the liquid crystal panel 611. When the flexible circuit boards 620 are folded along the first folding lines FBL1, the second portions 626 are placed parallel to the X-axis direction and the flexible circuit boards 620 adjacent to each other with respect to the X-axis direction do not overlap each other as illustrated in FIG. 17. The third portions 627 extend parallel to each other and parallel to the Y-axis direction. The second folding lines FBL2 are perpendicular to the outer edges of the third portions 627. Therefore, when the third portions 627 are folded along the second folding lines FBL2, the third portions 627 extend to the side opposite from the second center line CL2 relative to the second portions 626 (on the center C side of the liquid crystal panel 611). The third portions 627 are placed closer to the first center line CL1 than the first portions 625 and the second portions 626 with respect to the X-axis direction. The second ends 620*b* at distal ends of the third portions 627 are substantially perpendicular to an edge of a mounting portion of the panel driver board 621 to which the flexible circuit boards 620 (an upper edge in FIG. 17) and placed to project from the outline of the liquid crystal panel 611 to the lower side in FIG. 17. According to the configuration, in the first folded state, the second ends 620*b* are easily mounted to the panel driver board 621 using a general compression bonding device (mounting device). More specifically, using the general compression bonding device including a bonding tool having a linear shape, the second ends 620*b* are collectively mounted to one of edge portions of the panel driver board 621 at the same time. If the second ends are mounted not to project from the outline of the liquid crystal panel 611, a compression bonding device including a special mechanism is required. To prepare such a special compression bonding device, the cost may increase. According to the configuration described above in which the second ends 620*b* do not project from the outline of the liquid crystal panel 611, the second ends can be compression-bonded (mounted) using the general compression bonding device. The compression bonding device including the special mechanism is not required. This configuration is advantageous in cost reduction.

Figure 18:
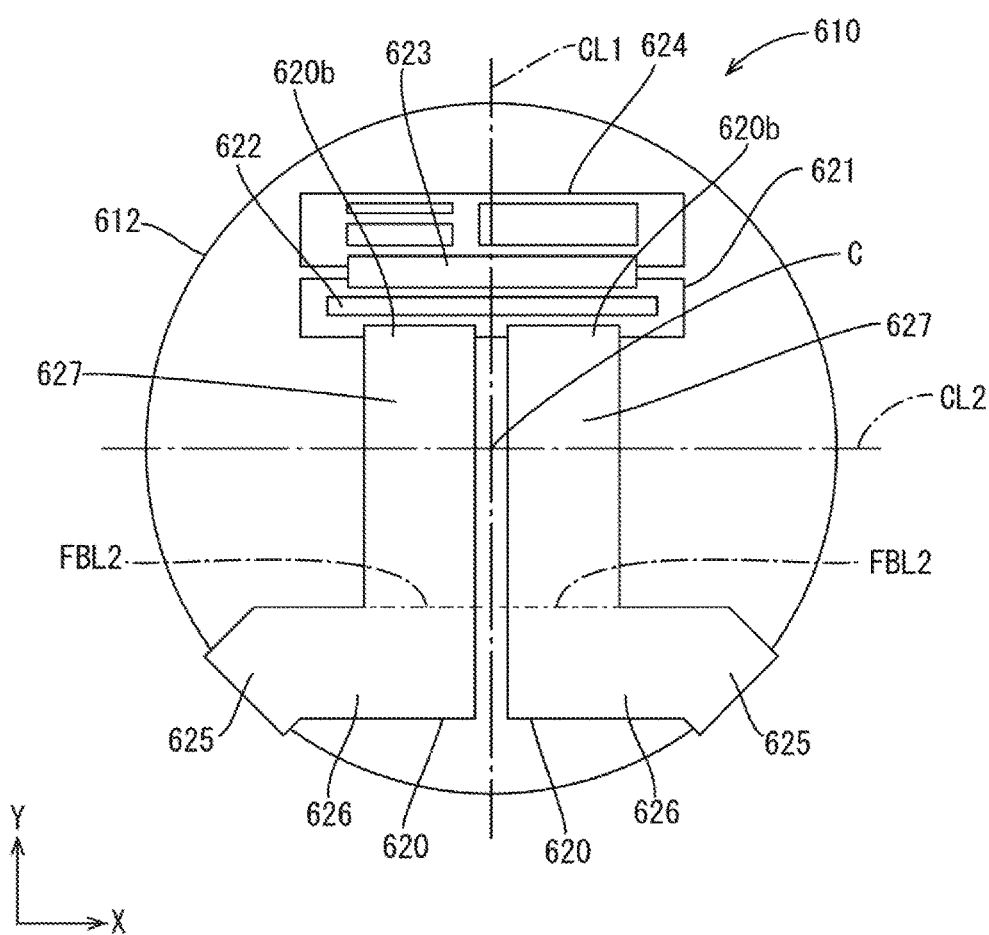
FIG. 18 is a bottom view of a liquid crystal display device including the flexible circuit boards folded and held on a back side of a backlight unit.

The flexible circuit boards 620 in the first folded state described above are brought into the second folded state by opening the third portions 627 that are folded along the second folding lines FBL2. As illustrated in FIG. 18, the third portions 627 extend from the second portions 626 toward the second center line CL2 (the upper side in FIG. 17 parallel to the Y-axis direction. A length of each third portion 627 is defined such that the panel driver board 621 and the controller board 624 do not project from an outline of a liquid crystal display device 610 in the second folded state.

This embodiment has the configuration described above. Next, effects of the flexible circuit boards 620 in the production of the liquid crystal display device 610 will be described. After the first ends 620*a* of the flexible circuit boards 620 are mounted to a liquid crystal panel 611, the flexible circuit boards 620 are folded along the first folding lines FBL1 into the inverted V shapes and along the second folding lines FBL2 into the V shapes as illustrated in FIG. 16. When the flexible circuit boards 620 are folded along the first folding lines FBL1 into the inverted V shapes, the first portions 625 are passed across an outer surface of a sidewall of the backlight unit 612 and to the back of the backlight unit 612. The second portions 626 are parallel to each other and parallel to the X-axis direction on the back of the backlight unit 12 (see FIG. 17). The second portions 626 of the flexible circuit boards 620 do not overlap each other and adjacent to each other with respect to the X-axis direction with the first center line CL1 therebetween. The third portions 627 of the flexible circuit boards 620 are parallel to each other and parallel to the Y-axis direction. The third portions 627 extend from the second portions 626 toward the second center line CL2. As illustrated in FIG. 17, when the flexible circuit boards 620 are folded along the second folding lines FBL2 into the inverted V shapes, the third portions 627 are placed over the second portions 626 on the front side and sandwiched between the second portions 626 and the backlight unit 612. The sections of the third portions 627 on the side away from the second portions 626 relative to the second folding lines FBL2 project toward the side opposite to the second center line CL2 relative to the second portions 626. The second ends 620b project from the outline of the liquid crystal panel 611. In the first folded state, the second ends 620b of the flexible circuit boards 620 are mounted to the same edge portion of the panel driver board 621. For the mounting, the general mounting device can be used because the second ends 620b project from the outline of the liquid crystal panel 611. The cost for the mounting can be reduced.

After the flexible circuit boards 620 are mounted to the panel driver board 621, the third portions 627 of the flexible circuit boards 620 are opened and the flexible circuit boards 620 are brought into the second folded state. Specifically, as illustrated in FIG. 18, the sections of the third portions 627 farther from the second portions 626 relative to the second folding lines FBL2 (including the second ends 620b) are placed closer to the second center line CL2 relative to the sections of the third portions 627 on the second portion 626 side to cancel the overlapping. The panel driver board 621 connected to the second ends 620b of the third portions 627 is placed on an opposite side to the second portions 626 relative to the center line CL2 and held so as not to project from the outline of the liquid crystal display device 610. The flexible circuit boards 620 may be folded along the first folding lines FBL1 into the inverted V shapes as described earlier and along the second folding lines FBL2 into the inverted V shapes.

Figure 19:
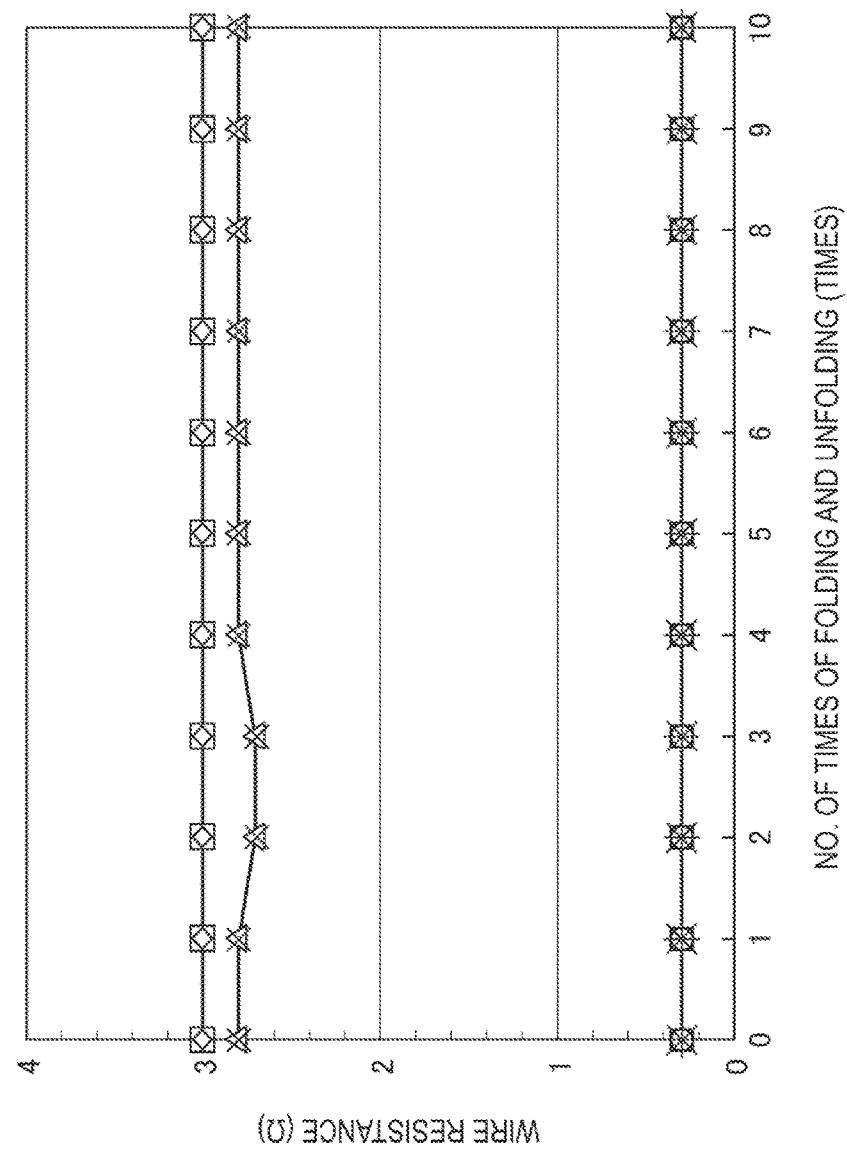
FIG. 19 is a graph illustrating relationships between wire resistances of flexible circuit boards according to embodiments 1 to 3 and the times of folding and unfolding in comparative experiments.

In this embodiment, the flexible circuit boards 620 are folded along the second folding lines FBL2 before mounting the flexible circuit boards 620 to the panel driver board 621 and opened to cancel the folding after the mounting is completed. In comparison to the first to the sixth embodiments, physical loads applied to the wiring patterns of the flexible circuit boards 620 are larger and thus failures such as broken wires may occur. To observe how wire resistances vary when folding and unfolding of the flexible circuit boards 620 are repeatedly performed, the following comparative experiments were conducted. In the comparative experiments, the flexible circuit board 620 having the wire resistance of about 0.3Ω was referred to as embodiment 1, the flexible circuit board 620 having the wire resistance of about 3.0Ω was referred to as embodiment 2, and the flexible circuit board 620 having the wire resistance of about 2.8Ω was referred to as embodiment 3. Each flexible circuit board 620 was repeatedly folded and unfolded (ten times) by repeatedly wrapping the flexible circuit board 620 around a metal rod having a predefined curvature radius and unwrapping. The wire resistance was measured every time the folding and the unfolding were performed. The metal rod having the curvature radius of about 0.5 mm was used for embodiments 1 and 2. The metal rod having the curvature radius of about 0.75 mm was used for embodiment 3. The experiments were conducted three times for embodiment 1 and twice for each of embodiments 2 and 3. The results of the experiments were provided in FIG. 19. In FIG. 19, the vertical axis indicates the wire resistance (in unit of Ω) and the horizontal axis indicates the number of times of the holding and the unfolding (in unit of times).

The results of the experiments will be described. From FIG. 19, the wire resistances of embodiments 1 to 8 barely varied even through the number of times of the folding and the unfolding increased. Namely, possibility of the failures such as broken wires is significantly small when the folding and the unfolding are performed for about ten times. When the flexible circuit board 620 in this embodiment is folded and unfolded only once during the mounting of the flexible circuit board 620 to the panel driver board 621, the possibility of the failures such as the broken wires is significantly small and thus sufficiently high connection reliability can be achieved.

As described earlier, each flexible circuit board 620 according to this embodiment includes the portion joining the first end 620a and the second end 620b has the bending shape in the plan view such that the second end 620b is located outer than the first end 620a in the arrangement direction of the flexible circuit boards 620 in the unfolded state. In the unfolded state before folding the flexible circuit boards 620, the second ends 620b of the flexible circuit boards 620 are less likely to directly and physically interfere with each other. The configuration of this embodiment is preferable for mounting the second ends 620b to the panel driver board 621 in the folded state after the flexible circuit boards 620 are folded. It is preferable for folding the flexible circuit boards 620 to place the second ends 620b inner than the first ends 620a in the arrangement direction.

The center angle defined by the line joining the middle point of the flexible circuit board 620 with respect to the width direction and the center C of the liquid crystal panel 611 and the line joining the middle point of the other flexible circuit board 620 with respect to the width direction and the center C of the liquid crystal panel 611 is referred to as θ. The flexible circuit boards 620 include the first ends 620a. The flexible circuit boards 620 include the first portions 625, the second portions 626, and the third portions 627. In the unfolded state, the first portions 625 extend substantially perpendicular to linear edge sections 611a1 and 611b1. In the unfolded state, the second portions 626 continue from the first portions 625 at the angle of (180°−θ)/2 relative to the first portions 625 to turn inward with respect to the arrangement direction. In the unfolded state, the third portions 627 continue from the second portions 626 at the right angle relative to the second portions 626 to turn outward with respect to the arrangement direction. The third portions 627 include the second ends 620b. The first portions 25 are folded along the first folding lines FBL1 (the folding lines) parallel to the linear edge sections 611a1 and 611b1. When the first portions 625 of the flexible circuit boards 620 are folded along the first folding lines FBL1 parallel to the linear edge sections 611a1 and 611b1 into the inverted V shapes, the second portions 626 linearly extend (along the X-axis direction). In comparison to a configuration in which the second portions extend to cross each other, the second portions 626 can be placed in the smaller space and thus the size of the holding space can be reduced. Because the length of each second portion 626 is smaller, the wire resistance is smaller. Furthermore, the number of the folding of each flexible circuit board 620 is one. Therefore, the physical load to the conductive lines due to the folding can be reduced.

The third portions 627 of flexible circuit boards 620 are folded along the second folding lines FBL2 (the folding lines) perpendicular to the outer edges of the third portions 627 into the V shapes or the inverted V shapes such that the second ends 620b project from the outline of the liquid crystal panel 611 when the second ends 620b are mounted to the panel driver board 621. When the third portions 627 of the flexible circuit boards 620 are folded along the second folding lines FBL2 perpendicular to the outer edges of the third portions 627 into the V shapes or the inverted V shapes, the second ends 620b project from the outline of the liquid crystal panel 611. Therefore, the second ends 620b can be easily mounted to the panel driver board 621 using the general pressure bonding device (the mounting device). Because the general pressure bonding device can be used, the configuration is preferable for reducing the production cost. By opening the folded third portions 627 after the second ends 620b are mounted to the panel driver board 621, the panel driver board 621 connected to the flexible circuit boards 620 is held within the outline of the liquid crystal panel 611.

The center angle defined by the line joining the middle point of the flexible circuit board 620 with respect to the width direction and the center C of the liquid crystal panel 611 and the line joining the middle point of the other flexible circuit board 620 with respect to the width direction and the center C of the liquid crystal panel 611 is referred to as θ. The flexible circuit boards 620 include at least the first portions 625 and the second portions 626. The first portions 625 include the first ends 620a. In the unfolded state, the first portions 625 extend perpendicular to the linear edge sections 611a1 and 611b1. In the unfolded state, the second portions 626 continue from the first portions 625 at the angle of (180°−θ)/2 relative to the first portions 625 to turn inward with respect to the arrangement direction. At least the first portions 625 are folded along the first folding lines FBL1 (the folding lines) parallel to the linear edge sections 611a1 and 611b1 into the inverted V shapes. When at least the first portions 625 of the flexible circuit boards 620 are folded along the first folding lines FBL1 parallel to the linear edge sections 611a1 and 611b1 into the inverted V shapes, the second portions 626 are placed to linearly extend. In comparison to a configuration in which the second portions are placed to cross each other, the second portions 626 can be held in further smaller space. According to the configuration, the size of the holding space can be reduced. Furthermore, the length of each second portion 626 is reduced and thus the wire resistance can be reduced.

Eighth Embodiment

An eighth embodiment will be described with reference to FIGS. 20 and 21. The eighth embodiment includes flexible circuit boards 720, arrangement and shapes of which in the plan view are different from the seventh embodiment. Configurations, functions, and effects similar to those of the seventh embodiment will not be described.

Figure 20:
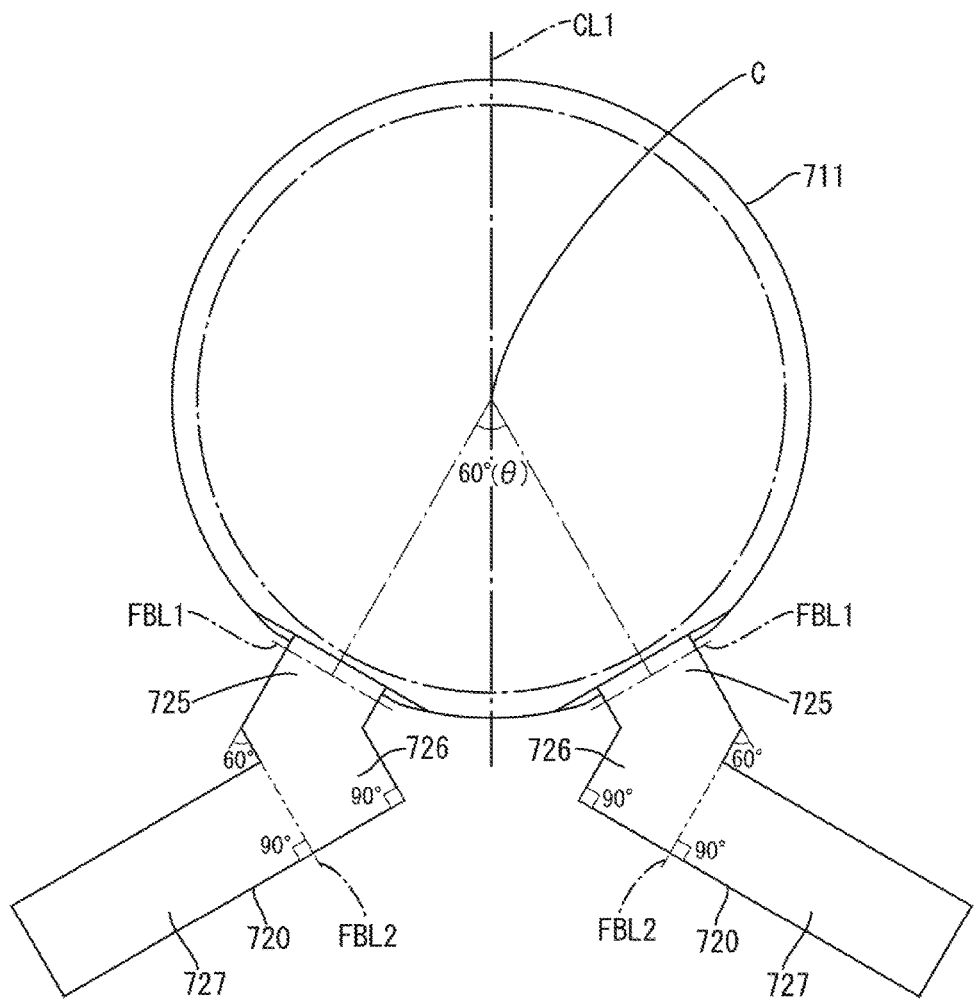
FIG. 20 is a plan view illustrating a liquid crystal panel and flexible circuit boards in an unfolded state according to a eighth embodiment of the present invention.
Figure 21:
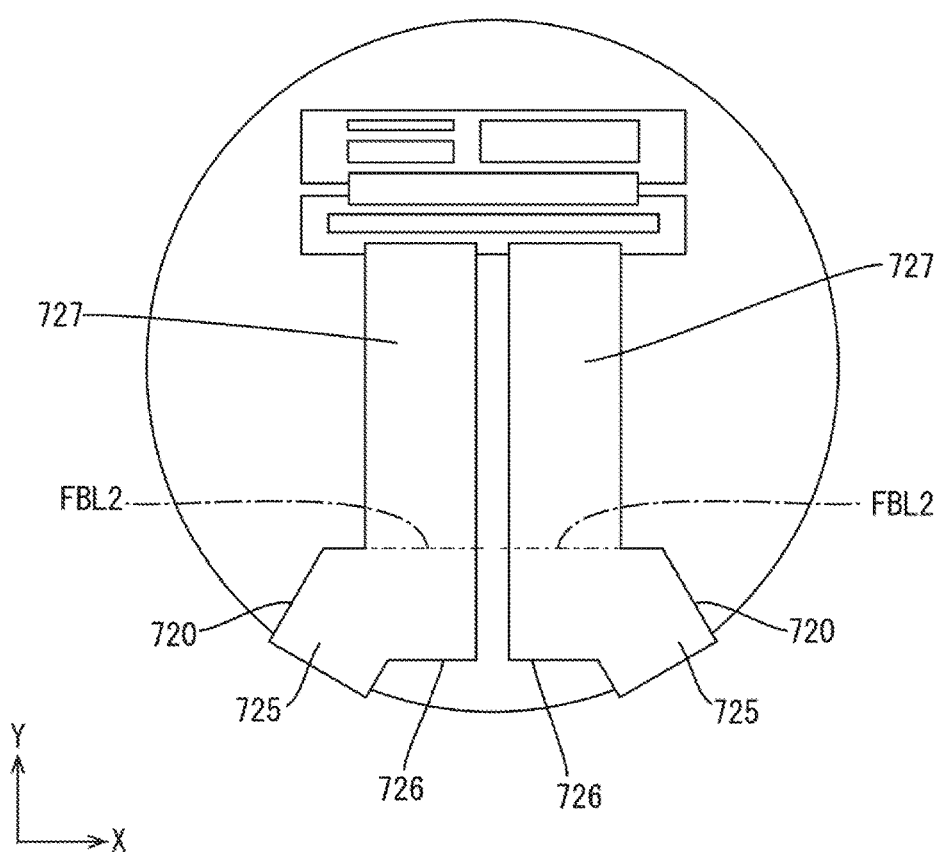
FIG. 21 is a bottom view of a liquid crystal display device including the flexible circuit boards folded and held on a back side of a backlight unit.

As illustrated in FIG. 20, two flexible circuit boards 720 according to this embodiment are mounted to a liquid crystal panel 711 such that a center angle defined by a line joining a middle point of the flexible circuit board 720 with respect to the width direction and the center C of the liquid crystal panel 711 and a ling joining a middle point of the other flexible circuit board 720 with respect to the width direction is 60°. The shapes of the flexible circuit boards 720 in the plan view are as follows. The flexible circuit boards 720 include first portions 725, second portions 726, and third portions 727. Angles of the second portions 726 relative to the first portions 725 are 60°. Angles of the third portions 727 relative to the second portions 726 are 90°, which is the same as the seventh embodiment. The angle of the second portions 726 relative to the first portions 725 is expressed by (180°−θ)/2 but not θ/2, where θ is a center angle defined by a line joining the middle point of the flexible circuit board 720 with respect to the width direction and the center C of the liquid crystal panel 711 and a line joining the middle point of the other flexible circuit board 720 with respect to the width direction and the center C of the liquid crystal panel 711. The second portions 726 of the flexible circuit boards 720 in the unfolded state turn inward with respect to the X-axis direction (the arrangement direction of the flexible circuit boards 720), that is, toward the first center line CL1 (toward the other flexible circuit board 720), relative to the first portions 725. When the flexible circuit boards 720 are folded along the first folding lines FBL1, as illustrated in FIG. 21, the second portions 726 extend parallel to the X-axis direction and the third portions 727 extend parallel to the Y-axis direction. The positions of the folding lines FBL1 and FBL2 in the flexible circuit boards 720 in the plan view (e.g., the angles relative to the outer edges) are the same as the seventh embodiment.

Ninth Embodiment

A ninth embodiment will be described with reference to FIGS. 22 and 23. The ninth embodiment includes flexible circuit boards 820, arrangement and shapes of which in the plan view are different from the seventh embodiment. Configurations, functions, and effects similar to those of the seventh embodiment will not be described.

Figure 22:
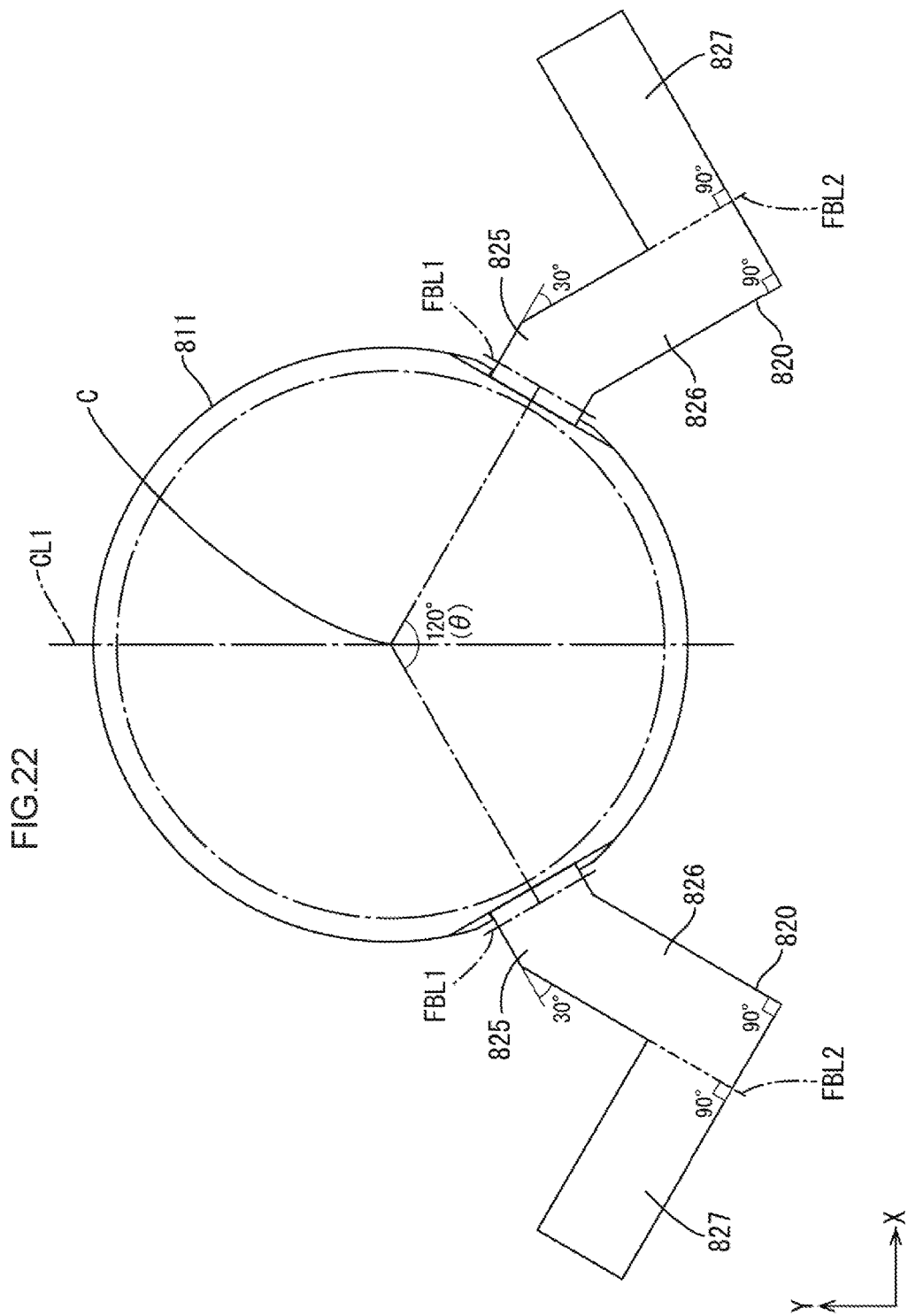
FIG. 22 is a plan view illustrating a liquid crystal panel and flexible circuit boards in an unfolded state according to a ninth embodiment of the present invention.
Figure 23:
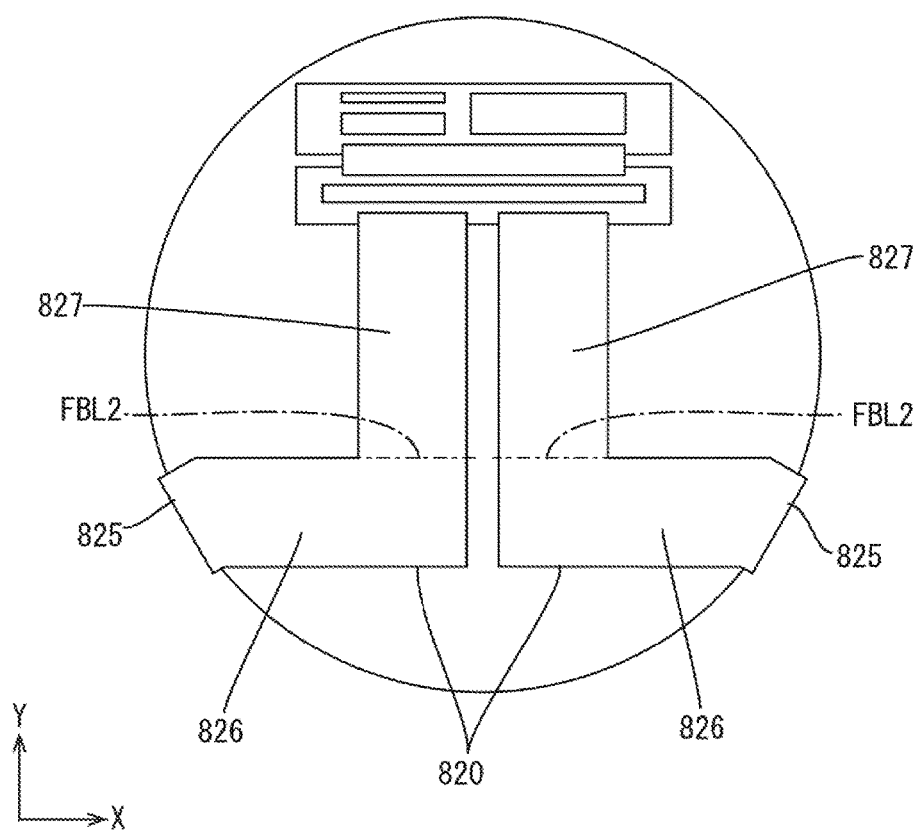
FIG. 23 is a bottom view of a liquid crystal display device including the flexible circuit boards folded and held on a back side of a backlight unit.

As illustrated in FIG. 22, two flexible circuit boards 820 are mounted to a liquid crystal panel 811 such that a center angle defined by a line joining a middle point of the flexible circuit board 820 with respect to the width direction and the center C of the liquid crystal panel 811 and a ling joining a middle point of the other flexible circuit board 820 with respect to the width direction is 120°. The shapes of the flexible circuit boards 820 in the plan view are as follows. The flexible circuit boards 820 include first portions 825, second portions 826, and third portions 827. Angles of the second portions 826 relative to the first portions 825 are 30°. Angles of the third portions 827 relative to the second portions 826 are 90°, which is the same as the seventh embodiment. The angle of the second portions 826 relative to the first portions 725 is expressed by (180°−θ)/2 but not θ/2, where θ is a center angle defined by a line joining the middle point of the flexible circuit board 820 with respect to the width direction and the center C of the liquid crystal panel 811 and a line joining the middle point of the other flexible circuit board 820 with respect to the width direction and the center C of the liquid crystal panel 811. The second portions 826 of the flexible circuit boards 820 in the unfolded state turn outward with respect to the X-axis direction (the arrangement direction of the flexible circuit boards 820), that is, away from the first center line CL1 (away from the other flexible circuit board 820), relative to the first portions 825. When the flexible circuit boards 820 are folded along the first folding lines FBL1, as illustrated in FIG. 23, the second portions 826 extend parallel to the X-axis direction and the third portions 827 extend parallel to the Y-axis direction. The positions of the folding lines FBL1 and FBL2 in the flexible circuit boards 820 in the plan view (e.g., the angles relative to the outer edges) are the same as the seventh embodiment.

Tenth Embodiment

A tenth embodiment will be described with reference to FIG. 24. The tenth embodiment includes flexible circuit boards 920 having configurations different from the first embodiment. Configurations, functions, and effects similar to those of the first embodiment will not be described.

Figure 24:
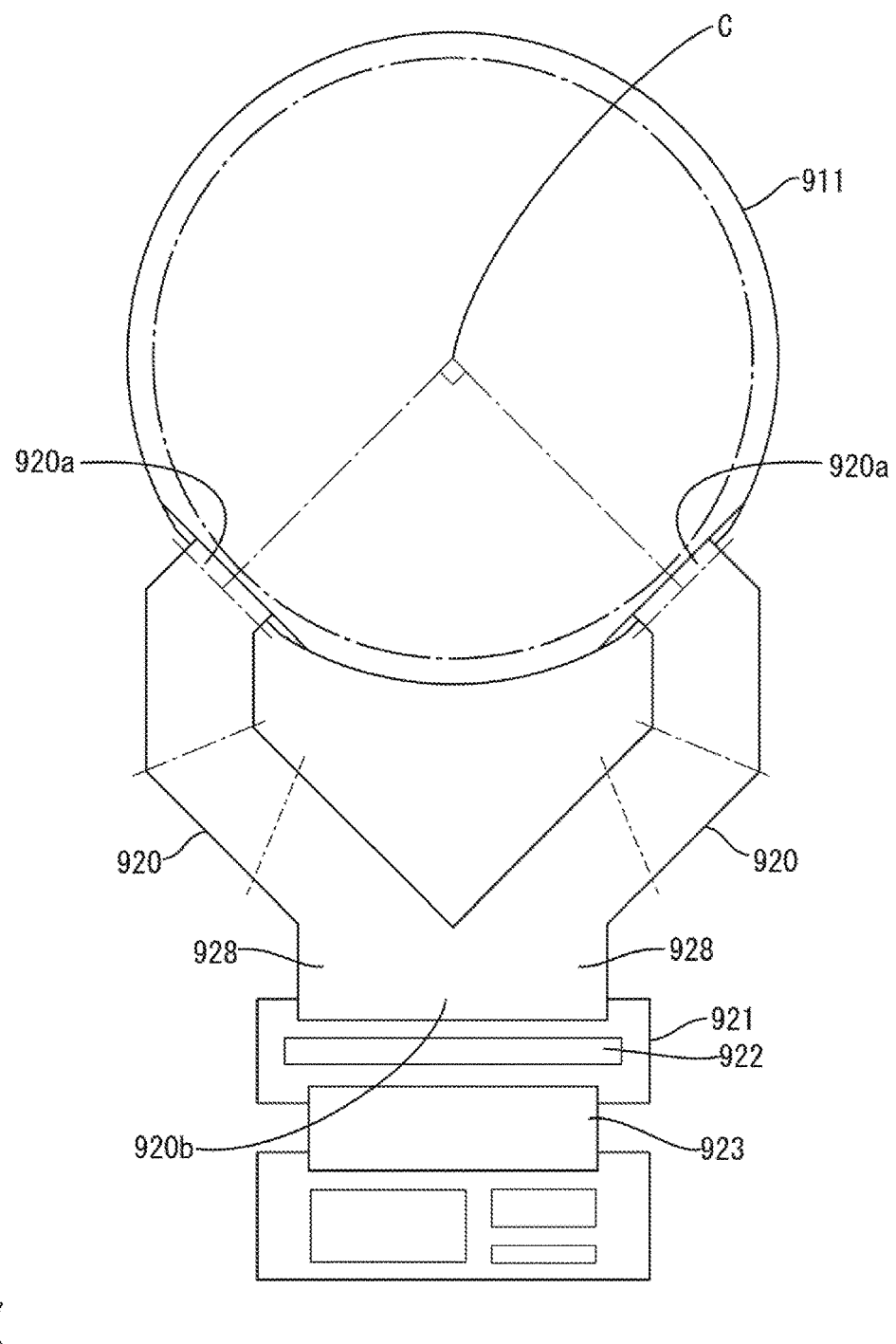
FIG. 24 is a plan view illustrating a liquid crystal panel, flexible circuit boards in an unfolded state, a panel driver board, and a controller board according to a tenth embodiment of the present invention.

As illustrated in FIG. 24, two flexible circuit boards 920 according to this embodiment have the configurations in which portions of the flexible circuit boards 920 are connected. Specifically, the flexible circuit boards 920 include fourth portions 928 including second ends 920*b* connected to a panel driver board 921 are connected and provided as an integral portion. First ends 920*a* of the flexible circuit boards 920 are individually mounted to a liquid crystal panel 911. The second ends 920*b* that are provided as the integral portion are collectively mounted to the panel driver board 921. According to the configuration, steps for mounting the flexible circuit boards 920 to the panel driver board 921 can be reduced. This configuration is preferable for reducing the throughput and the production cost.

As described above, in this embodiment, the second ends 920*b* of the flexible circuit boards 920 that continue from each other are collectively mounted to the panel driver board 921. According to the configuration, the steps for mounting the flexible circuit boards 920 to the panel driver board 921 can be reduced. This configuration is preferable for reducing the throughput and the production cost.

Eleventh Embodiment

An eleventh embodiment will be described with reference to FIG. 25. The eleventh embodiment includes flexible circuit boards 1020 having configurations similar to the tenth embodiment. Other configurations of the eleventh embodiment are similar to the fourth embodiment. The Configurations, functions, and effects similar to those of the fourth and the tenth embodiments will not be described.

Figure 25:
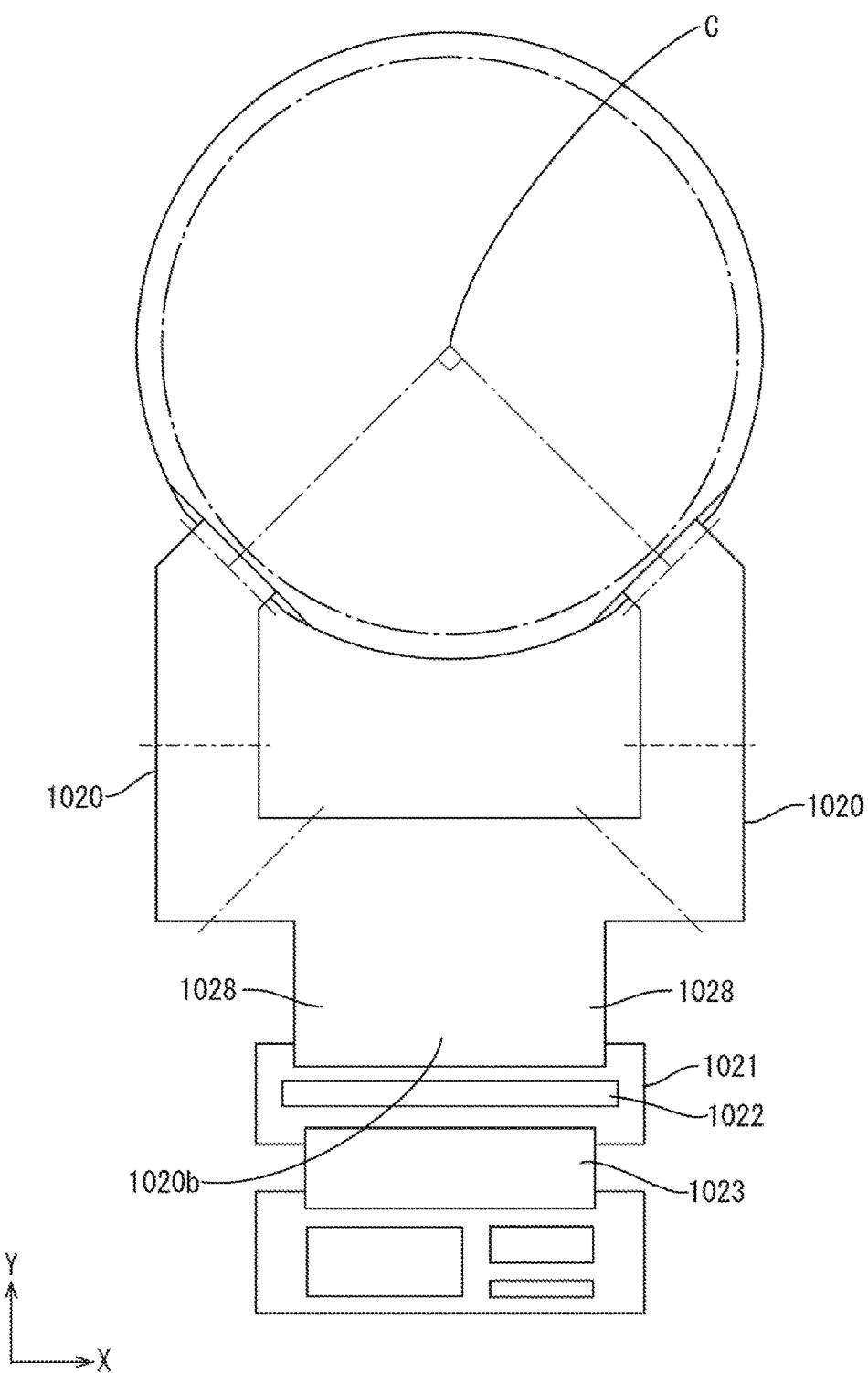
FIG. 25 is a plan view illustrating a liquid crystal panel, flexible circuit boards in an unfolded state, a panel driver board, and a controller board according to an eleventh embodiment of the present invention.

As illustrated in FIG. 25, two flexible circuit boards 1020 according to this embodiment include fourth portions 1028 including second ends 1020*b* connected to a panel driver board 1021. The fourth portions 1028 are connected with each other and provided as an integral portion. According to the configuration, the functions and the effects similar to those of the tenth embodiment are achieved.

Twelfth Embodiment

A twelfth embodiment will be described with reference to FIG. 26. The twelfth embodiment includes flexible circuit boards 1120 having configurations different from the first embodiment. Configurations, functions, and effects similar to those of the first embodiment will not be described.

Figure 26:
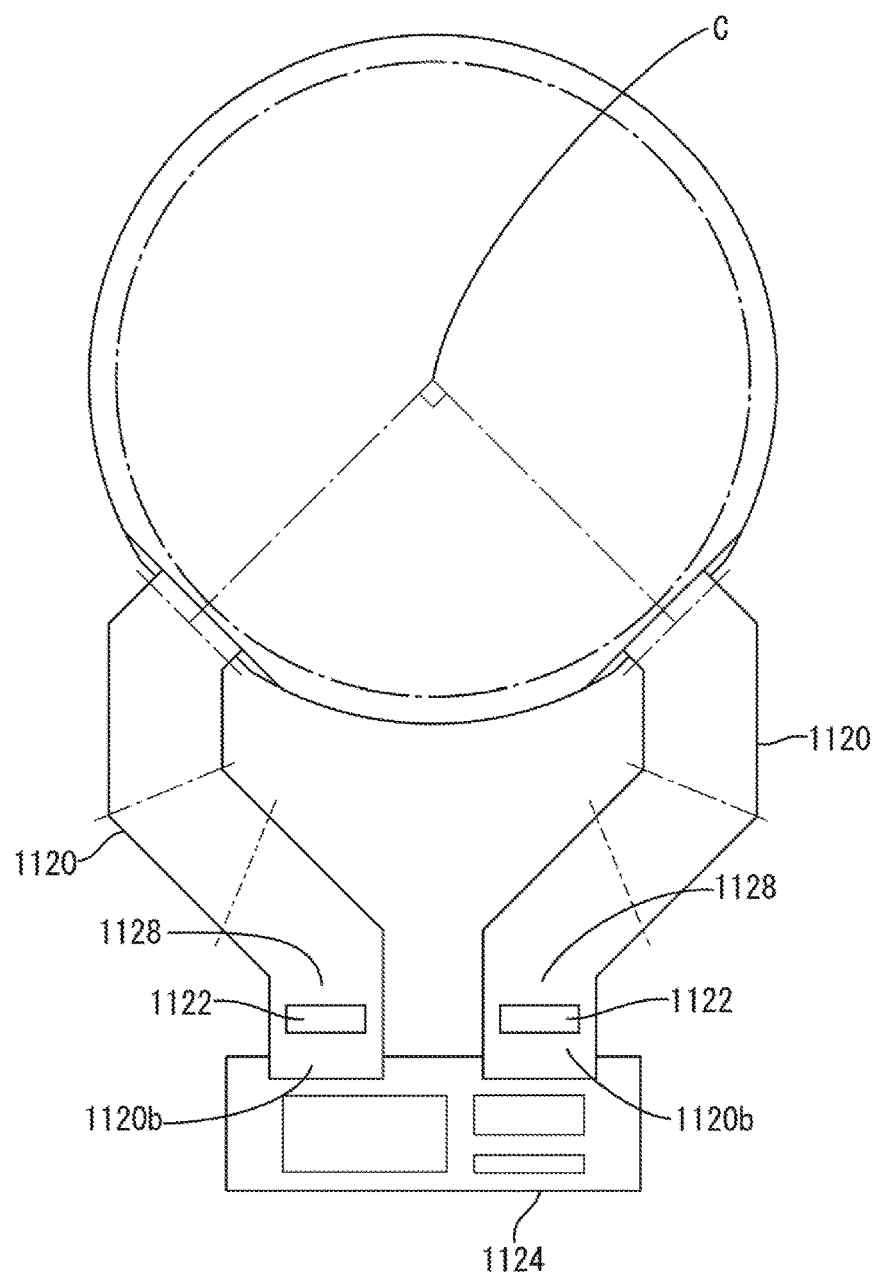
FIG. 26 is a plan view illustrating a liquid crystal panel, flexible circuit boards in an unfolded state, and a controller board according to a twelfth embodiment of the present invention.

As illustrated in FIG. 26, two flexible circuit boards 1120 according to this embodiment include drivers 1122 mounted on film bases, respectively. The drivers 1122 are directly mounted on fourth portions 1128 of the flexible circuit boards 1120. In this embodiment, the panel driver board 21 and the flexible relay board 23 in the first embodiment (see FIG. 2) are omitted. Second ends 1120*b* of the flexible circuit boards 1120 are directly mounted on the same edge portion of a controller board 1124. According to the configuration, the number of components can be reduced and mounting steps can be reduced. This configuration is preferable for reducing the cost.

Thirteenth Embodiment

A thirteenth embodiment will be described with reference to FIG. 27. The thirteenth embodiment includes flexible circuit boards 1220 having configurations similar to the twelfth embodiment. Other configurations of the thirteenth embodiment are similar to the fourth embodiment. The configurations, functions, and effects similar to those of the fourth and the twelfth embodiments will not be described.

Figure 27:
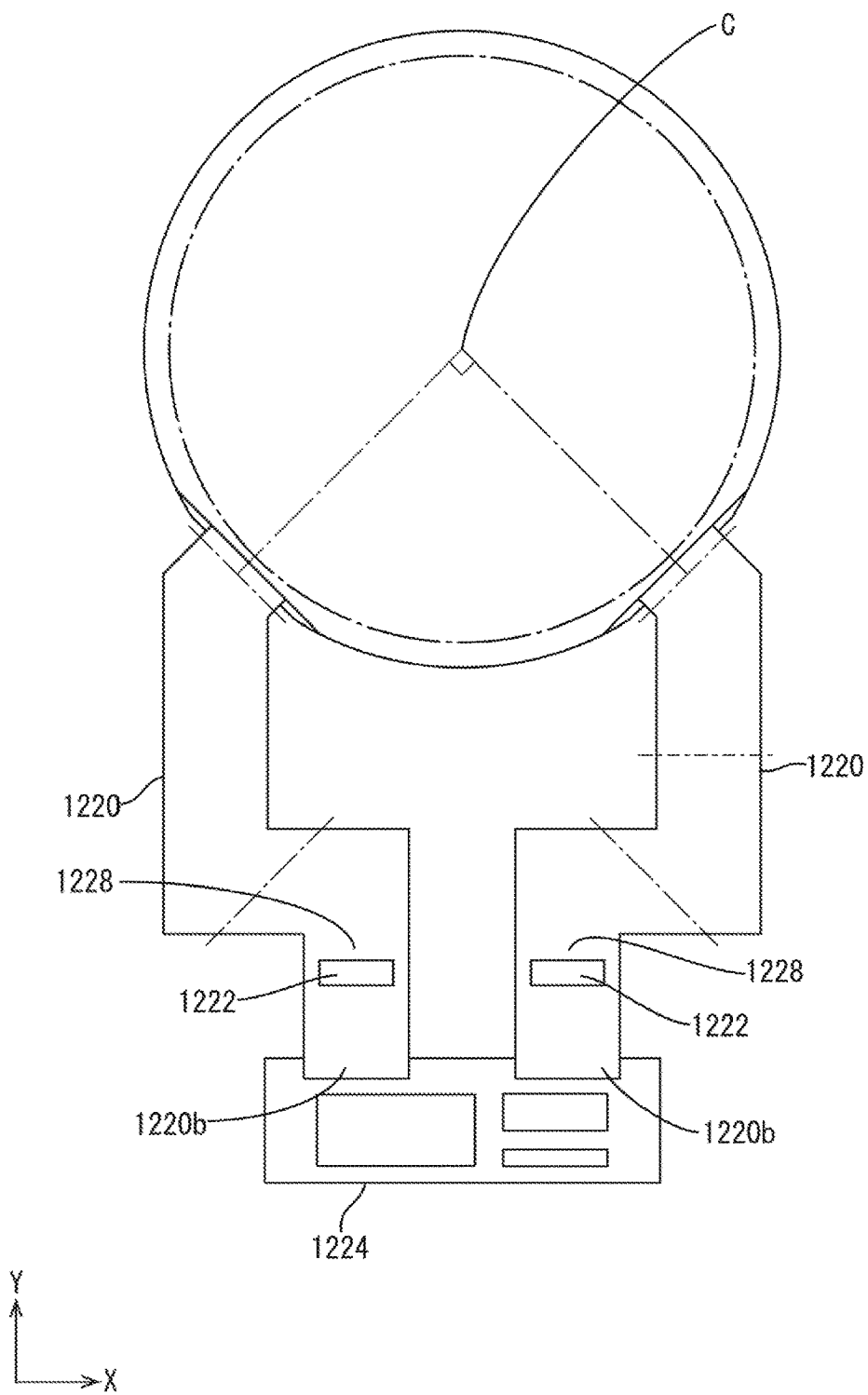
FIG. 27 is a plan view illustrating a liquid crystal panel, flexible circuit boards in an unfolded state, and a controller board according to a thirteenth embodiment of the present invention.

As illustrated in FIG. 27, two flexible circuit boards 1220 according to this embodiment include drivers 1222 mounted on film bases, respectively. The drivers 1222 are directly mounted on fourth portions 1228 of the flexible circuit boards 1220. In this embodiment, the panel driver board 321 and the flexible relay board in the fourth embodiment (see FIG. 10) are omitted. Second ends 1220*b* of the flexible circuit boards 1220 are directly mounted on the same edge portion of a controller board 1224. According to the configuration, the functions and the effects similar to those of the twelfth embodiment are achieved.

Fourteenth Embodiment

A fourteenth embodiment will be described with reference to FIG. 28. The fourteenth embodiment includes flexible circuit boards 1320 having configurations similar to the twelfth embodiment. Other configurations of the fourteenth embodiment are similar to the seventh embodiment. The configurations, functions, and effects similar to those of the seventh and the twelfth embodiments will not be described.

Figure 28:
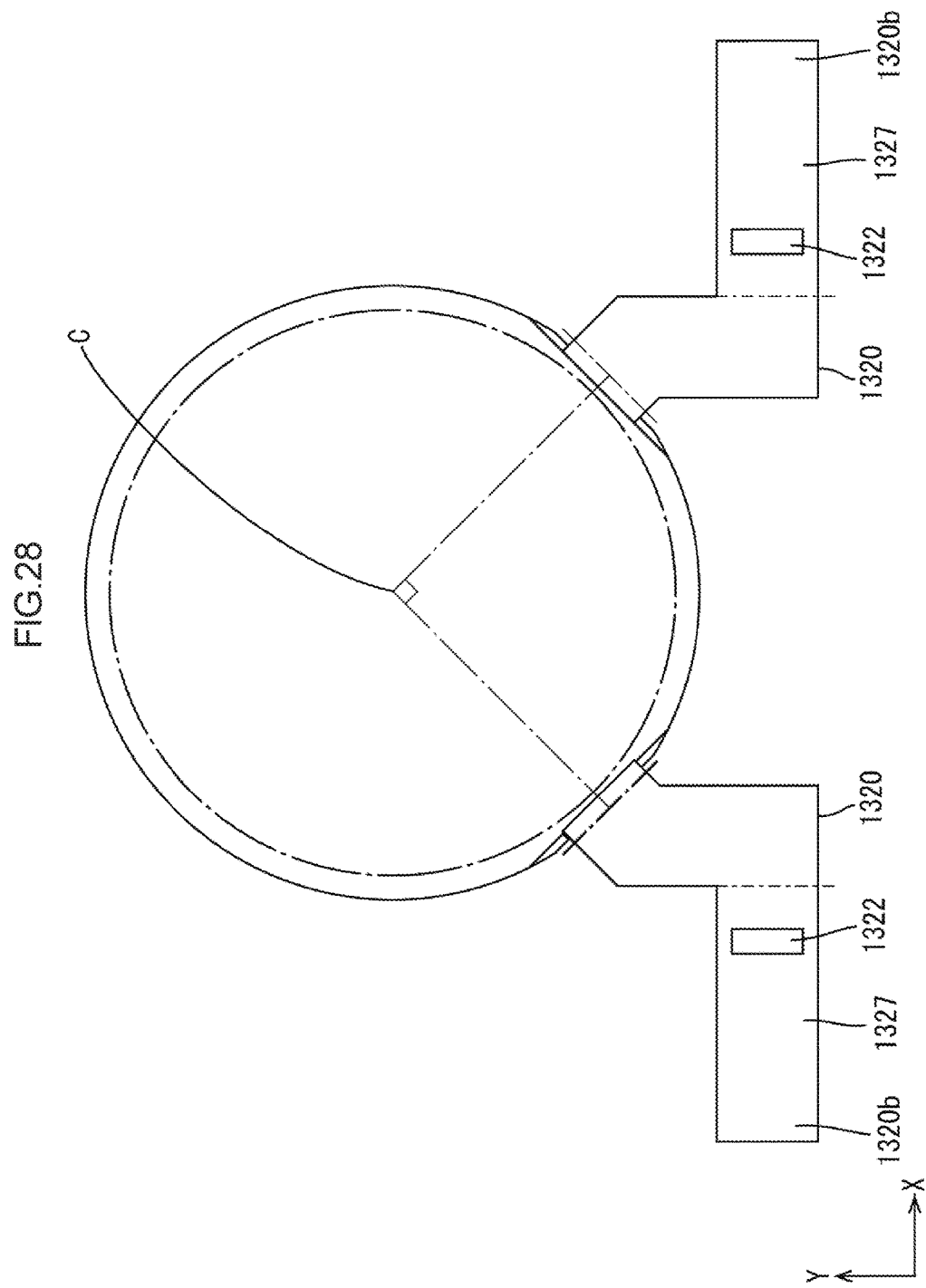
FIG. 28 is a plan view illustrating a liquid crystal panel and flexible circuit boards in an unfolded state according to a fourteenth embodiment of the present invention.

As illustrated in FIG. 28, two flexible circuit boards 1320 according to this embodiment include drivers 1322 mounted on film bases, respectively. The drivers 1322 are directly mounted on third portions 1327 of the flexible circuit boards 1320. In this embodiment, the panel driver board 621 and the flexible relay board in the seventh embodiment (see FIG. 18) are omitted. Second ends 1320*b* of the flexible circuit boards 1320 are directly mounted on the same edge portion of a controller board (not illustrated). According to the configuration, the functions and the effects similar to those of the twelfth embodiment are achieved.

Fifteenth Embodiment

A fifteenth embodiment will be described with reference to FIG. 29. The fifteenth embodiment includes flexible circuit boards 1420 having configurations similar to the twelfth embodiment. Other configurations of the fifteenth embodiment are similar to the tenth embodiment. The configurations, functions, and effects similar to those of the tenth and the twelfth embodiments will not be described.

Figure 29:
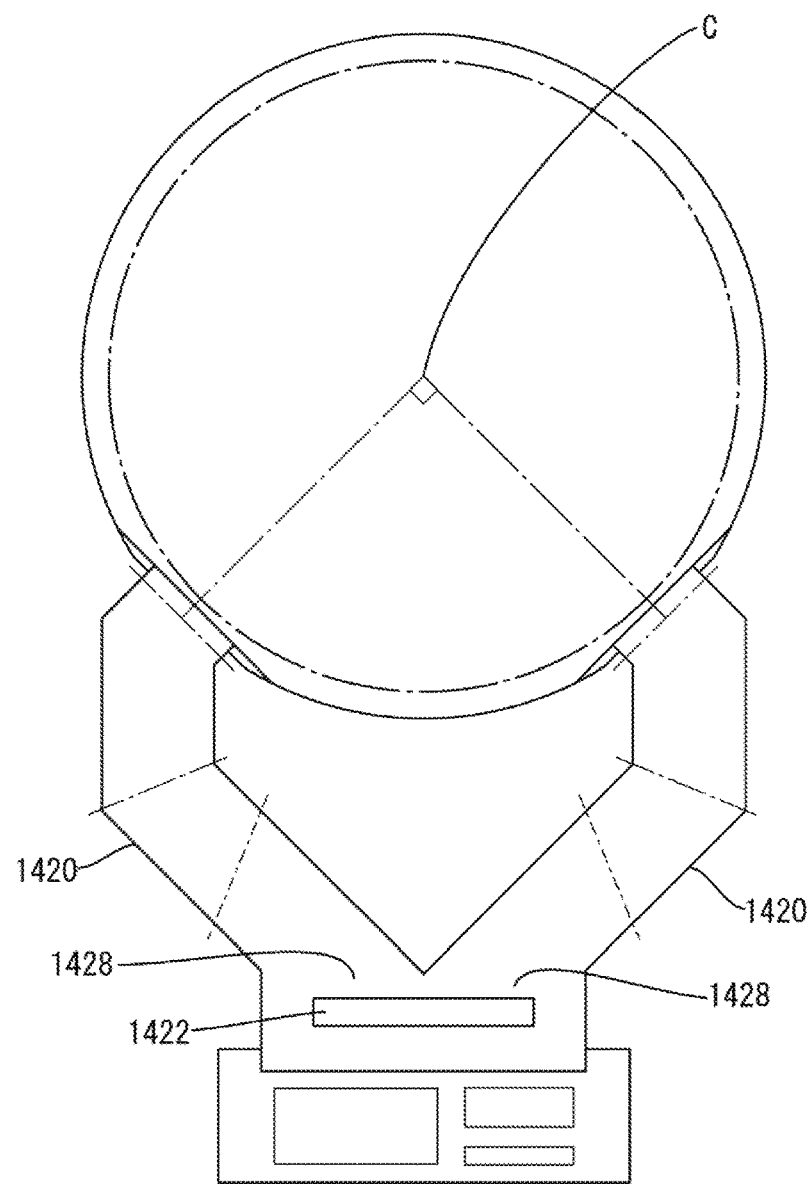
FIG. 29 is a plan view illustrating a liquid crystal panel, flexible circuit boards in an unfolded state, and a controller board according to a fifteenth embodiment of the present invention.

As illustrated in FIG. 29, two flexible circuit boards 1420 according to this embodiment include fourth portions 1428 that are connected with each other and a driver 1422 directly mounted on the fourth portions 1428. The driver 1422 is mounted on the fourth portions 1428 of the flexible circuit boards 1420 to cross over the boundary between the fourth portions 1428, that is, the driver 1422 is a common driver. According to the configuration, the functions and the effects similar to those of the twelfth embodiment can be achieved. Furthermore, the number of the driver 1422 can be reduced and thus the production cost of the flexible circuit boards 1420 can be further reduced.

Sixteenth Embodiment

A sixteenth embodiment will be described with reference to FIG. 30. The sixteenth embodiment includes flexible circuit boards 1520 having configurations similar to the fifteenth embodiment. Other configurations of the sixteenth embodiment are similar to the eleventh embodiment. The configurations, functions, and effects similar to those of the eleventh and the fifteenth embodiments will not be described.

Figure 30:
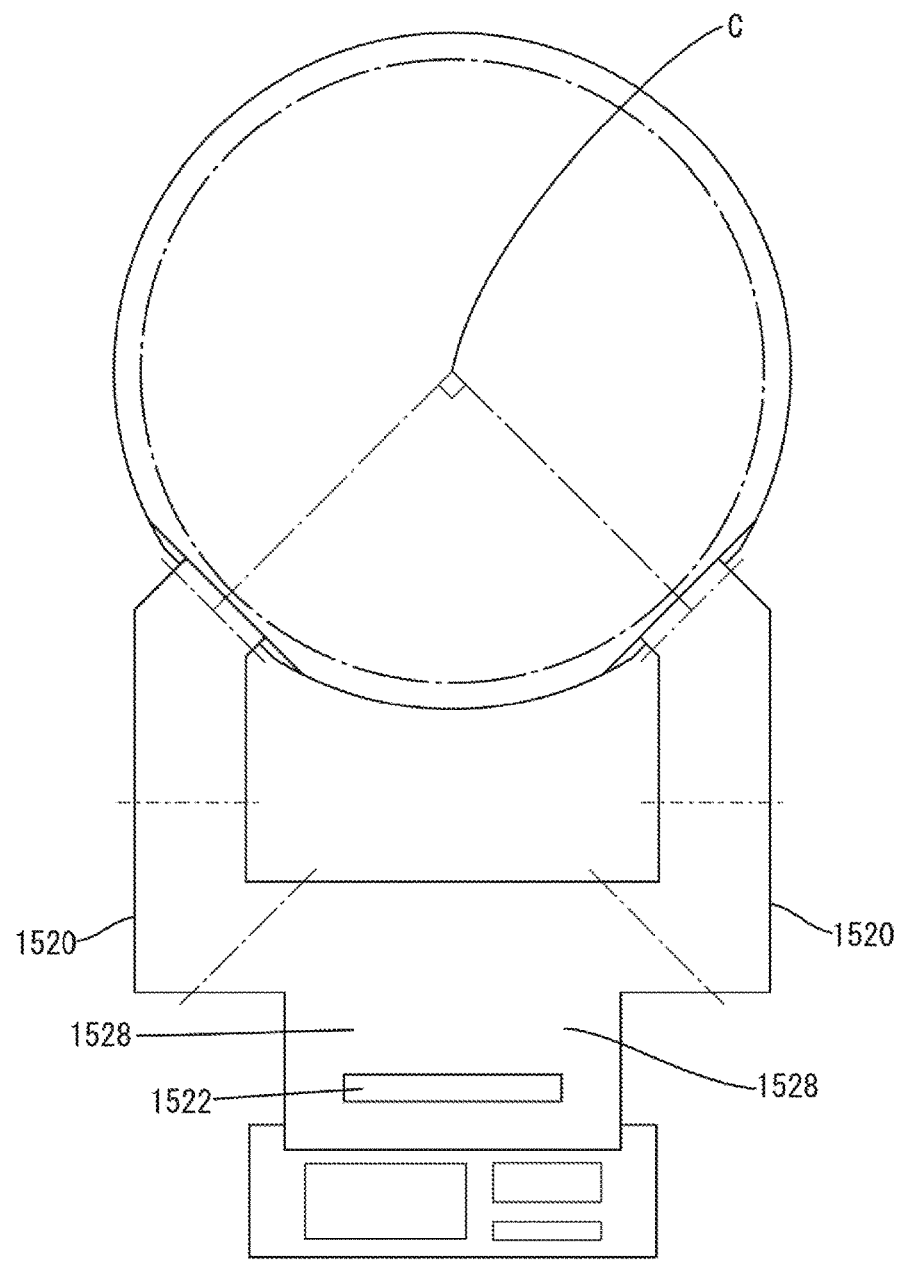
FIG. 30 is a plan view illustrating a liquid crystal panel, flexible circuit boards in an unfolded state, and a controller board according to a sixteenth embodiment of the present invention.

As illustrated in FIG. 30, two flexible circuit boards 1520 according to this embodiment include fourth portions 1528 that are connected with each other and a driver 1522 directly mounted on the fourth portions 1528. The driver 1522 is mounted on the fourth portions 1528 of the flexible circuit boards 1520 to cross over the boundary between the fourth portions 1528, that is, the driver 1522 is a common driver. According to the configuration, the functions and the effects similar to those of the fifteenth embodiment can be achieved.

Seventeenth Embodiment

A sixteenth embodiment will be described with reference to FIG. 31. The sixteenth embodiment includes a liquid crystal panel 1611 having a configuration different from the first embodiment. Configurations, functions, and effects similar to those of the first will not be described.

Figure 31:
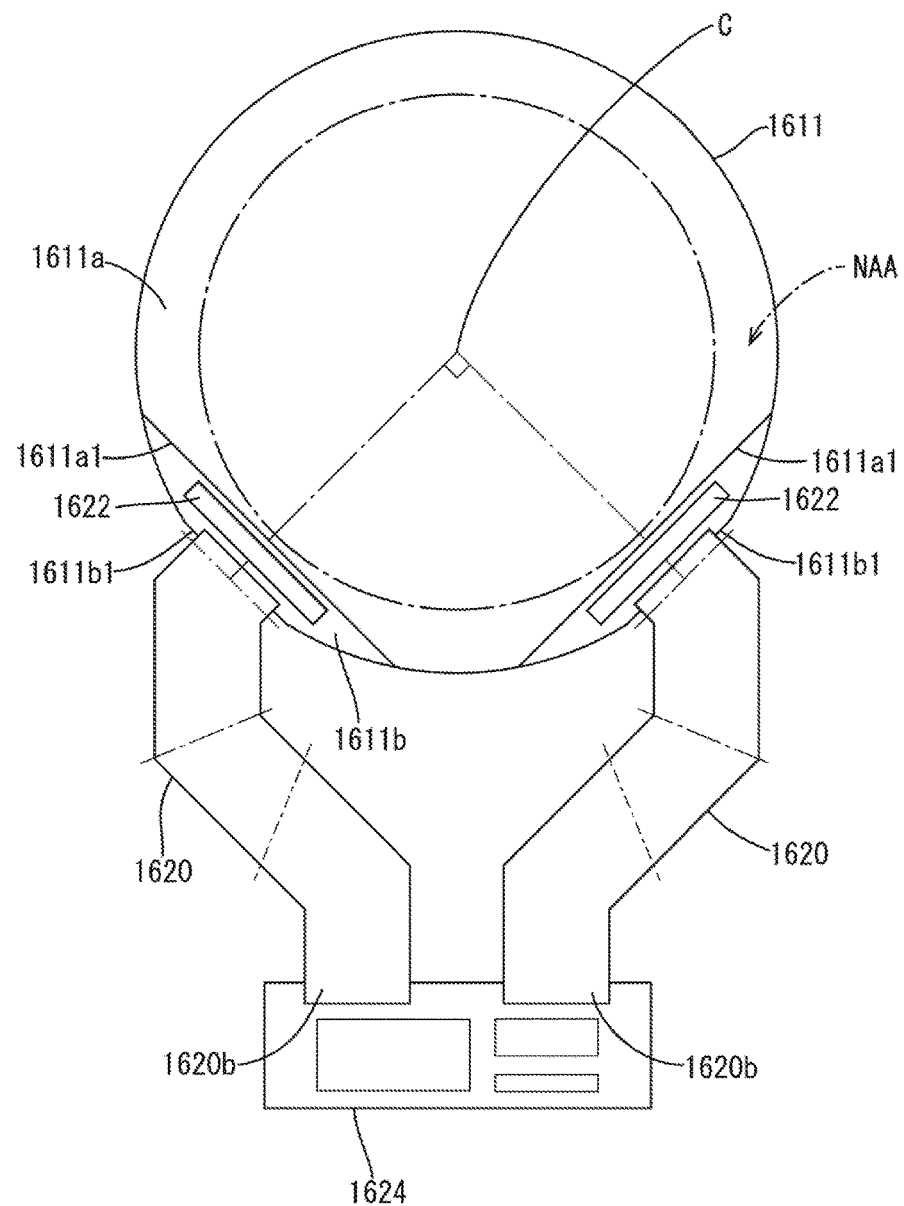
FIG. 31 is a plan view illustrating a liquid crystal panel, flexible circuit boards in an unfolded state, and a controller board according to a seventeenth embodiment of the present invention.

As illustrated in FIG. 31, drivers 1622 are mounted to an array substrate 1611b of the liquid crystal panel 1611 according to this embodiment. The drivers 1622 are directly mounted in areas between linear edge sections 1611b1 of the array substrate 1611b and linear edge sections 1611a1 of a CF substrate 1611a in a non-display area NAA using the chip on glass (COG) technology. In this embodiment, the panel driver board 21 and the flexible relay board 23 (see FIG. 2) in the first embodiment are omitted. Second ends 1620b of the flexible circuit boards 1620 are directly mounted to the same edge portion of a controller board 1624. According to the configuration, the number of components and the number of mounting steps are reduced. This configuration is preferable for reducing the cost.

Eighteenth Embodiment

An eighteenth embodiment will be described with reference to FIG. 32. The eighteenth embodiment includes a liquid crystal panel 1711 having a configuration similar to the seventeenth embodiment. Other configurations are similar to the fourth embodiment. The configuration, functions, and effects similar to those of the fourth and the seventeenth embodiments will not be described.

Figure 32:
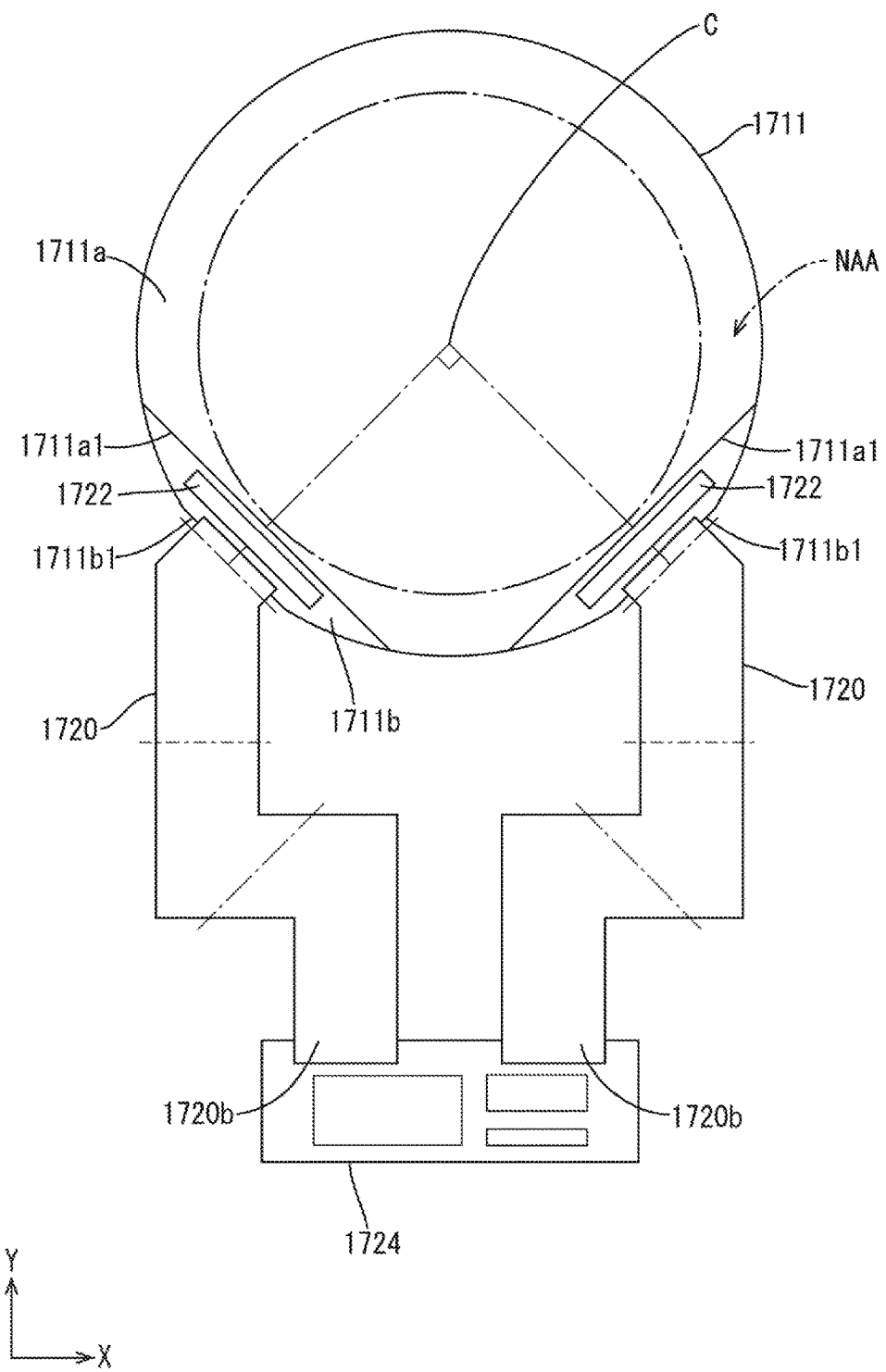
FIG. 32 is a plan view illustrating a liquid crystal panel, flexible circuit boards in an unfolded state, and a controller board according to an eighteenth embodiment of the present invention.

As illustrated in FIG. 32, drivers 1722 are mounted to an array substrate 1711b of the liquid crystal panel 1711 according to this embodiment. The drivers 1722 are directly mounted in areas between linear edge sections 1711b1 of the array substrate 1711b and linear edge sections 1711a1 of a CF substrate 1711a in a non-display area NAA using the COG technology. In this embodiment, the panel driver board 321 and the flexible relay board (see FIG. 10) in the fourth embodiment are omitted. Second ends 1720b of the flexible circuit boards 1720 are directly mounted to the same edge portion of a controller board 1724. According to the configuration, the functions and the effects similar to those of the seventeenth embodiment can be achieved.

Nineteenth Embodiment

A nineteenth embodiment will be described with reference to FIG. 33. The nineteenth embodiment includes a liquid crystal panel 1811 having a configuration similar to the seventeenth embodiment. Other configurations are similar to the seventh embodiment. The configuration, functions, and effects similar to those of the seventh and the seventeenth embodiments will not be described.

Figure 33:
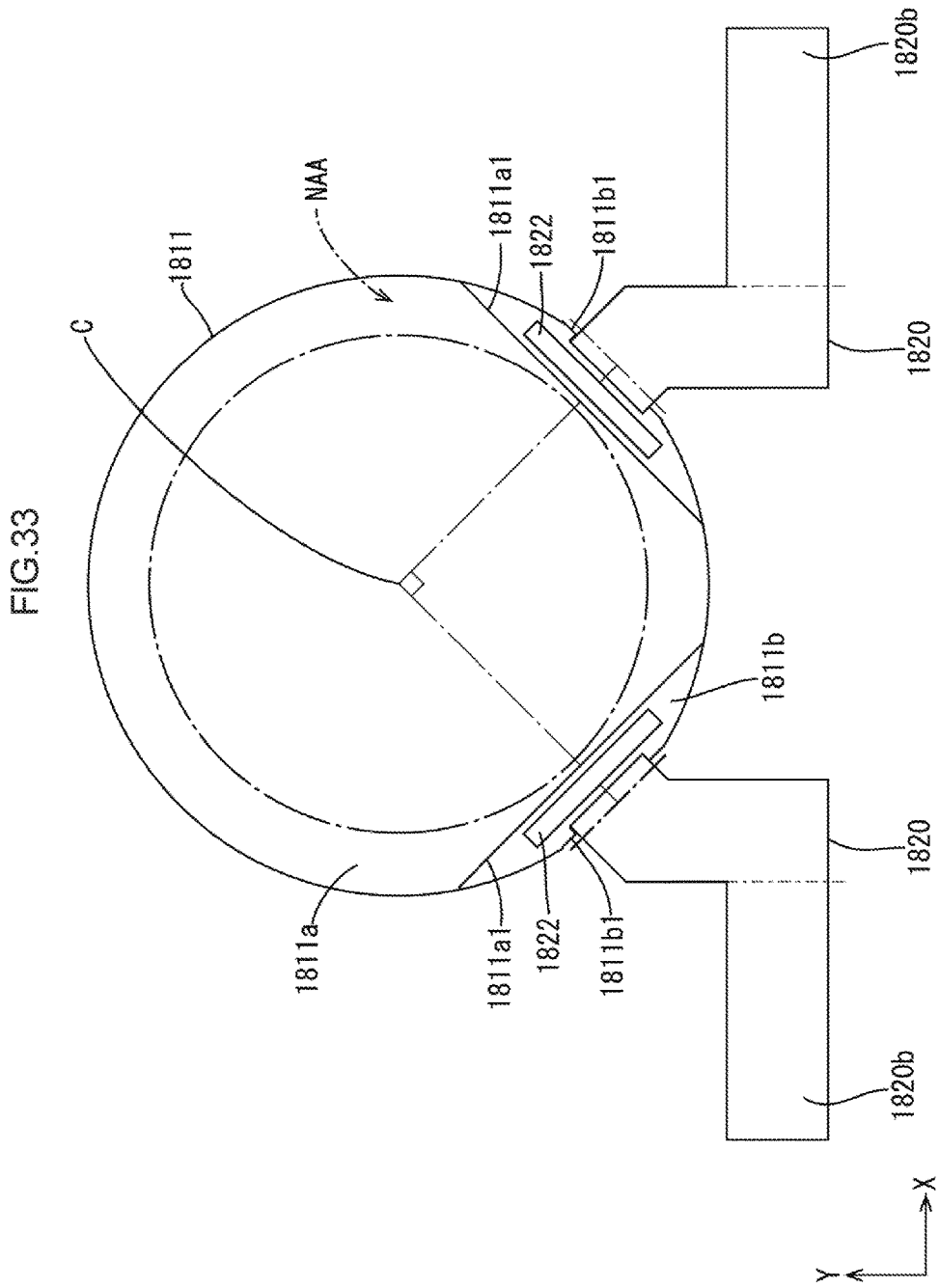
FIG. 33 is a plan view illustrating a liquid crystal panel, flexible circuit boards in an unfolded state, and a controller board according to a nineteenth embodiment of the present invention.

As illustrated in FIG. 33, drivers 1822 are mounted to an array substrate 1811b of the liquid crystal panel 1811 according to this embodiment. The drivers 1822 are directly mounted in areas between linear edge sections 1811b1 of the array substrate 1811b and linear edge sections 1811a1 of a CF substrate 1811a in a non-display area NAA using the COG technology. In this embodiment, the panel driver board 621 and the flexible relay board (see FIG. 18) in the seventh embodiment are omitted. Second ends 1820b of flexible circuit boards 1820 are directly mounted to the same edge portion of a controller board (not illustrated). According to the configuration, the functions and the effects similar to those of the seventeenth embodiment can be achieved.

Twentieth Embodiment

A twentieth embodiment will be described with reference to FIG. 34. The twentieth embodiment includes a liquid crystal panel 1911 having a configuration similar to the seventeenth embodiment. Other configurations are similar to the tenth embodiment. The configuration, functions, and effects similar to those of the tenth and the seventeenth embodiments will not be described.

Figure 34:
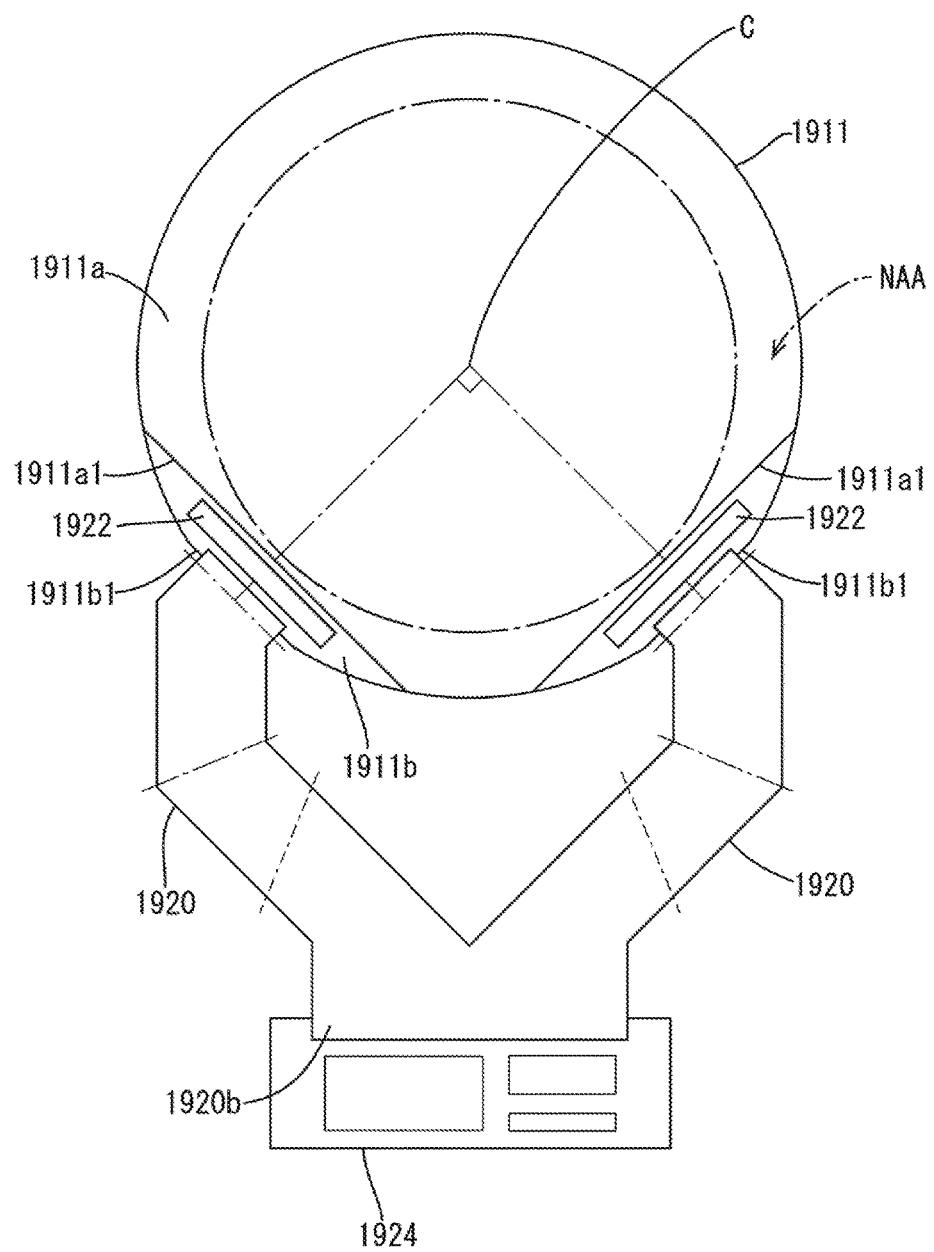
FIG. 34 is a plan view illustrating a liquid crystal panel, flexible circuit boards in an unfolded state, and a controller board according to a twentieth embodiment of the present invention.

As illustrated in FIG. 34, drivers 1922 are mounted to an array substrate 1911b of the liquid crystal panel 1911 according to this embodiment. The drivers 1922 are directly mounted in areas between linear edge sections 1911b1 of the array substrate 1911b and linear edge sections 1911a1 of a CF substrate 1911a in a non-display area NAA using the COG technology. In this embodiment, the panel driver board 921 and the flexible relay board (see FIG. 24) in the tenth embodiment are omitted. Second ends 1920b of flexible circuit boards 1920 are directly and collectively mounted to the same edge portion of a controller board 1924. According to the configuration, the functions and the effects similar to those of the seventeenth embodiment can be achieved.

Twenty-First Embodiment

A twenty-first embodiment will be described with reference to FIG. 35. The twenty-first embodiment includes a liquid crystal panel 2011 having a configuration similar to the seventeenth embodiment. Other configurations are similar to the eleventh embodiment. The configuration, functions, and effects similar to those of the eleventh and the seventeenth embodiments will not be described.

Figure 35:
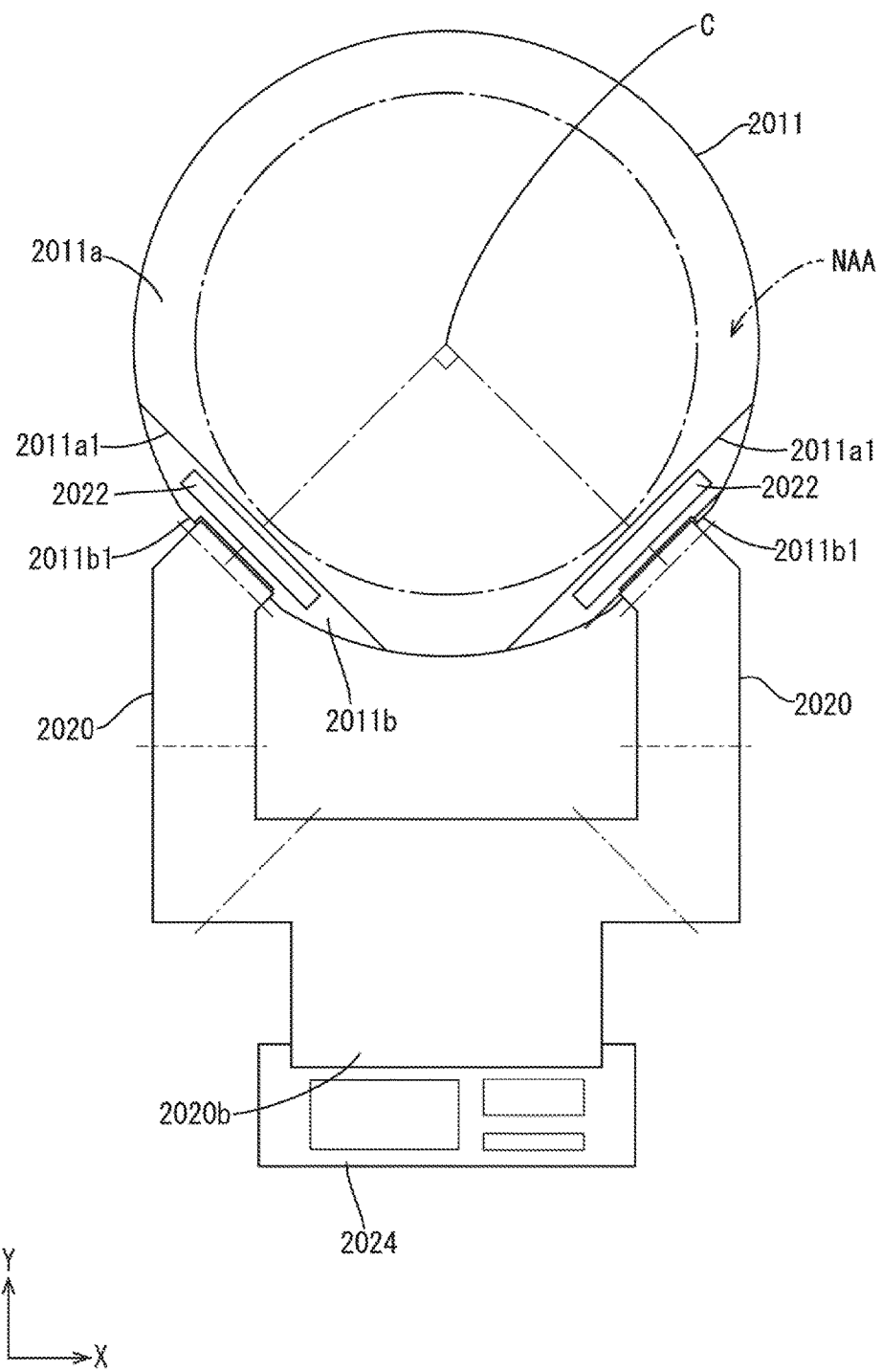
FIG. 35 is a plan view illustrating a liquid crystal panel, flexible circuit boards in an unfolded state, and a controller board according to a twenty-first embodiment of the present invention.

As illustrated in FIG. 35, drivers 2022 are mounted to an array substrate 2011b of the liquid crystal panel 2011 according to this embodiment. The drivers 2022 are directly mounted in areas between linear edge sections 2011b1 of the array substrate 2011b and linear edge sections 2011a1 of a CF substrate 2011a in a non-display area NAA using the COG technology. In this embodiment, the panel driver board 1021 and the flexible relay board (see FIG. 25) in the eleventh embodiment are omitted. Second ends 2020b of flexible circuit boards 2020 are directly and collectively mounted to the same edge portion of a controller board 2024. According to the configuration, the functions and the effects similar to those of the seventeenth embodiment can be achieved.

Twenty-Second Embodiment

A twenty-second embodiment will be described with reference to FIG. 36. The twenty-second embodiment includes a liquid crystal panel 2111 having a shape different from the third embodiment in the plan view. Configurations, functions, and effects similar to those of the third embodiment will not be described.

Figure 36:
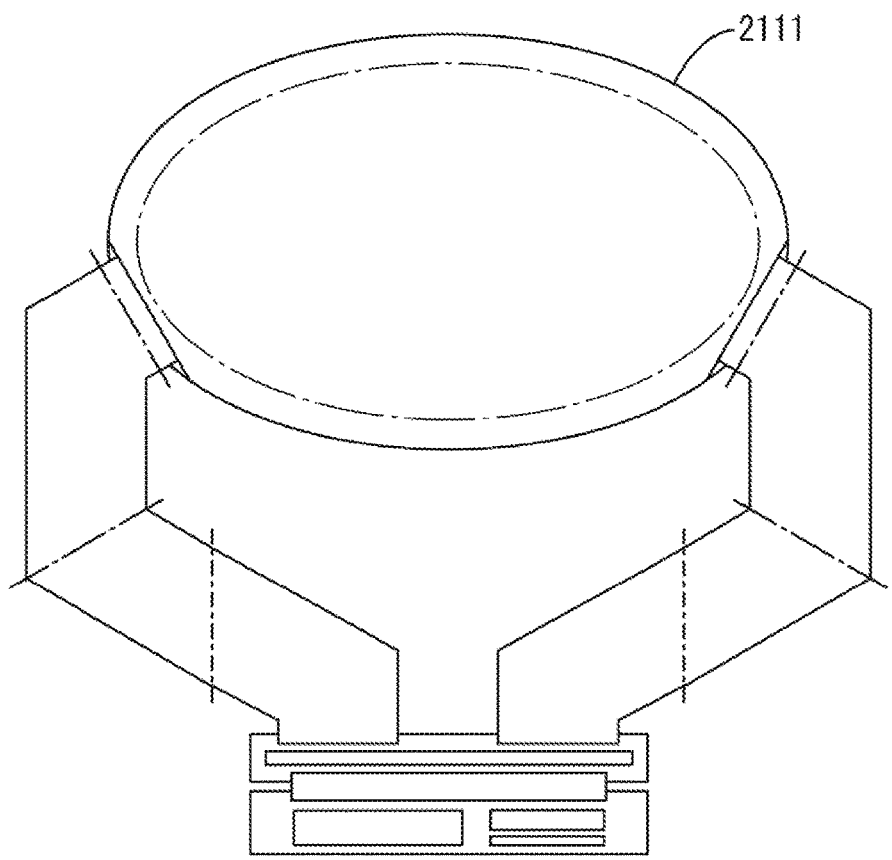
FIG. 36 is a plan view illustrating a liquid crystal panel, flexible circuit boards in an unfolded state, and a controller board according to a twenty-second embodiment of the present invention.

As illustrated in FIG. 36, the liquid crystal panel 2111 according to this embodiment has a horizontally-long oval shape in the plan view. Even with this configuration, the functions and the effects similar to those of the third embodiment can be achieved.

Twenty-Third Embodiment

A twenty-third embodiment will be described with reference to FIGS. 37 and 38. The twenty-third embodiment includes flexible circuit boards 2220, the number of which is different from the first embodiment. Configurations, functions, and effects similar to those of the first embodiment will not be described.

Figure 37:
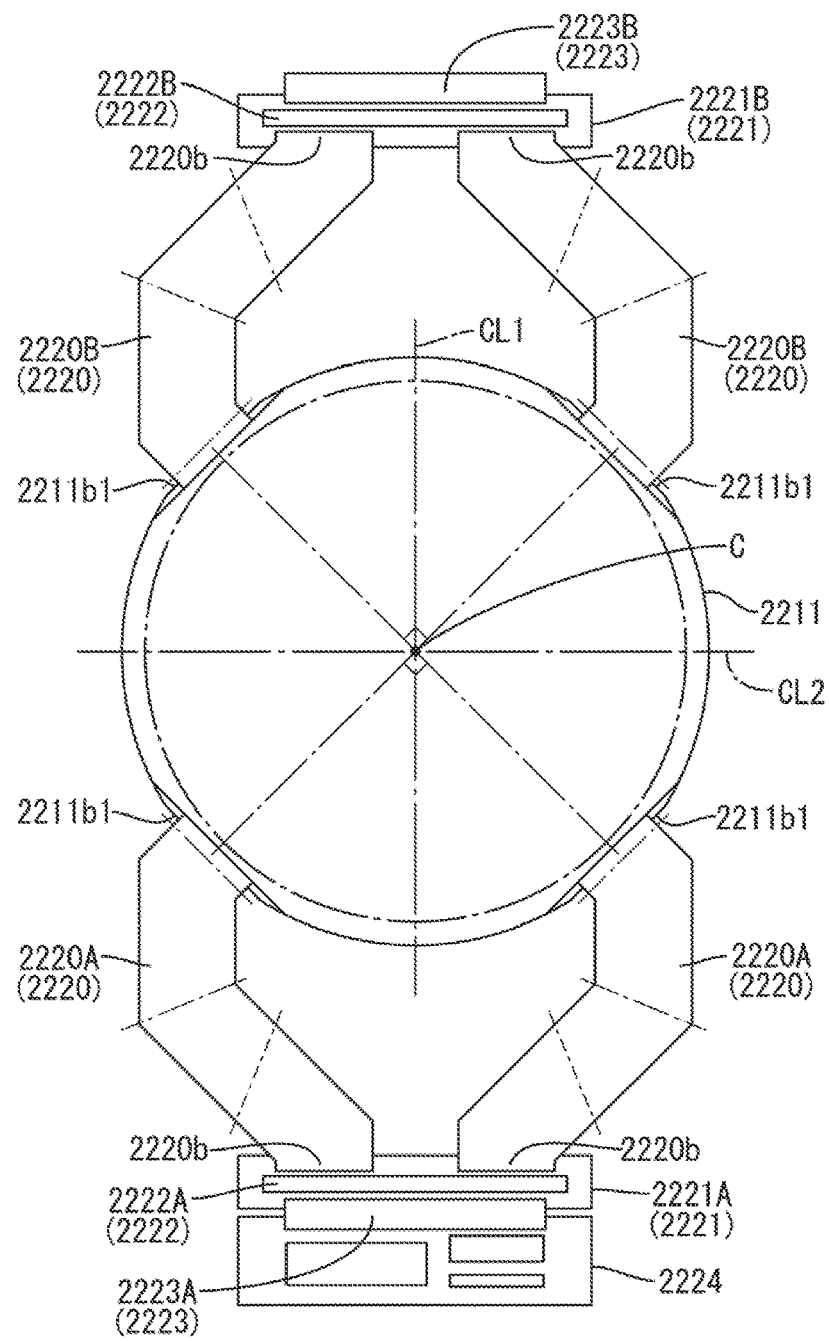
FIG. 37 is a plan view illustrating a liquid crystal panel, flexible circuit boards in an unfolded state, and a controller board according to a twenty-third embodiment of the present invention.
Figure 38:
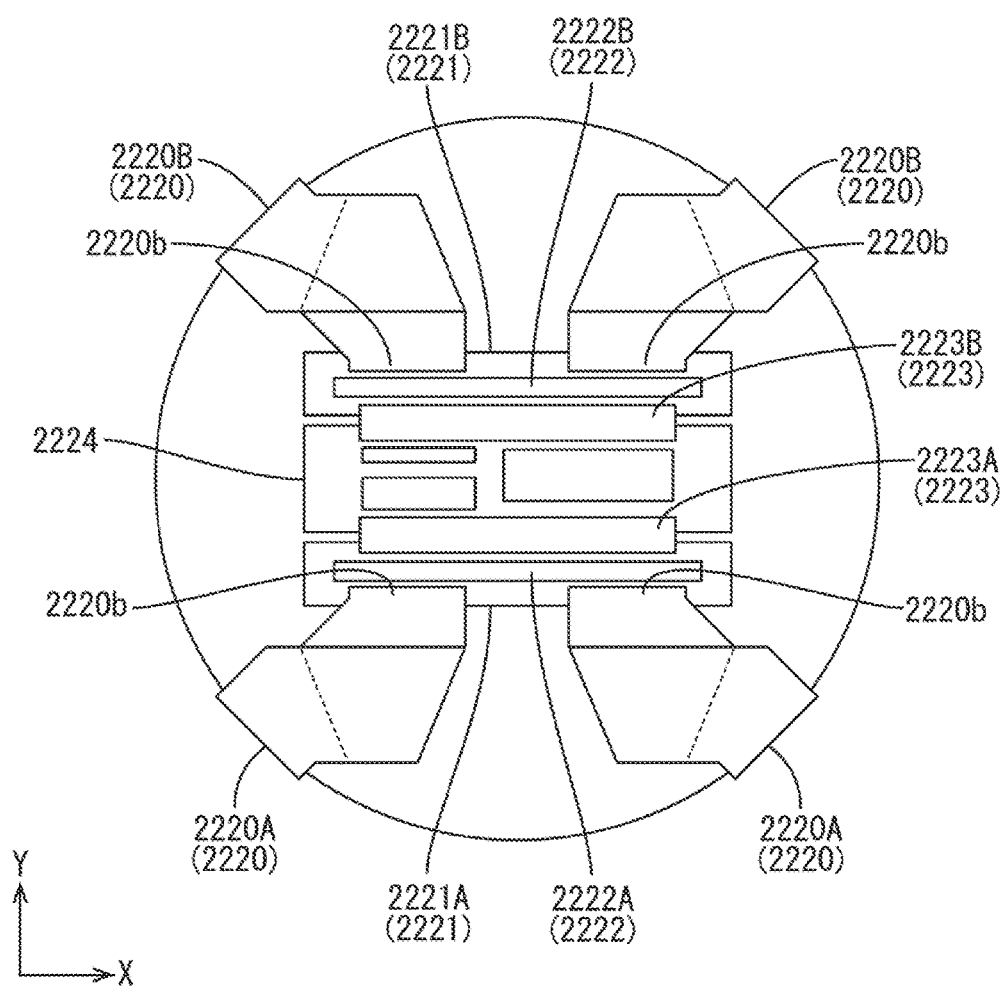
FIG. 38 is a bottom view of a liquid crystal display device including flexible circuit boards folded and held on a back side of a backlight unit.

As illustrated in FIG. 37, four of the flexible circuit boards 2220 according to this embodiment are mounted to a liquid crystal panel 2211. The flexible circuit boards 2220 include two first flexible circuit boards 2220A and two second flexible circuit boards 2220B. The first flexible circuit boards 2220A are disposed in one of halves (the lower half in FIG. 37) divided by a second center line CL2 perpendicular to a first center line CL1. The second flexible circuit boards 2220B are disposed in the other half (the upper half in FIG. 37). The first flexible circuit boards 2220A and the second flexible circuit boards 2220B are separated from each other with the first center line CL1 therebetween. Namely, four flexible circuit boards 2220 are disposed in four areas divided by the center lines CL1 and CL2 that are perpendicular to each other, respectively. The first flexible circuit boards 2220A are symmetric to the second flexible circuit boards 2220B with respect to the second center line CL2. The liquid crystal panel 2211 includes four linear edge sections 2211b that are formed by cutting off outer edge portions of the liquid crystal panel 2211. Positions of the linear edge sections 2211b with respect to the circumferential direction correspond with the first flexible circuit boards 2220A and the second flexible circuit boards 2220B. Linear edge sections 2221b are symmetric with respect to the second center line CL2.

As illustrated in FIG. 37, panel driver boards 2221 include a first panel driver board 2221A and a second panel driver board 2221B and flexible relay boards 2223 include a first flexible relay board 2223A and a second flexible relay board 2223B. The first panel driver board 2221A and the first flexible relay board 2223A are connected to second ends of the first flexible circuit boards 2220A. The second panel driver board 2221B and the second flexible relay board 2223B are connected to second ends 2220b of the second flexible circuit boards 2220B. Drivers 2222 include a first driver 2222A and a second driver 2222B. The first driver 2222A is mounted on the first panel driver board 2221A and the second driver 2222B is mounted on the second panel driver board 2221B. As illustrated in FIG. 38, the first flexible relay board 2223A and the second flexible relay board 2223B are connected with long edge portions of controller board 2224, respectively. Namely, the controller board 2224 is a common controller board for the first flexible relay board 2223A and the second flexible relay board 2223B. The controller board 2224 is configured to supply signals to the first panel driver board 2221A and the first flexible circuit boards 2220A and to the second panel driver board 2221B and the second flexible circuit boards 2220B. Even with this configuration, the functions and the effects similar to those of the first embodiment can be achieved. The configuration of this embodiment may be applied to other embodiments 2 to 22, that is, the number of the flexible circuit boards 2220 larger than the first embodiment may be included in the other embodiments 2 to 22.

Other Embodiments

The present invention is not limited to the embodiments, which have been described using the foregoing descriptions and the drawings. The following embodiments may be included in the technical scope of the present invention.

(1) In each of the above embodiments, in the flexible circuit boards, the angles of the second portions relative to the first portions are θ/2 and/or (180°−θ)/2. However, the angles of the second portions relative to the first portions may be altered from the above angles as appropriate.

(2) In each of the first to the sixth embodiments, the tenth to the thirteenth embodiments, and the twentieth to twenty-second embodiments, in the flexible circuit boards, the angles of the third portions relative to the second portions are and the angles of the fourth portions relative to the third portions are equal to each other. However, the angles of the third portions relative to the second portions are and the angles of the fourth portions relative to the third portions may be different from each other.

(3) In each of the first to the sixth embodiments, the tenth to the thirteenth embodiments, and the fifteenth to the eighteenth embodiments, and the twentieth to the twenty-second embodiments, each flexible circuit board in the unfolded state includes three bending portions and the second end mounted to the panel driver board. However, each flexible circuit board in the unfolded state may include two or less bending portions (including one bending portion) and the second end may be mounted to the panel driver board. Alternatively, each flexible circuit board in the unfolded state may include four or more bending portions and the second end may be mounted to the panel driver board.

(4) In each of the first to the third embodiments, the tenth, the twelfth, the fifteenth, the seventeenth, the twentieth, and the twenty-second embodiments, the angles at the bending portions of each flexible circuit board are all the same. However, the angle of the second portion relative to the first portion and the angle of the third portion relative to the second portion may be the same but different from the angle of the fourth portion relative to the third portion. Alternatively, the angles at the bending portions of each flexible circuit board may be all different from one another.

(5) In each of the fourth to the sixth embodiments, the eleventh, the thirteenth, the sixteenth, the eighteenth, and the twenty-first embodiments, the angle of the third portion of each flexible circuit board relative to the second portion and the angle of the fourth portion relative to the third portion are both 90°, which is different from the angle of the second portion relative to the first portion (θ/2). However, the angle of the third portion relative to the second portion and the angle of the fourth portion relative to the third portion may be set to an acute angle (smaller than 90°) and to an angle different from the angle of the second portion relative to the first portion (θ/2).

(6) In each of the second, the third, the fifth, and the sixth embodiments, the angle of the second portion of each flexible circuit board relative to the first portion is θ/2 but not (180°−θ)/2 and the third portion of each flexible circuit board turns inward in the arrangement direction of the flexible circuit boards relative to the second portion. However, the angle of the second portion of each flexible circuit board relative to the first portion may be θ/2 but not (180°−θ)/2 and the third portion of each flexible circuit board turns outward in the arrangement direction of the flexible circuit boards relative to the second portion as in the seventh embodiment. In this configuration, it is preferable that the third portion includes a second end mounted to the panel driver board as in the seventh embodiment.

(7) In each of the eighth, the ninth, the fourteenth, and the nineteenth embodiments, the angle of the third portion of each flexible circuit board relative to the second portion is (180°−θ)/2 but not θ/2 and the third portion of each flexible circuit board turns outward in the arrangement direction of the flexible circuit boards relative to the second portion. However, the angle of the third portion of each flexible circuit board relative to the second portion may be (180°−θ)/2 but not θ/2 and the third portion of each flexible circuit board turns inward in the arrangement direction of the flexible circuit boards relative to the second portion as in the first and the fourth embodiments. In this configuration, it is preferable that each flexible circuit board include a fourth portion that turns outward in the arrangement direction of the flexible circuit boards relative to the third portions as in the first and the fourth embodiments.

(8) In each of the seventh to the ninth embodiments, and the fourteenth and the nineteenth embodiments, the angle of the third portion of each flexible circuit board relative to the second portion is 90°. However, the angle of the third portion relative to the second portion may be set to an acute angle or an obtuse angle. In this configuration, the second ends of the flexible circuit boards may not be directly and collectively mounted to the same edge portion of the controller board. The second ends may be mounted to different edge portions of the controller board, respectively.

(9) The positions of the folding lines in the flexible circuit boards and the angles of the folding lines relative to the outer edges of the respective portions of the flexible circuit boards may be altered from those of the above embodiments as appropriate.

(10) In each of the above embodiments, the number of the folding points (the number of the folding lines) in each flexible circuit board is two or three. However, the number of the folding points may be 1 or four or more.

(11) In each of the above embodiments, the flexible circuit boards are symmetric to each other with respect to the first center line. However, the present invention may be applied to flexible circuit boards that are asymmetric to each other with respect to the first center line.

(12) In each of the above embodiments, the flexible circuit boards have the shapes that are symmetric to each other with respect to the first center line in the plan view. However, the present invention may be applied to flexible circuit boards that have shapes asymmetric to each other with respect to the first center line in the plan view.

(13) In each of the above embodiments, the flexible circuit boards are disposed with the first center line therebetween. However, the flexible circuit boards may be disposed on one of the sides of the first center line.

(14) In each of the above embodiments, the flexible circuit boards may be disposed on one of the sides of the second center line. However, the flexible circuit boards may be disposed with the second center line therebetween.

(15) In each of the above embodiments, the number of the mounted flexible circuit boards is two. However, three or more flexible circuit boards may be mounted.

(16) In each of the above embodiments, the flexible circuit boards are routed along the outer surface of the side of the backlight unit to the back side of the backlight unit when folded. However, the backlight unit may include a component that includes a hole or a cutout and the flexible circuit boards may be routed to the back side of the backlight unit via the hole or the cutout to pass through the backlight unit when folded.

(17) In each of the above embodiments, the gate circuit is monolithically formed on the array substrate in the display area of the liquid crystal panel. However, the gate circuit may be monolithically formed on the array substrate in the non-display area of the liquid crystal panel.

(18) In the twenty-second embodiment, the liquid crystal panel has the horizontally-long oval shape. However, a liquid crystal panel having a vertically-long oval shape may be used.

(19) The configuration of each of the second to the twenty-first embodiments may be applied to the liquid crystal panel having the oval shape as in the twenty-second embodiment.

(20) In each of the above embodiments, the liquid crystal panel having round or oval outline and display area is used. However, the present invention may be applied to a liquid crystal panel having a round or an oval outline and a rectangular or a polygonal display area. Alternatively, the liquid crystal panel may have a round (or an oval) outline and an oval (or a round) display area.

(21) The thickness of the light guide plate or the height of the LEDs in the backlight unit may be altered from those in each of the above embodiments as appropriate.

(22) In each of the above embodiments, the oxide semiconductor material is used for the semiconductor film that forms the TFTs. It is preferable to use an In—Ga—Zn—O based semiconductor (indium gallium zinc oxide) containing indium (In), gallium (Ga), zinc (Zn), and oxygen (O) for the material. The In—Ga—Zn—O based semiconductor is a ternary oxide containing indium (In), gallium (Ga), and zinc (Zn) with a ratio of In, Ga, and Zn (a composition ratio) which is not limited. For example, In:Ga:Zn may be 2:2:1, 1:1:1, or 1:1:2. The In—Ga—Zn—O based semiconductor containing In, Ga, and Zn with the ratio of 1:1:1 is more preferable. Such an oxide semiconductor (the In—Ga—Zn—O base semiconductor) may have an amorphous structure. More preferably, the oxide semiconductor has crystalline structure including crystalline components. A crystalline In—Ga—Zn—O based semiconductor with the c axis substantially perpendicular to a layer surface is preferable for the oxide semiconductor having the crystalline structure. An example of the crystalline structure of such an oxide semiconductor (the In—Ga—Zn—O based semiconductor) is disclosed in Unexamined Japanese Application Publication No. 2012-134475. The disclosure of Unexamined Japanese Application Publication No. 2012-134475 is incorporated by reference herein its entirety.

(23) In each of the above embodiments, the semiconductor film that form the TFTs is made of oxide semiconductor material. However, continuous grain silicon (CG silicon) or amorphous silicon, which is one kind of polysilicon (polycrystalline silicon), may be used for the material of the semiconductor film.

(24) In each of the above embodiments, the LED board is bonded to the optical sheet (the diffuser sheet). However the LED board may not be bonded to the optical sheet.

(25) In each of the above embodiments, the LED board is placed over the light guide plate on the front side. However, the present invention may be applied to a configuration in which the LED board is placed over the light guide plate and the reflection sheet on the back side. In such a configuration, the LEDs are mounted on the front plate surface of the LED board.

(26) In each of the above embodiments, the LEDs are side-emitting type LEDs. However, top-emitting LEDs may be used. The LEDs may not be arranged at equal intervals in the circumferential direction of the LED board. The LEDs may be arranged at irregular intervals. The number of the LEDs mounted on the LED board or the distance between the LEDs that are adjacent to each other in the circumferential direction may be altered as appropriate.

(27) In each of the above embodiments, the LED board includes the film base. However, the base of the LED board may be a plate having a specific thickness.

(28) In each of the above embodiments, the LEDs are used for the light source. However, an organic EL may be used for the light source.

(29) In each of the above embodiments, the color filter in the liquid crystal panel includes the R color portions, the G color portions, and the B color portions. However, four or more colors of color portions may be used.

(30) The present invention may be applied to a liquid crystal display device including a touch panel, a parallax barrier panel, and a cover glass other than the above embodiments.

(31) In each of the above embodiments, the transmissive-type liquid crystal display device was used. However, the present invention may be applied to a semi-transmissive-type liquid crystal display device.

(32) In each of the above embodiments, the TFTs are used for the switching components in the liquid crystal display device. However, the present invention may be applied to a liquid crystal display device including switching components other than the TFTs (e.g., thin film diodes (TFDs)). The present invention may be applied to a black-and-white liquid crystal display device other than the color liquid crystal display device.

(33) In each of the above embodiments, the pixel electrodes are disposed on the array board and the counter electrodes are disposed on the CF board in the liquid crystal panel. However, a liquid crystal panel including pixel electrodes and counter electrodes disposed on an array board may be used. Preferably, such a liquid crystal panel may operate in in-plane switching (IPS) mode or fringe field switching (FFS) mode.

(34) In each of the above embodiments, the liquid crystal panel is used for the display panel. However, a micro electromechanical systems (MEMS) display panel configured to display images using light from a backlight unit may be used. The MEMS display panel includes micro mechanical shutters disposed in matrix in a plan view. The micro mechanical shutters form display pixels. Open and close of the mechanical shutters are independently controlled to adjust an amount of transmitting light from the backlight unit for each display pixel. Therefore, the an image is displayed with a predefined tone.

EXPLANATION OF SYMBOLS 11, 111, 211, 311, 411, 511, 611, 711, 811, 911, 1611, 1711, 1811, 1911, 2011, 2111, 2211: liquid crystal panel (display panel)
11a1, 311a1, 611a1, 1611a1, 1711a1, 1811a1, 1911a1, 2011a1, 2211a1: linear edge section
11b1, 311b1, 611b1, 1611b1, 1711b1, 1811b1, 1911b1, 2011b1, 2211b1: linear edge section
20, 120, 220, 320, 420, 520, 620, 720, 820, 920, 1020, 1120, 1220, 1320, 1420, 1520, 1620, 1720, 1820, 1920, 2020, 2220 (2220A, 2220B): flexible circuit board
20a, 320a, 620a, 920a, 2220a: first end
20b, 320b, 620b, 920b, 1020b, 1120b, 1220b, 1320b, 1620b, 1720b, 1820b, 1920b, 2020b, 2220b: second end
21, 121, 221, 321, 421, 521, 621, 921, 1021, 2221 (2221A, 2221B): panel driver board
23, 123, 223, 323, 423, 523, 623, 923, 1023, 2223 (2223A, 2223B): flexible relay board (inter-board connecting flexible board)
24, 624, 1124, 1224, 1624, 1724, 1924, 2024, 2224: controller board (panel driver board)
25, 125, 225, 325, 425, 525, 625, 725, 825: first portion
26, 126, 226, 326, 426, 526, 626, 726, 826: second portion
27, 127, 227, 327, 427, 527, 627, 727, 827, 1327: third portion
28, 128, 228, 328, 428, 528, 928, 1028, 1128, 1228, 1428, 1528: fourth portion
FBL1: first folding line (folding line)
FBL2: second folding line (boundary line, folding line)
FBL3: third folding line (folding line)
NAA: non-display area (outer portion)

The invention claimed is:

1. A display device comprising:
a display panel having a substantially round or oval shape, the display panel comprising a plurality of linear edge sections formed by linearly cutting off sections of outer portions thereof;
a panel driver board configured to supply signals related to image display to the display panel; and
a plurality of flexible circuit boards including:
first ends mounted to an outer portion of the display panel at positions corresponding with the plurality of linear edge sections with respect to a circumferential direction, respectively;
second ends mounted to the panel driver board; and
portions each joining each of the first ends and corresponding one of the second ends, the portions having bending shapes in a plan view, wherein
the second ends of the plurality of flexible circuit boards are parallel to each other and mounted to a same edge portion of the panel driver board
a center angle defined by a line joining a middle point of one of the plurality of flexible circuit boards with respect to a width direction and a center of the display panel and a line joining a middle point of another one of the plurality of flexible circuit boards with respect to a width direction and the center of the display panel is referred to as θ, and
the plurality of flexible circuit boards comprise at least:
first portions including the first ends, the first portions extending perpendicular to the linear edge sections in the unfolded state; and
second portions continuing from the first portions at an angle of θ/2 relative to the first portions to turn inward in the arrangement direction in which the plurality of flexible circuit boards are arranged in the unfolded state.

2. The display device according to claim 1, wherein the bending shapes of the portions of each of the plurality of flexible circuit boards joining the first ends and the second ends in the plan view are defined such that the second ends are located inner than the first ends with respect to an arrangement direction in which the plurality of flexible circuit boards are arranged when the plurality of flexible circuit boards are in an unfolded state.

3. The display device according to claim 2, wherein the bending shapes of the portions of the plurality of flexible circuit boards joining the first ends and the second ends in the plan view are defined such that the plurality of flexible circuit boards are entirely within an outline of the display panel with respect to the arrangement direction when the plurality of flexible circuit boards are in the unfolded state.

4. The display device according to claim 2, wherein the plurality of flexible circuit boards comprise:
   second portions continuing from the first portions at an angle of θ/2 relative to the first portions to turn inward with respect to the arrangement direction in the unfolded state;
   third portions continuing from the second portions at the angle of θ/2 relative to the second portions to turn inward with respect to the arrangement direction in the unfolded state; and
   fourth portions including the second ends, the fourth portions continuing from the third portions at the angle of θ/2 relative to the third portions to turn outward with respect to the arrangement direction in the unfolded state.

5. The display device according to claim 4, wherein the plurality of flexible circuit boards are folded such that:
   the first portions are folded along folding lines parallel to the linear edge sections into inverted V shapes;
   boundary portions between the second portions and the third portions are folded along boundaries into inverted V shapes or V shapes; and
   third portions are folded along folding lines that are at an angle of [180°−(θ/2)]/2 relative to outer edges of the third portions farther from the center of the display panel on second portion sides when the plurality of flexible circuit boards are in the unfolded state into V shapes or inverted V shapes.

6. The display device according to claim 2, wherein the plurality of flexible circuit boards comprise:
   third portions continuing from the second portions at a right angle relative to the second portions to turn inward with respect to the arrangement direction in the unfolded state; and
   fourth portions including the second ends, the fourth portions continuing from the third portions at the right angle relative to the third portions to turn away from the display panel in the unfolded state.

7. The display device according to claim 6, wherein the plurality of flexible circuit boards are folded such that:
   the first portions are folded along folding lines parallel to the linear edge sections into inverted V shapes;
   the second portions are folded along folding lines that are at an angle of (45°−θ/2) relative to outer edges of the second portions farther from the center of the display panel on the first portion sides into V shapes or inverted V shapes; and
   third portions are folded along folding lines that are at an angle of 135° relative to outer edges of the third portions of the flexible circuit boards in the unfolded state farther from the center of the display panel on second portion sides when the plurality of flexible circuit boards are in the unfolded state into inverted V shapes or V shapes.

8. The display device according to claim 2, wherein the second ends of the plurality of flexible circuit boards are connected to each other and collectively mounted to the panel driver board.

9. The display device according to claim 1, wherein a center angle defined by a line joining a middle point of one of the plurality of flexible circuit boards with respect to a width direction and a center of the display panel and a line joining a middle point of another one of the plurality of flexible circuit boards with respect to a width direction and the center of the display panel is 90°.

10. The display device according to claim 1, wherein a center angle defined by a line joining a middle point of one of the plurality of flexible circuit boards with respect to a width direction and a center of the display panel and a line joining a middle point of another one of the plurality of flexible circuit boards with respect to a width direction and the center of the display panel is 60°.

11. A display device comprising:
   a display panel having a substantially round or oval shape, the display panel comprising a plurality of linear edge sections formed by linearly cutting off sections of outer portions thereof;
   a panel driver board configured to supply signals related to image display to the display panel; and
   a plurality of flexible circuit boards including:
     first ends mounted to an outer portion of the display panel at positions corresponding with the plurality of linear edge sections with respect to a circumferential direction, respectively;
     second ends mounted to the panel driver board; and
     portions each joining each of the first ends and corresponding one of the second ends, the portions having bending shapes in a plan view, wherein
   the second ends of the flexible circuit boards are parallel to each other and mounted to a same edge portion of the panel driver board,
   a center angle defined by a line joining a middle point of one of the plurality of flexible circuit boards with respect to a width direction and a center of the display panel and a line joining a middle point of another one of the plurality of flexible circuit boards with respect to a width direction and the center of the display panel is referred to as θ, and
   the plurality of flexible circuit boards comprise:
     first portions including the first ends, the first portions extending perpendicular to the linear edge sections in the unfolded state; and
     second portions continuing from the first portions at an angle of (180°−θ)/2 relative to the first portions to turn inward in the arrangement direction in which the plurality of flexible circuit boards are arranged in the unfolded state.

12. The display device according to claim 11, wherein at least the first portions are folded along folding lines parallel to the linear edge sections into inverted V shapes.

13. The display device according to claim 11, wherein the bending shapes of the portions of the plurality of flexible circuit boards joining the first ends and the second ends in the plan view are defined such that the second ends are located outer than the first ends with respect to an arrangement direction in which the plurality of flexible circuit boards are arranged when the plurality of flexible circuit boards are in an unfolded state.

14. The display device according to claim 13, wherein the plurality of flexible circuit boards comprise
   third portions continuing from the second portions at a right angle relative to the second portions to turn outward with respect to the arrangement direction in the unfolded state, and the first portions are folded along folding lines parallel to the linear edge sections into inverted V shapes.

15. The display device according to claim 14, wherein the plurality of flexible circuit boards are configured such that the third portions are folded along folding lines that are perpendicular to outer edges of the third portions into V shapes or inverted V shapes and the second ends project from an outline of the display panel for mounting the second ends to the panel driver board.

* * * * *